INVENTOR
W. T. REA
A. W. ROBERTS
BY
John E. Cassidy
ATTORNEY

INVENTOR
W. T. REA
A. W. ROBERTS
BY
John E. Cassidy
ATTORNEY

INVENTOR
W. T. REA
A. W. ROBERTS
BY John E. Cassidy
ATTORNEY

INVENTOR
W. T. REA
A. W. ROBERTS
BY
John E. Cassidy
ATTORNEY

INVENTOR
W. T. REA
A. W. ROBERTS
BY
John E. Cassidy
ATTORNEY

INVENTOR
W. T. REA
A. W. ROBERTS
BY
John E. Cassidy
ATTORNEY

Aug. 3, 1965 W. T. REA ETAL 3,199,076
CODE PERMUTATION ERROR CORRECTION AND DETECTION
Filed July 3, 1958 32 Sheets-Sheet 27

INVENTOR
W. T. REA
A. W. ROBERTS
BY
John E. Cassidy
ATTORNEY

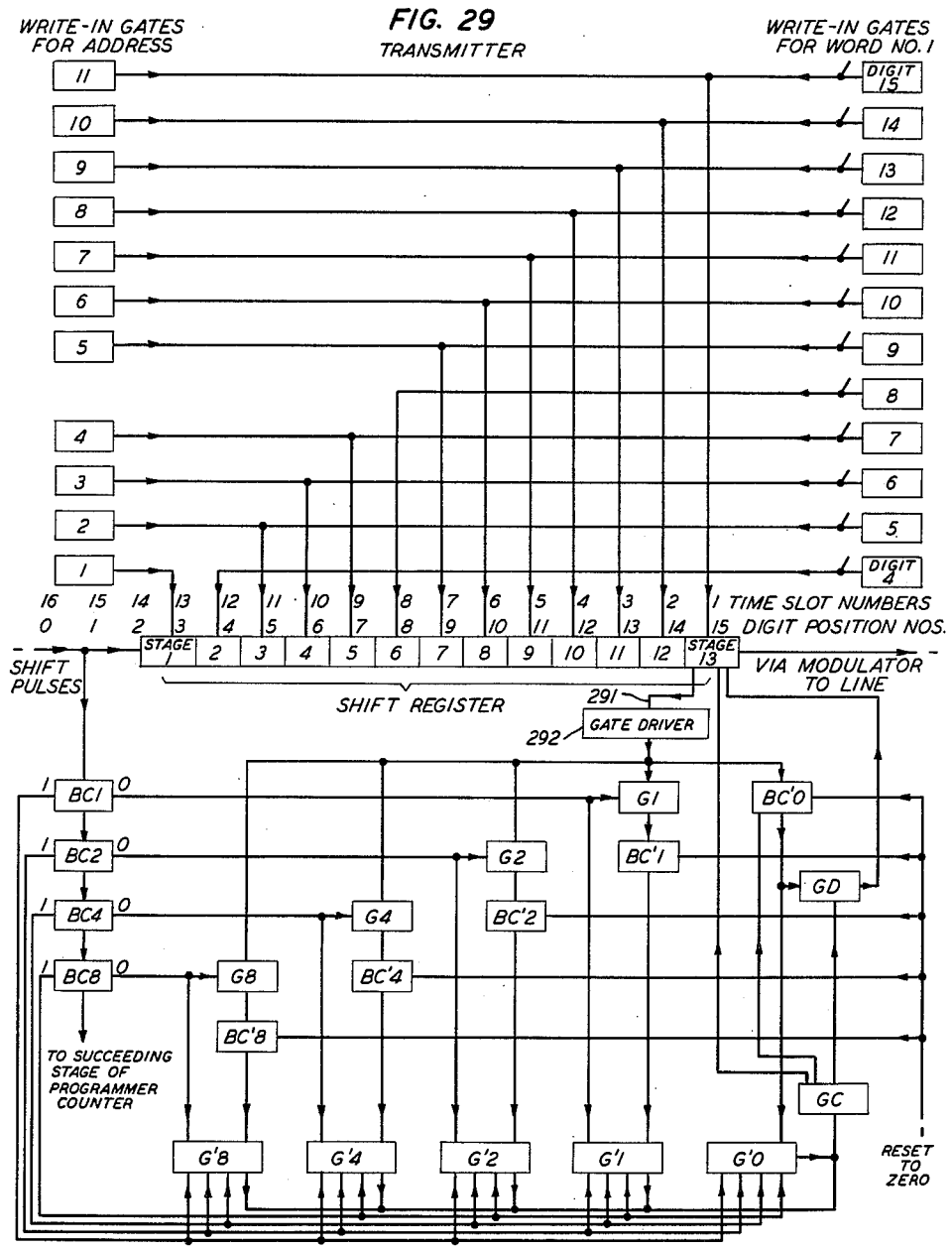

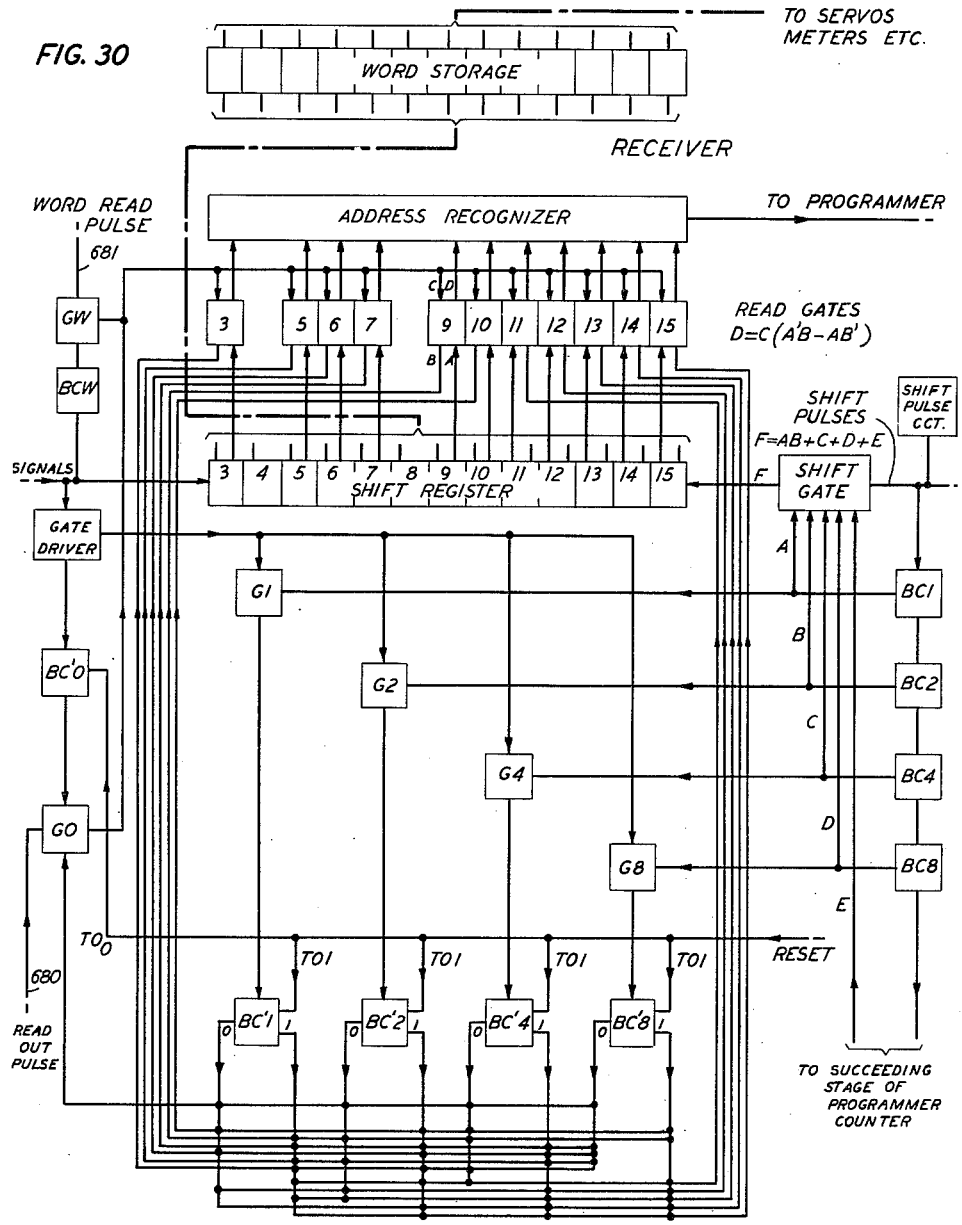

Aug. 3, 1965   W. T. REA ETAL   3,199,076
CODE PERMUTATION ERROR CORRECTION AND DETECTION
Filed July 3, 1958   32 Sheets-Sheet 30

FIG. 31 (PARALLEL CCTS.)

FIG. 32 (SERIES CCTS.)

FIG. 33 (FLIP-FLOP CCTS.)

FIG. 34

TIME SEQUENCE OF EVENTS

| | | | | | | | | | | | | | | | | | |
|---|---|---|---|---|---|---|---|---|---|---|---|---|---|---|---|---|---|
| TIME SLOT NUMBER | 1 | 2 | 3 | 4 | 5 | 6 | 7 | 8 | 9 | 10 | 11 | 12 | 13 | 14 | 15 | 16 | |
| ADDRESS VALUE | 1024 | 512 | 256 | 128 | 64 | 32 | 16 | – | 8 | 4 | 2 | – | 1 | – | – | – | |
| ERROR POSITION CHECKING NUMBER | 15 | 14 | 13 | 12 | 11 | 10 | 9 | 8 | 7 | 6 | 5 | 4 | 3 | 2 | 1 | 0 | |

RECEIVED SIGNAL

G1  OPEN/CLOSED

G2

G4

G8

BC'1

BC'2

BC'4

BC'8

BC'0

- - - - CONSEQUENCES OF AN ERROR

INVENTOR
W. T. REA
A. W. ROBERTS
BY
John E. Cassidy
ATTORNEY

Aug. 3, 1965 — W. T. REA ETAL — 3,199,076
CODE PERMUTATION ERROR CORRECTION AND DETECTION
Filed July 3, 1958 — 32 Sheets-Sheet 32

INVENTOR
W. T. REA
A. W. ROBERTS
BY
John E. Cassidy
ATTORNEY

United States Patent Office 3,199,076
Patented Aug. 3, 1965

3,199,076
CODE PERMUTATION ERROR CORRECTION AND DETECTION
Wilton T. Rea, Bernardsville, and Allen W. Roberts, South Plainfield, N.J., assignors to Bell Telephone Laboratories, Incorporated, New York, N.Y., a corporation of New York
Filed July 3, 1958, Ser. No. 747,554
14 Claims. (Cl. 340—146.1)

This invention relates to an improved encoding and decoding system for use in pulse code signal transmitting and receiving systems to minimize errors in transmission.

An object of the invention is an improved encoding and decoding circuit to minimize errors in pulse signaling systems.

There is presently known in the art a system for encoding permutation pulse trains at a transmitter and for decoding them at a receiver in such manner as to permit the correction of a single error and the detection of a double error in trains found on check at the receiver to be incorrect. Patent 2,552,629 granted May 15, 1951 to R. W. Hamming and B. D. Holbrook, which patent was reissued as patent Re. 23,601 on December 23, 1952, discloses such a system employing magnetic relays. The operation of the circuitry of the foregoing patents, as well as the operation of the circuit of the present invention, is predicated on theory presented in an article published in the Bell System Technical Journal, Volume 29, 1950, pages 147 through 160, author R. W. Hamming, one of the joint inventors of the identified patents. Those patents and that article are hereby incorporated herein by reference.

The improvement afforded by the circuit of the present invention consists in an arrangement which permits application of the Hamming theory to a high speed system in which the encoding of the several groups of signal elements at the transmitter is performed simultaneously for all of the groups by means of an individual counting circuit for each group, all of which circuits are connected in parallel to the transmitting path. The signal elements are transmitted in sequence over a single channel. As they are passing outward to the line, the tests are applied by the counters. Blank spaces, so to speak, are left in the original signal sequence in which proper parity checking signal elements are inserted for each group before transmission to the line. The receiver operates in a generally similar manner. Coadunate with this method of operation is a large reduction in the required storage facilities.

It is considered that a simplified and specialized description of single-error correction, double-error detection, applied to a specific case, will be advantageous in facilitating an understanding of the present improved circuit for performing this function. Basic to this is a well-known circuit feature employed in multielement, two-condition, permutation code signal systems for improving accuracy. This feature is known as parity check which will first be described.

In a parity check arrangement, each code signal permutation consists of the same total number of information bearing signal elements, such as five, for instance. Each signal element may be of either of two conditions which we will call hereinafter 0 and 1. A particular permutation may have one 1 and four 0's, for instance, in its information-bearing portion. To these five signal elements a single signal element is added before transmission, as a final element, making six signal elements in each train. The sixth element is called the parity check element. The condition, whether 1 or 0, of each of the first five signal elements is checked. It may be agreed in advance that every signal train as transmitted will have an even number of 1's. In the instance cited of the permutation having one 1 and four 0's, since there is an odd number of 1's in the permutation, the signal element which is added will be a 1 instead of a 0, so that, in the six-element train as transmitted there will be two 1's, which is an even number of 1's and four 0's. If the original permutation had contained four 1's and one 0, then since the number of 1's is even, the last element of the train as transmitted would have been a 0, so that the train as transmitted would have had four 1's and two 0's.

At the receiver each incoming signal train is tested to determine if it contains an even number of 1's. If it does not, it is rejected. It is to be understood, of course, that by prearrangement the parity check equipment may be arranged to make each train contain an odd number of 1's or an even or odd number of 0's, as desired, so long as the receiver is arranged to test for parity on the same basis.

It should be apparent from the foregoing that the parity check does not completely guard against error. For instance, an original permutation might have one 1 and four 0's in its information-bearing portion. After the addition of the parity checking element, in a circuit arranged to always transmit an even number of 1's, another 1 would be included, making two 1's and four 0's. If, after transmission, two of the 0's were received as 1's, there would be received four 1's and two 0's. The four 1's, being an even number of 1's, would pass the parity check. The parity check, therefore, detects certain permutations as not being plausible but does not detect all that are in error, and does not identify a particular element in a permutation as being the erroneous element.

Although the present system can detect and correct one error and detect a double error in a permutation, it is subject to the limitation common to parity check systems, and that is that incorrect but plausible combinations may be accepted as correct. The Hamming theory and the Hamming-Holbrook patent, further identified in the foregoing, each proposes two advances beyond what is achievable by parity check alone. First, each not only identifies a received train as being in error, but corrects a single element in any train which has a single error. In order to do this it first identifies the position of a single element in the train as received which is in error and changes it to the opposite condition. Second, it determines if there are double errors in the train as received. In the latter case it does not correct the two errors. It rejects the train. The circuit of the present suggestion performs the same two functions, but employs novel circuitry which is applicable in a high speed data transmission system, while eliminating storage devices, by subjecting all of the groups of signals which are required to be encoded and tested for parity to the encoding and testing process simultaneously, in parallel, as the elements of the train are being transmitted and received in sequence.

Now let us consider the means whereby the particular erroneous element in a train having one error is identified as being the erroneous element according to the Hamming teaching. To anticipate, broadly, it may be stated that this is performed in part by applying not one but a number, such as three or four or more, parity checks over selected groups of positions in a code signal permutation, depending upon the number of information-bearing elements contained in the permutation. Each signal train as transmitted, in addition to the information-bearing signal elements, has not one but a plurality of parity checking elements added thereto. For a system in which four information-bearing elements are required, for reasons to be made clear hereinafter, three additional parity checking elements would be required, so that in such a system seven signal elements would be transmitted in each train. At the transmitter a first parity check is applied to signal elements in a first group of positions in the permutation. Then a 0 or a 1 is inserted as the first parity checking digit in a signal element position in the train assigned for the result of the first parity check. A second parity check is made over a second group of information-bearing signal elements and a 1 or a 0 inserted as the second parity checking digit in a signal element position assigned for the result of the second parity check. A corresponding procedure is followed for the third parity check.

Although the sequence of the elements of the permutation containing the intelligence, in the relationship of each to another, may not be changed, these elements may otherwise be assigned to any positions in the train and the three checking elements also may be assigned arbitrarily to any numbered position in the train. However, the number of the positions in the train occupied by the digits grouped together in each of the three parity checks is of vital importance. The reasons governing the selection of the position numbers included in each of the three parity checks will be deferred for the present, while the process of encoding three groups of signals in a train is first explained, without relation to the reasons for their inclusion in a particular group, in the interest of simplicity.

For purpose of description it will first be assumed that an even parity check of the 1 conditions is used. With this arrangement, in encoding at the transmitter, the parity checking circuit inserts a 0 in each parity checking position in each train each time the number of 1's in an assigned group of positions in the permutation is even, and a 1 when the number of 1's is odd. It will be assumed that the position numbers in the whole train including the three parity digits are numbered from 1 through 7 from left to right, that the information-bearing digits are arbitrarily assigned to positions numbered 3–5–6–7 and the first, second and third parity checking digits are arbitrarily assigned to positions 1–2–4, respectively. It will be assumed also, as a specific example, that the information which is to be conveyed in a particular train is the four-element permutation 0111. Inserting these in positions 3–5–6–7 of the seven-element train and leaving parity checking positions 1–2–4 blank for the present, we have:

```
1 2 3 4 5 6 7
    0   1 1 1
```

The first parity check is made over positions 3–5–7 and the result inserted in position 1. Following this procedure, it is observed that in position 3 there is a 0 and in each of positions 5 and 7 there is a 1, making two, or an even number, of 1's. Therefore, no additional 1 need be inserted to make the number of 1's in these positions even. So a 0 is inserted in position 1 of the train.

The second parity check is made over positions 3–6–7 and the result inserted in position 2. This, as should be understood from the foregoing, results in another 0 being inserted in position 2, which is the parity checking position for the second check.

The third parity check is made over positions 5–6–7 and the result is inserted in position 4. There is a 1 in each of positions 5–6–7. This gives three 1's, or an odd number of 1's. Therefore, a 1 is inserted in parity check position 4. Thus, the digits in the seven positions of the encoded train are:

```
1 2 3 4 5 6 7
0 0 0 1 1 1 1
```

The signal train, if free from error when received, will be identical with the train as transmitted. Three parity checks are made in the receiver, over the same groups of digits to which the three checks were applied in the transmitter. For instance, in the first check made by the receiver, when positions 3–5–7 are tested, if the digits as received are the same as the digits as transmitted, there should be a 0 in position 3 and 1's in positions 5 and 7. There are two 1's in these positions and if they are correct there should be a 0 in position 1. If we find, for instance, a 0 in position 3, a 1 in position 5 and a 0 in position 7, if the received train is correct, there would be a 1 in position 1 for the first parity check to make the total number of 1's in the group even. In other words, it is possible to check three groups of elements in the train of elements received and determine from the digits appearing in each of three assigned parity positions if each of the three groups is plausible.

Attention is now called to the following, Table One, showing three-digit binary numbers corresponding to a sequence of decimal number equivalents from 0 to 7. The purpose of the table is simply to show the relationship between binary and decimal numbers as an aid in understanding the invention.

Table One

| Binary Number: | Decimal equivalent |
|---|---|
| 000 | 0 |
| 001 | 1 |
| 010 | 2 |
| 011 | 3 |
| 100 | 4 |
| 101 | 5 |
| 110 | 6 |
| 111 | 7 |

In computing the decimal equivalent of the binary number, all 0's count for nothing, and 1's count for 2 raised to a power depending on the lateral position of the 1. The powers to which 2 is raised start at 0 at the right and increase by one in numerical sequence for each successive position to the left. Thus, remembering that $2^0=1$, the binary number 111 equals $$2^2+2^1+2^0=4+2+1=7$$

From Table One it is apparent that with a three-digit binary number we can define eight decimal equivalents. By employing the binary number 000, corresponding to decimal number 0, to indicate a correctly received combination, we can designate each of seven positions in a train numbered from 1 through 7 by its corresponding three digit binary equivalent.

Now we have the requirement that the number of the particular position occupied by a single erroneous digit in the train as received must be identified and corrected. This is done by controlling a circuit, in response to a received encoded train, in such manner that the circuit provides an indication of a binary number, the decimal equivalent of which is the number of the position of the element in the train which is in error and which provides an indication of the binary number 000, equal to decimal number zero, when a received signal train does not have a single error. This indicated binary number will hereinafter be called the checking number. In producing this number, each time a parity check is met in each of the parity checks applied at the receiver, the circuit of the receiver will produce an indication of a 0 as a digit of the checking number. The first test is to produce the right-hand digit of the checking number and succeeding tests are to produce succeeding digits toward the left.

If we are to designate, by means of a binary number the postion of any erroneous digit in a train having a total of seven digits, it is apparent from Table One that three binary digits are required. If each binary check is to define one of the digits, three checks must be made. The total number of checks which must be made is equal to the number of binary digits required to express the decimal equivalent of the total number of positions in any signal train transmitted in the system, including all information bearing and all parity checking digits.

The first check is applied over digit positions in the seven-digit train, the binary numbers designating which positions have a 1 in their right-hand columns, as shown in Table One, in the foregoing. Reference to the tabulation shows that the first check must be applied over positions 1-3-5-7. The second check must be applied over digit positions in the train for which the binary numbers designating the position have a 1 in the second column from the right. These are positions 2-3-6-7. The third check must be applied over digit positions in the train for which the binary number designating the position has a 1 in the third position from the right. These are positions 4-5-6-7. Each of these three checking groups includes the parity checking digit, per se.

The reason that the parity check over these positions and the three digit binary checking number produced thereby afford the binary number corresponding to the decimal number of the position that is in error may be observed from a scrunity of the foregoing tabulation of the binary numbers from 0 to 7 and their decimal equivalents and the following discussion.

Consider the 1's in the right-hand column of Table One. When the first check is made at the receiver, if there is a lack of correspondence between the number of 1's in positions 1-3-5-7 of the received train and what is indicated as being transmitted by the first parity checking digit, the receiver will be arranged so that, in effect, there will be an indication of a 1 condition produced as the right-hand digit of the erroneous position checking number. Position 1 is tested only once and it is tested on the first check only. It is the only position which is tested on the first check only. If there is an error in position 1, and in position 1 only, it is indicated by failure of the first check and by a failure of the first check only. An error in position 1 cannot affect other checks, because the digit in position 1 is not included in other checks.

If the digits in other positions are correct, as indicated by the second and third parity checks, the binary checking number indication which is to be produced by the receiver as a result of each of the second and third checks will be a 0, and the three digit binary number indication produced will be 001 corresponding to decimal 1, indicating an error in the first position.

The position numbers over which the parity checks are made are selected so that an error in any digit in any numbered position, due to a change from 1 to 0, or vice versa, will change the number of 1's included in one, two or three parity checks depending on whether or not there is a 1 in the first, second or third position of the binary number corresponding to the decimal number of the position.

To emphasize: since the digit in position 1 is checked only once, and on the first check only, and since it is the only digit in any position which is checked on the first check only, a single error in the digit in position 1 will cause the first check, and the first check only, to fail. It will, therefore, afford the binary number 001, equal to decimal 1, as the erroneous position checking number. Since the digit in the second position is checked only once, on the second check only, and since it is the only digit in any position which is checked on the second check only, an error in the digit in the second position only will cause the second check and the second check only to fail, giving the binary number 010 which equals decimal 2, designating the second position. The digit in the third position is checked twice, once on the first check and once on the second check. It is the only digit in any position which is checked on the first and second checks only. A single error in the digit in the third position will cause the first and second checks, and the first and second checks only, to fail, giving a binary number 011, which equals decimal 3 and indicates the third position. The general rule is that a digit in a particular position is included or not included in the first, second or third parity check, dependent upon whether or not the binary number corresponding to its decimal number has a 1 or a 0 in its first, second or third position, respectively. In order to define an error in a digit in position 7, for instance, the binary number 111 must be produced. The digit in position 7 must therefore be included in all three checks. It is the only digit in any position which is included in all three checks. If there is a single error in the digit in this position it will affect all three checks and will afford a 1 in binary notation on each check, giving the binary number 111, equal to $2^2+2^1+2^0=7$. A single error in a digit in no other position can afford such a result. In other words, *the test for a digit in each position is unique and a single error in a digit in any position affords a unique result.*

Applying the foregoing, the manner in which the position of an error in a train is determined may now be understood for a specific case.

Let us assume again that the permutation 0111 is to be encoded in the manner explained in the foregoing. The elements 0111 are inserted in the four positions 3-5-6-7, respectively, which are assigned for the intelligence-determining elements. The results of the three parity checks made over the three groups of positions 1-3-5-7, 2-3-6-7 and 4-5-6-7 are 0-0-1, respectively, which are inserted in positions 1-2-4, respectively. Then the correctly encoded train including the three parity checking digits has been shown to be:

```
1 2 3 4 5 6 7
0 0 0 1 1 1 1
```

It will be assumed that the digit in position 7, as received is in error, so that the received train is:

```
1 2 3 4 5 6 7
0 0 0 1 1 1 0
```

At the reeciver the check made over the digits in positions 3-5-7 of the received train shows one 1 which is odd. There should therefore be a 1 in position 1 and instead we find a 0. The first check therefore fails and the receiver must be arranged, in effect, to produce an indication of a 1 as the right-hand digit of the erroneous position checking number. The second check made over the digits in positions 3-6-7 again shows one 1 and requires for correctness an indication of another 1 in parity checking position 2, where we again find a 0. The second parity check therefore fails and the receiver must, in effect, produce an indication of another 1 for the second position from the right in the erroneous position checking number giving 11 for the two right-hand positions. The third check is made over the digits in positions 5-6-7. There are two 1's in these positions which for correct parity require an indication of a 0 where in position 4 we find a 1. The third check therefore fails. The receiver must, in effect, produce an indication of another 1 for the third position from the right in the binary checking number, giving 111 as the checking number. The decimal equivalent of binary checking number 111 produced by the check is 7, indicating that the error is in position 7 of the signal train as received. The receiver is arranged to automatically invert the condition of the digit in the position found to be in error. This single correction produces the correct signal train as transmitted.

Now to consider the manner in which a double error is detected. It is emphasized that in the present arrangement a single train having two errors is detected and rejected but not corrected.

In order to detect a double error, a fourth and final parity check is made over the entire combination, in addition to the three single-error correcting parity checks, and a final signal element is added to make the total number of 1's, including the final parity checking digit, even.

If the single-error correcting check, which is now made over all digits of the train except the final digit, is met, and if the parity check over the entire train is met, as shown by the condition of the final digit, there is no error in the train.

If the double-error parity check over an entire train shows an error, and if the single-error correcting check also shows an error, there is one error in the train and its position is indicated by the binary number produced by the single-error check.

If the double-error parity check over the entire train shows an error, and if the single-error correcting check indicates no error, that is, if it produces a 000 error position number, there is one error in the train and it is in the position of the final or double-error partity check digit for the entire train, that is, the double-error detecting digit per se is erroneous.

If the single-error correcting check shows one error, and the double-error detecting check shows no error, there are two errors, or pairs, in the train. This is so because the only basis on which the final parity check digit will show no error, when the single-error correcting check shows one error, is when the errors over the whole combination are in pairs. Under this condition the signal train is rejected.

The way in which the foregoing theory is incorporated in a high speed data pulse signaling system in such manner that all encoding and decoding of the various parity checking groups are performed simultaneously as the trains are transmitted or received, each signal element in sequence, thus minimizing the storage equipment required, may be understood from the following description when read with reference to the associated drawings, which taken together disclose a preferred embodiment in which the invention is presently incorporated. It is to be understood, however, that the invention may be incorporated in other embodiments which will be readily suggested to those skilled in the art by the present disclosure.

In the drawings:

FIGS. 1 through 27, arranged as in FIG. 28, show the present system. Of these figures FIG. 1 through FIG. 14 parity checking circuits;
show the transmitting portion of the system and FIG. 15 through FIG. 27 show the receiving portion of the system;

FIG. 1 through FIG. 14, taken together, and FIG. 15 through FIG. 27, taken together, are each unitary circuits. Their separation into separate figures is controlled by the size of patent drawings. Certain of them singly and in groups, however, may be identified by circuit function in accordance with the following:

FIG. 28 shows the manner in which FIG. 1 through FIG. 27 are disposed in proper relation to form an operative system;

FIG. 29 is a block diagram of the transmitter;

FIG. 30 is a block diagram of the receiver;

FIG. 31 shows a group of transistors arranged to form a parallel circuit, used in explaining the invention;

FIG. 32 shows two transistors arranged to form a series circuit used in explaining the invention;

FIG. 33 shows a two-transistor flip-flop circuit used in explaining the invention;

FIG. 34 shows a time sequence diagram used in explaining the invention;

Figure 1:
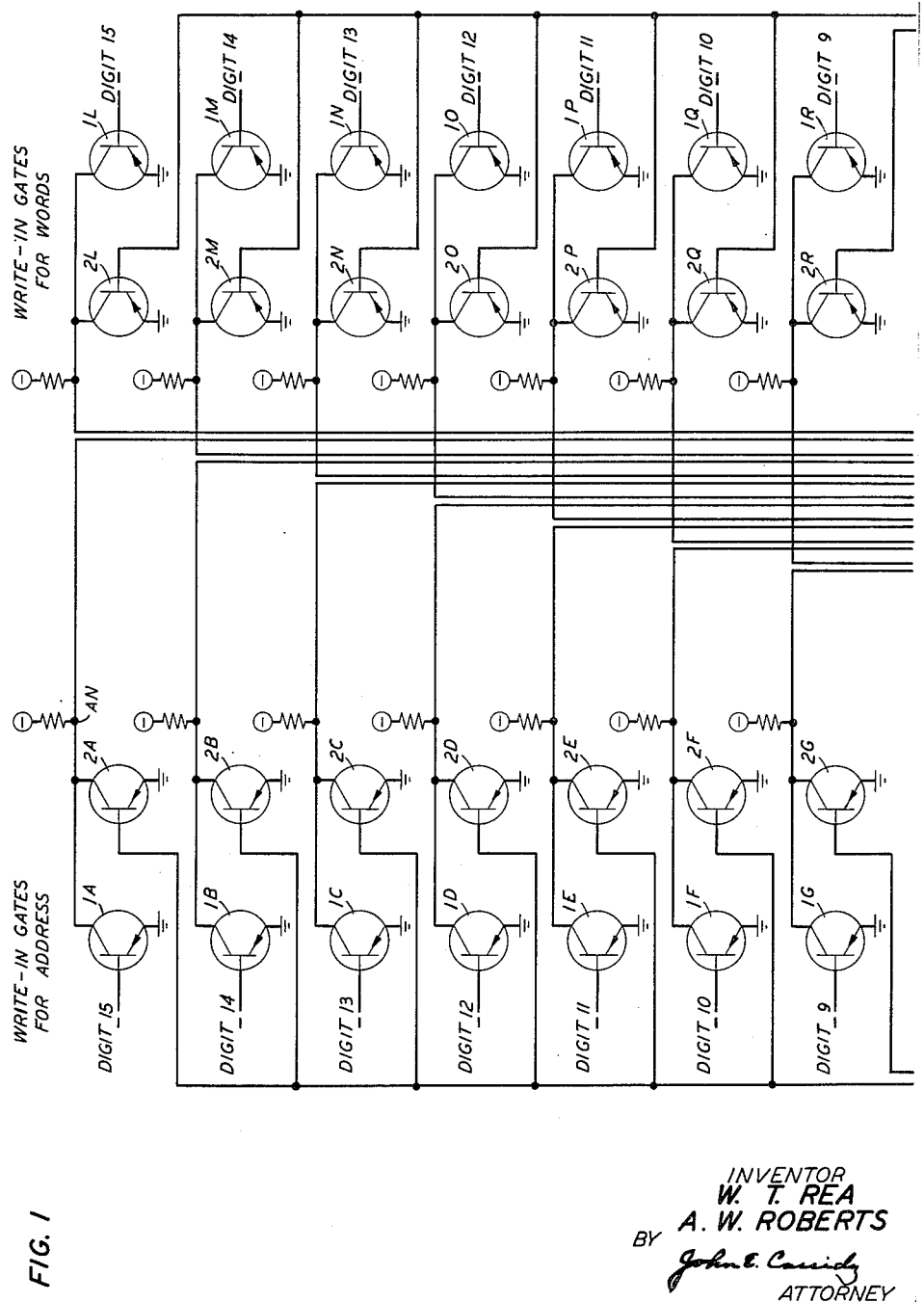
FIGS. 1 and 2 show the address and word write-in gates.

Refer now to FIG. 29 which is a circuit block diagram of the transmitter showing the components of the circuit, represented by captioned rectangles, which will be used in first explaining the operation of the transmitting circuit generally in anticipation of the detailed description to follow.

It is contemplated that the present invention in one embodiment will be incorporated in a high speed radio data transmission system, such as disclosed in the copending application Serial No. 549,402 of J. R. Davey, D. Mitchell, B. Ostendorf and W. T. Rea filed November 28, 1955, now Patent No. 3,141,928, which is hereby incorporated by reference. That system is called a discrete address system because it enables any one of a large group of mobile units to be individually or discretely addressed while excluding all others. Multielement, two condition, permutation code signals are used. A succession of six separate permutation code signal groups consisting of a first permutation defining the address of a called plane, for instance, followed by five other permutations each defining an individual item of information for the called plane are transmitted from a control station. Responsive to the reception of the correct address, the discretely addressed plane will be enabled to receive the information following the address which is intended only for the addressed plane. Hereinafter, the first permutation will be called the address and the following five permutations will be called words. It is obvious that it is important, under such circumstances, that the single plane which is intended to be addressed should receive the message. In order to insure this, it is important to identify any address which is not correct. In the present embodiment, the invention encodes the address at the transmitting station and then, at the receiver, detects and corrects a single error in any received address and then receives the message and rejects messages following addresses which have double errors. The circuitry may be arranged so that single-error correction and double-error detection may be applied also to each of the five words of the message following the address, if desired. In the present arrangement, however, each of the five words is checked for parity only.

In explaining the manner in which single-error correction was achieved in the foregoing, a four-element permutation was assumed. To correct an error in such a permutation it was necessary to employ three parity checking elements, making a total of seven elements in the encoded train. In the application of the invention which will now be described, it will be assumed that any of 2000 planes is required to be discretely addressed. In order to do this an address in the form of an eleven-element, two-condition permutation code signal, which affords $2^{11}$ or 2048 choices, is employed. In order to encode this for single-error correction, four additional elements are required. For the additional double-error detection, one more element is required as the final element of the combination, making a total of 16 signal elements in each address combination. A sixteen-element train is therefore required. The four single-error correcting parity checking elements are to be inserted in time slots 4–8–14 and 15 and the double-error detecting digit in time slot 16. In order to designate the digit position number of a digit which is in error by the method generally described in the foregoing, the signals appearing in each of the time slots are assigned digit numbers from 15 to 0 in an order reverse from the time slot numbers with digit number 0 assigned to time slot 16 and digit number 15 assigned to time slot 1.

The following table, Table Two, is arranged in accordance with the foregoing and shows the binary number corresponding to each digit number in vertical alignment therewith. The double-error detection digit is digit number 0. The single-error detection digit numbers are 1, 2, 4 and 8. The remaining digits carry the address.

*Table Two*

| Time Slot Number | 1 | 2 | 3 | 4 | 5 | 6 | 7 | 8 | 9 | 10 | 11 | 12 | 13 | 14 | 15 | 16 | Decimal Value of 1's in each row |
|---|---|---|---|---|---|---|---|---|---|---|---|---|---|---|---|---|---|
| Digit Number | 15 | 14 | 13 | 12 | 11 | 10 | 9 | 8 | 7 | 6 | 5 | 4 | 3 | 2 | 1 | 0 | |
| | 1 | 1 | 1 | 1 | 1 | 1 | 1 | 1 | 0 | 0 | 0 | 0 | 0 | 0 | 0 | 0 | 8 |
| | 1 | 1 | 1 | 1 | 0 | 0 | 0 | 0 | 1 | 1 | 1 | 1 | 0 | 0 | 0 | 0 | 4 |
| | 1 | 1 | 0 | 0 | 1 | 1 | 0 | 0 | 1 | 1 | 0 | 0 | 1 | 1 | 0 | 0 | 2 |
| | 1 | 0 | 1 | 0 | 1 | 0 | 1 | 0 | 1 | 0 | 1 | 0 | 1 | 0 | 1 | 0 | 1 |

In order to define any of 16 digit numbers, digit numbers 15 to 0, by means of a binary number, four binary elements are required, which afford $2^4$ or 16 unique combinations. Four binary checks are required in encoding and decoding, each check over an individual one of four groups of digits. Each of the four separate parity checks is made over an individual group of positions having 1's in the horizontal rows having decimal values 1, 2, 4 and 8, respectively. An odd parity check will be used for error correction instead of an even parity check as described in the foregoing and an even parity check for double-error detection. The results of the four odd parity checks for error correction are inserted in digit numbers 1, 2, 4 and 8. The result of the even parity double-error detection check is inserted in digit number position 0. The four single-error correction parity checks are made over four groups of digits in digit numbers 1 through 15. The production of an indication of 0000 as a result of these four checks at the receiver means that there is no single error in any digit number position 1 through 15.

In encoding for single-error correction during transmission the number of 1's in digit position numbers 15, 13, 11, 9, 7, 5 and 3 in any signal train which is to be encoded are counted and, dependent upon whether there is an odd or an even number of 1's therein, a 0 or a 1, respectively, is inserted in digit position number 1 to make an odd number of 1's in this group of signals as transmitted. The number of 1's in digit position numbers 15, 14, 11, 10, 7, 6 and 3 are similarly counted and the necessary parity digit to make the total number of 1's in the group odd is inserted in digit position number 2. The number of 1's in digit position numbers 15, 14, 13, 12, 7, 6 and 5 are counted and the proper parity digit is inserted in digit position 4. The number of 1's in digit positions 15, 14, 13, 12, 11, 10 and 9 are counted and the proper parity digit is inserted in digit position 8. In the present arrangement, these countings go on simultaneously over the various groups of digits as the elements of the single signal train are registered in the last stage of shift register. The simultaneous counts are made in four individual counting circuits arranged in parallel. For double-error detection the number of 1's in each of digit position numbers 15 through 1 are counted in a fifth circuit. An even parity check is applied to this group of digits and the proper parity digit is inserted in digit position 0. This is also done simultaneously with the four other parity checks.

At the uper left in FIG. 29 there is shown a vertical group of 11 write-in gates represented by individual rectangles, numbered 1 through 11, from bottom to top. At the beginning of a transmitting cycle, an address, which is assumed to be an 11-element, two-condition, permutation code group of signals, which group has been set up on switches at the central control station, is transferred through these 11 write-in gates, under control of a program oscillator and binary counter, and then, through the agency of the shift pulse circuit is applied simultaneously to 11 of the 13 stages of the shift register. The transfer operation is described in the application identified in the foregoing. Each stage of the shift register is capable of being actuated into either one of two possible conditions, corresponding to the 0 or 1 signal conditions of the two-condition signal elements. Prior to the shifting of the 11-element permutation into the shift register, each stage of the shift register is actuated to its 0 condition. The 1 or a 0 condition, after passing through its respective gate, is impressed on its individual shift register stage. Thereafter the conditions stored in all stages are moved in unison to the right, one stage during each time slot, under control of the shift pulse circuit. When the 11-element permutation group defining the address is shifted into the register simultaneously, in parallel, only 11 of the 13 stages have address elements impressed thereon. Stages 6 and 2 of the shift register corresponding to digit numbers 8, and 4 and corresponding also to time slots 8 and 12, are left in the 0 condition. These 0 condition signals originally stored in stages 2 and 6 of the register, will remain unchanged as they are shifted along the register stage by stage in their proper sequence until they are about to be read out of the register. At the time each of the signal elements in these register positions are about to be read out of the register, and at the time each of the signal elements in digit number positions 2 and 1 are about to be read out of the register, each of them will be left in the 0 condition, or changed to the 1 condition, as required to satisfy the parity count for a corresponding one of each of the four parity check groups used for error correction.

As explained heretofore, the number of digits which are transmitted in the address train is 16. Therefore, the signal elements which will occupy digit number positions 2, 1 and 0, corresponding to time slots 14, 15 and 16, all of which are parity signals, will all be 0 condition signal elements as they are shifted through the register and until they are about to emerge from the register. Each of these parity checking digits, that is the digits in time slot positions 8, 12, 14 and 15 or digit position numbers 8, 4, 2 and 1 for the single error correcting checks and the digit in time slot position 16, or digit position number 0, for the double-error detection check, is changed to a 1 condition if required for its respective parity check, each in its proper turn, as it is about to emerge from the last stage, stage 13, of the register.

It will be observed that there are three sets of numbers arranged in three horizontal rows in the middle of FIG. 29. The bottom set identifies the shift register stage and, from left to right, ranges from 1 through 13 for the 13 stage register. The middle horizontal row of numbers from left to right ranges from 0 through 15. These are the digit number positions. In the present arrangement, as explained, the four binary checks for single-error detection are to produce a four-digit binary number. The decimal equivalent of this number will identify the digit position number of the digit which is in error and which is to be corrected. This will correspond to the digit position number in the middle horizontal row in FIG. 29. The production of the binary combination 0000, corresponding to decimal number 0, indicates that there is no error in positions 1 through 15. Digit number position 0 is not included among those identified by the single-error correction circuit. The top horizontal row of numbers from 1 through 16, reading from right to left, identifies the time slot number. The signal train which is transmitted passes out of stage 13 of the register and is impressed on the line shown extending to the right. The first digit to be so passed out is considered to occupy time slot 1 and succeeding digits occupy time slots 2 to 16, respectively.

An individual stage is not required in the shift register to accommodate the parity signal elements which are to fill time slots 14, 15 and 16, corresponding to digit position numbers 2, 1 and 0, as each of them is, so to speak, appended to the train after its parity value is determined by its respective parity check. No one of them intervenes, as do the other two parity digits, between intelligence determining digits of the address. It is not necessary, therefore, to provide space in the shift register for them initially. Three successive 0 condition signal elements are attached temporarily to the train under control of the shift pulse circuit to fill these time slots. These move through the register until the parity check for each is determined. Then they remain in the 0 condition or are changed to the 1 condition as necessary.

In the upper right-hand portion of FIG. 29 there are shown 12 read-in gates to accommodate the 12 intelligence determining digits in each word. Each of these 12 gates is connectable to an individual stage of 12 of the stages of the shift register. These are stages 2 through 13. The parity check digit for a word, which follows the 12 intelligence bearing digits, is not read into the register. It was explained that after the address is transmitted the intelligence in the train, in the form of the five words, follows. This intelligence may comprise, for instance, five permutations, each of which permutations may define the magnitude of an individual quantity, for instance. In the present disclosure it is assumed that single-error correction is not to be applied to any of these five words but that each is to have a simple parity check applied over all of the digits in its twelve positions. After the address has passed out of the register and, at the proper count under control of the program oscillator, the binary counter, and an individual matrix control gate for each of the five permutations, not shown, but described in detail in the Davey et al. application, each of the word permutations will be transferred in turn to an individual array of write-in gates such as that shown in the upper right in FIG. 29. It is assumed that the array shown in the upper right in FIG. 29 is individual to word number 1. Four other words will be impressed on four individual arrays each constituting a write-in gate for the word and the words will be passed in turn to the shift register. Each of these permutations will be read out, the elements comprising each permutation following one another in sequence, until all of the words have been read out.

To return to a consideration of the encoding of the address, simultaneously with the application to the shift register of the shift pulses, which shift the signal elements through the register in tandem, the shift pulses are applied also to the four-stage binary counter BC1, BC2, BC4 and BC8, so that the signal elements in the address may be counted, and the single-error correction encoding may be thereby controlled. Each of the stages of this four-stage binary counter is set to the 0 condition as the first signal element of the train is read out to the line. When any stage of the four-stage counter is in the 0 condition it enables its respective connected gate G1, G2, G4 or G8. Since each stage of the binary counter is in its 0 condition when the first signal element is sent out to the line, each of gates G1, G2, G4 and G8 will be enabled at this time. If the first signal of the train is a 1 condition signal, it will pass through each of gates G1, G2, G4 and G8 and be counted by the single stage binary counters BC'1, BC'2, BC'4 and BC'8 connected individually to each gate. The count in the four-stage counter will advance by one as each successive shift pulse moves each succeeding element in the signal train to the line. Counting stage BC8 will be in the 0 condition and will enable its gate G8 for the entire interval while the first eight signal elements are passing to the line. Then stage BC8 shifts to the 1 condition and blocks further passage therethrough during the succeeding eight time slots. All 1 condition signal elements in the first eight positions of the first parity group will therefore be applied to the single stage counter BC'8 which can therefore determine if the number of 1 condition signal elements is odd or even. It will be remembered that the signal in the eighth time slot is a 0 condition signal element which has no effect on the single stage counter BC'8. Counting stage BC4 will be in the 0 condition and will enable its gate G4 while signal elements in the second parity group, namely those in time slots 1 through 4, and 9 through 12 are passing to the line. Counting stage BC2 will be in the 0 condition and will enable its gate while signal elements in time slots 1, 2, 5, 6, 9, 10, 13 and 14 are passing to the line. Counting stage BC1 will be in the 0 condition and will enable its gate G1 while signal elements in time slot positions 1, 3, 5, 7, 9, 11, 13 and 15 are passing to the line. The stages of the four-stage binary counter will disable gates G'8, G'4, G'2 and G'1 except while the last of the signal elements in each of these groups is passing to the line. The last signal element in each of these groups was originally stored as a 0 so that the last stage of the shift register will be in a 0 condition at the beginning of these time slots. If the single stage counters determine that the number of 1 condition signal elements in the first seven positions in each individual parity group is odd, the 0 condition signal element in the final signal position in each group will remain undisturbed as it goes to the line. If, however, the number of 1 condition signal elements in the first seven positions of a particular group is even, the eighth and final signal element in that group will be changed to a 1 condition signal element just before it passes to the line from the shift register.

It will be observed that the countings of the 1 conditions for all of the parity groups are carried on simultaneously as the signal elements in the train are registered in the last stage of the shift register in sequence. Further it will be observed that the encoding for parity check is performed without delay as the signals are being transmitted and without requiring storage.

In order to control the insertion of the proper parity digits in the assigned positions in the train, binary counter stages BC1, BC2, BC4 and BC8 cooperatively inhibit gates G'8, G'4, G'2 and G'1 at such times as any one or more of these counter stages are in their 1 conditions. With respect to gate G'8, for instance, at least one of the three counting stages BC1, BC2 and BC4 connected to gate G'8 will be in its 1 or disabling condition during each of time slots 1 to 7. They will all be simultaneously in the 0 or enabling condition only during time slot 8. Gate G8 will be enabled only during time slots 1 to 8. Therefore nothing can pass to the last stage of the shift register through gate G'8 at any other time than during time slot 8.

If the number of 1's counted by the single stage counter BC'8 is even, a pulse will be passed through gates G'8 and GC during the eighth signal slot to produce the 1 signal condition in this position in the train. If the number of 1's among the first seven time slots is odd, gate G'8 will be inhibited. The 0 condition which was inserted in stage 6 of the shift register, before parallel read-in of the address, and which remained undisturbed in the 0 condition because no pulse was applied to this stage during parallel read-in, will pass through stages 7 to 13 of the register and out over the line in the eighth time slot as the parity checking element.

The other three parity checking circuits forming part of the single-error correcting circuit operate in a manner generally corresponding to that described for the first binary checking circuit which comprises gate G8, counter BC'8 and gate G'8. In the case of the second parity checking circuit, comprising gate G4, counter BC'4 and gate G′4, binary counter stages BC1, BC2 and BC8, shown connected to the lower side of gate G′4, will prevent gate G′4 from passing a pulse at any time except during time slot 12. A pulse will then be passed through gate G′4 if the count of single stage counter BC′4 is even and will be prevented from passing if it is odd. The pulse if passed will also pass through gate GC to the last stage of the shift register to fill the twelfth time slot. Otherwise, the 0 condition will pass from the shift register to the line to fill the twelfth time slot. The other two parity checking circuits will operate similarly to properly encode the other two groups for single-error correction.

In checking for double-error detection an even parity check is applied to the whole train as a unit. All of the signal elements of the train are directed through single stage binary counter BC′0 to gate G′0. The counter BC′0 determines whether the number of 1's is odd or even. The four-stage binary counter BC1, BC2, BC4 and BC8 disables gate G′0 each time any of its four stages is in the 1 condition. The only time during which gate G′0 is not disabled by the four-tage counter is during the 16th time slot. If after the 15th time slot the single stage counter BC0 is in the 1 condition, indicating that the first 15 time slots contain an odd number of 1's, a 1 signal condition will be passed through gates G′0 and GC to the line to fill the 16th time slot to make an even number of 1's in the entire 16 element address train. This will be employed in making the double-error detection check. In making the double-error parity count the 1 condition signal elements produced as necessary for single error correction are required to be counted. It is one of the functions of gate GC to direct these to counter BC′0. The present circuit includes an arrangement for applying a simple parity check to the intelligence permutations or words following the address. Each of these has twelve elements to which a thirteenth element is added for parity check. Gate GD controls the insertion of a 1 condition in the 13th time slot if required by a word. The GC gate directs the final parity bit to the 16th time slot in an address.

Refer now to FIG. 30 which shows a block diagram of a receiver arranged to cooperate with the transmitter described in the foregoing. The operation of the receiver will be described generally with relation to FIG. 30 in anticipation of the detailed description to follow hereinafter.

The signals after passing through the radio transmitter at the transmitting station are received by a plurality of receivers. It is assumed that these are radio receivers and that each is in an individual mobile unit, such as in an individual airplane.

The incoming signals are received through the conductor Signals, shown at the left in FIG. 30. The first 13 signal elements of the train are impressed successively on the left-hand stage of the shift register and are transferred progressively toward the right, one stage for each time slot, in the shift-register to fill the positions designated 3 to 15 inclusive. Each of these signal elements, as it is being received, is impressed also through the Gate Driver simultaneously on gates G1, G2, G4 and G8 which gates cooperate in the single-error correction circuit. Each of them is also impressed on single counter stage BC′0 in the double-error detection circuit. The shifting of the incoming signal elements from stage to stage of the shift register is under control of shift pulses incoming from the shift pulse circuit shown at the right in FIG. 30. The shift pulses are applied also to a four-stage binary counter BC1, BC2, BC4 and BC8 which counts the pulses. The shift pulses are applied also through a shift gate which stops the shifting under control of the four-stage binary counter after the shift register is filled. After the register is filled signal elements 14, 15 and 16 pass through the gate driver. Pulses 14 and 15 are effectively applied to the single-error correction circuit. Pulses 14, 15 and 16 are effectively applied to the double-error detection circuit. Each of the four stages BC1, BC2, BC4 and BC8 of the four-stage binary counter performs the same function as described in relation to the transmitting block diagram, FIG. 29. That is to say, each one of them enables its directly associated gate G1, G2, G4 and G8 at the same counts as in the transmitter. Each of gates G1, G2, G4 and G8 will permit the incoming 1 signal conditions in its respective group to pass to its respective single-stage binary counter BC′1, BC′2, BC′4 or BC′8.

Before the start of operations each of the single-stage binary counters BC′1, BC′2, BC′4 and BC′8 will be set to the 1 condition and counter BC′0 will be set to the 0 condition.

After the entire 16 signal elements have been received, one of four conditions must prevail, as follows:

(1) The address contains no error. Then all of the single stage binary counters BC′1, BC′2, BC′4 and BC′8 are in the 0 condition. The reason for this is that counters BC′1, BC′2, BC′4 and BC′8 each started at the 1 condition and since the four pulse groups which are directed to each of these counters, if correct, as assumed, each contains an odd number of 1 condition signal elements, each will again have attained the 0 condition. Stage BC′0 will also be in the 0 condition. The reason for this is that stage BC′0 was originally set to the 0 condition and the entire 16 signal elements in the address train, if correct, as assumed, when received contain an even number of 1's.

The potential corresponding to the 0 condition prevailing in each of stages BC′1, BC′2, BC′4 and BC′8 is applied in parallel from a conductor extending from the left side of each of the rectangles representing these counters to gate G0, tending to enable gate G0. If gate BC′0 is also in the zero condition it cooperates in enabling gate G0 and permits a read-out pulse to pass through the gate. This read-out pulse is applied in parallel to 11 read gates shown in a horizontal array above the shift register. Each of the 11 stages of the shift register which contains the address intelligence is connected to an individual element in the read-out gates. The read gates are thus enabled and the 11 elements of the address are applied to an address recognizer described in the foregoing Davey et al. application. The incoming address is compared in the address recognizer with an individual address assigned to each plane and if the addresses correspond, the permutations defining the five words containing the intelligence, which follow the address, are accepted.

(2) The address contains one error. Then gate BC′0 is in the 1 condition, as there will be an odd number of 1's in the 16 element train, and one or more of counters BC′1, BC′2, BC′4 and BC′8 will be in the 1 condition, for reasons which should be understood from the foregoing. It will be observed from the drawing that each of the 11 read gates, shown in the upper portion of FIG. 30, is connected to the output of binary counters BC′1, BC′2, BC′4 and BC′8. Each of these read gates is connected to these single-stage binary counters in a unique manner. Extending from the right-hand and left-hand side of each of these single-stage counters are conductors designated 1 and 0, respectively, on each of which a different potential condition is impressed when the counter is in the 1 and 0 condition, respectively. Reference to the conductors interconnecting read-in gate 3 with the four single-stage binary counters shows that it is connected to the 1 condition conductors of stages BC′1 and BC′2 and to the 0 condition conductors of each of the other stages. This arrangement corresponds to the binary number 3 in a four-stage binary array. Read gate 15, for instance, is connected to the 1 condition conductor of each of conductors BC′1, BC′2, BC′4 and BC′8. This also corresponds to the binary number 15. Each of the other read gates is similarly arranged. That is to say, the 0 condition and 1 condition conductors, from the four single-stage binary counters connected to each individual one of the read gates, corresponds to the number of the read gates expressed in a four-digit binary system. As a result of the foregoing, the particular read gate which is designated by the cooperative binary condition of counters BC'1, BC'2, BC'4 and BC'8 causes that digit whose number corresponds to the numerical value at which the binary counters are set to be inverted as it is read into the address recognizer. If this digit was received as a 0 it is read into the recognizer as a 1 and vice versa. This is accomplished by using a dissimilarity circuit, sometimes called an "exclusive-or gate," as a read-out gate. The mode of operation of this gate expressed in switching algebra notation is:

$$D = C(A'B + AB')$$

where D is the output, which will be a 1 or a 0, C is the read-out pulse, B is the signal applied by the matrix, which is 1 for an indicated error and 0 for no indicated error and A is the received digit, either a 1 or a 0. A prime affixed to A or to B means that a 1 is changed to a 0 and vice versa. Thus the received error is corrected.

Scrutiny of the expression $(A'B+AB')$ discloses that the signal (A) is accepted as received when no error has been detected $(B=0)$ but the signal (A) is inverted (to A') when an error has been detected $(B=1)$.

The 1 condition of counter BC'0 enables gate G0 permitting the read-out pulse to be applied to the read gates when there is a single error.

(3) The address contains two errors. Then counter BC'0 indicates 0 and one or more of counters BC'1, BC'2, BC'4 and BC'8 indicates 1. Gate G0 is inhibited consequently the read-out pulse cannot pass through gate G0 and the address is not passed into the address recognizer.

(4) The address contains three or more errors. In this case counter BC'0 will indicate 1 or 0 depending upon whether an odd or an even number of errors has occurred. When it indicates 1, read-out will occur and some digit will be inverted during read-out, but the address read into the address recognizer will be erroneous. When counter BC'0 indicates 0 read-out will be inhibited unless the erroneous digits are such as to cause each of counters BC'1, BC'2, BC'4 and BC'8 to indicate 0.

Refer now to FIG. 34 which shows the time sequence of events. Horizontal row number 1 in FIG. 34 represents the time slot number of the signal element in the 16-element train. Row number 2 indicates the address value of each one of the digits. It was explained in the foregoing that with the present arrangement employing eleven digits in a binary code for the address it is possible to identify each of 2048 receiving units. Row 2 indicates the address value of each one of these eleven digits when a 1 condition signal element appears in the particular position in the train. It will be observed that the digits in positions 8, 12, 14, 15 and 16 have no address value for reasons which should be apparent from the foregoing. Row 3 indicates the error position checking number assigned to each of the sixteen time slot numbers. The fourth horizontal row in FIG. 34 indicates a signal train which, it is assumed, has been received. When it is at its lower and upper level, it indicates that the signal element in the corresponding position is a 0 and a 1 condition signal element, respectively. Where the line remains at the same level during successive intervals, it indicates that the signal remains in the condition shown during the successive intervals. It will be observed that in time slot number 6, corresponding to error checking position number 10, two signal conditions are indicated, both the 1 signal condition and the 0 condition, which latter condition is shown in dotted lines. This represents that the signal element as transmitted was a 1 condition signal element and that it was erroneously received as a 0 condition signal element.

Horizontal rows 5, 6, 7 and 8 in FIG. 34 show the opened and closed conditions of gates G1, G2, G4 and G8, respectively. Each gate is in the opened and closed conditions in the positions in which the line representing each respective gate is at its upper and lower level respectively.

Horizontal rows 9, 10, 11 and 12 in FIG. 34 indicate the odd and even counting conditions of single-stage binary counters BC'1, BC'2, BC'4 and BC'8, respectively, in response to the imposition thereon of the 1 condition signal elements in the received train, shown in line 4, through the gates G1, G2, G4 and G8, respectively, when the respective gate is opened. Again the dotted lines in each of the rows for counters BC'2 and BC'8 show the effect of the assumed error in the train position corresponding to checking number 10.

In interpreting the information in FIG. 34 it should be remembered that counters BC'1, BC'2, BC'4 and BC'8, as explained, are each originally set in the 1 condition. It should be remembered also that a 1 condition signal cannot pass to any counter unless the corresponding gate is opened at the time and counting by the counter can take place only if a 1-condition signal element is being received when the gate is opened. It will be observed that counters BC'1 and BC'4 are not affected by the error, because gates G1 and G4 are each closed at the time that the digit in the position which is in error is counted. It will be observed, also, that the effect of the non-reception of the true 1 condition signal element by counters BC'2 and BC'8 is to reduce the count of each by 1 and to place each in the 1 condition at the termination of the counting by each. It will be observed also that the sum of the values of the two counters which are adversely affected by the error in the train is 2+8 or 10 which is equal to the error position checking number of the position in which the error appears.

Horizontal row 13 of FIG. 34 shows the counting condition of counter BC'0, which counts the number of 1-signal conditions in the entire 16-signal element of the entire train. As explained the counter BC'0 is first set in the 0 condition. All of the 1-signal elements in the train are directed to this counter. The counter changes conditions each time a 1-signal condition appears in the train. The train countings are indicated by the changes in conditions between the 0 and 1 condition or between the even and odd levels. The full line indicates the transitions which would have been made if there was no error. There would then have been an even number of transitions with the condition of the counter finally ending in the 0 or even count conditions. Since one 1 condition signal element was erroneously changed to a 0 condition there are but seven transitions in the counter which finally ends in the erroneous 1 or odd condition.

The present circuits employ p-n-p type transistors widely to perform the required functions. The grounded emitter connection is employed generally. In this arrangement when a negative current is applied to the base, the transistor is in the current carrying, hereinafter called the ON condition, and when a ground is applied to the base, the transistor is in the non-current carrying, hereinafter called the OFF condition. Three basic circuits, known in the art as logic circuits, are formed with this connection. These are (1) the parallel circuit shown in FIG. 31, (2) the series circuit shown in FIG. 32, and (3) the flip-flop circuit shown in FIG. 33.

Refer now to FIG. 31. The parallel circuit consists of two or more transistors such as transistors 1 to 6, each having a collector connected to a common node 10 which is connected through resistor 9 to a source of negative battery 8.

The emitter of each of transistors 1 to 6 is connected to ground. The base of each of transistors 1 to 6 may be connected at times to ground and at times to a source of negative potential. This circuit gives a ground output at terminal 10 when any one of transistors 1 to 6 is ON, and a negative current output when none of transistors 1 to 6 is ON. Thus transistor 7 can be ON and apply a ground output to terminal 13 only when none of transistors 1 to 6, connected to terminal 10, is ON. At other times obviously negative battery from source 11 is connected through resistor 12 to terminal 13.

Figure 12:
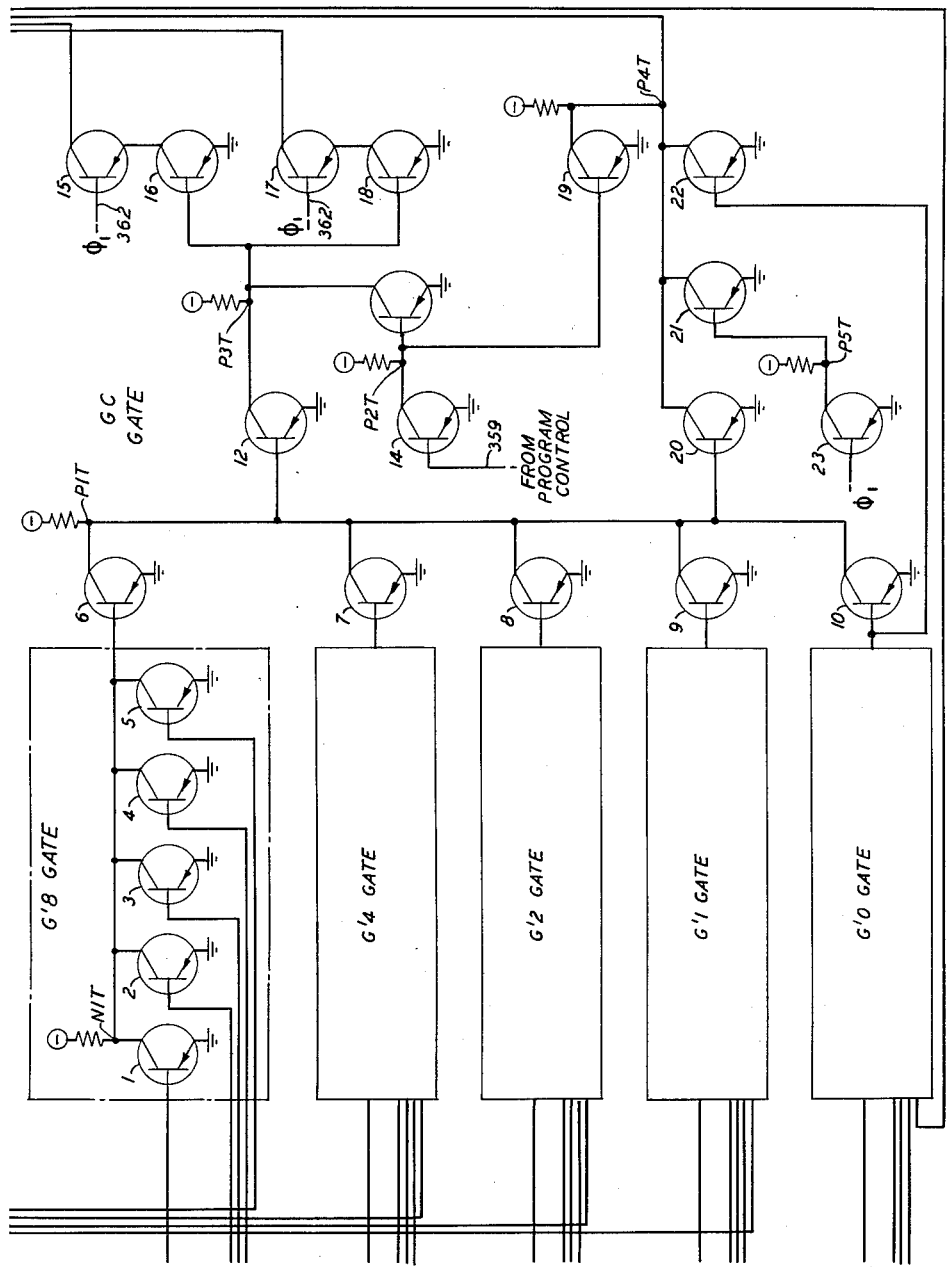

Parallel circuits, such as that shown in FIG. 31, are used in two ways in the present arrangement. In the case of gates G'0, G'1, G'2, G'4 and G'8, shown in FIG. 29, action is taken when all transistors in the gates, the details of which are shown in FIG. 12, are in the OFF condition. The other manner in which this type of parallel circuit is used is in the arrangement of gate GC shown in FIG. 29, the details of which are shown also in FIG. 12. In this arrangement action is taken when any one of the transistors, corresponding to transistors 1 to 6 in FIG. 31, is ON.

Refer now to FIG. 32 which shows the series circuit. The series circuit consists of two transistors connected as shown in this figure. If negative battery is connected to the base of transistor 1, ground is effectively connected to the emitter of transistor 2. If simultaneously negative battery is connected to the base of transistor 2 ground will be effectively connected to terminal 16. Ordinarily terminal 16 is effectively connected through resistor 15 to a source of negative battery 14. It is apparent, therefore, that the condition applied to terminal 16 is effectively changed only when negative battery is connected simultaneously to the base of each of transistors 1 and 2. Terminal 16 may be connected to the base of a third transistor having its emitter grounded and its collector connected through a resistor to negative battery. This third resistor will ordinarily be in the ON condition. When each of transistors 1 and 2 is in the ON condition the third transistor will be switched off.

Refer now to FIG. 33 which shows the flip-flop circuit. The flip-flop circuit is a two-state device consisting of two transistors, 1 and 2. The base of transistor 1 is connected to the collector of transistor 2 at terminal 22. Correspondingly the base of transistor 2 is connected to the collector of transistor 1 at terminal 19. Negative battery 20 is connected through resistor 21 to terminal 22, which connects to the collector of transistor 2 and the base of transistor 1. Negative battery 17 is connected through resistor 18 to terminal 19 which connects to the collector of transistor 1 and the base of transistor 2. When either transistor is conducting its collector is effectively grounded and the base of the other transistor is clamped to ground. The flip-flop circuit is switched to the opposite state by grounding the terminal which is supplying current to the base of the transistor which is in the ON condition. For instance, with negative battery from source 20 connected through resistor 21 to the base of transistor 1, transistor 1 is ON. When transistor 1 is ON terminal 19 and the base of transistor 2 are effectively grounded so that transistor 2 is in the OFF condition. If ground is applied from point B through terminal 22 to the base of transistor 1 which is in the ON condition, transistor 1 will be switched to the OFF condition. This effectively disconnects ground from terminal 19 and negative battery from source 17 through resistor 18 is applied to the base of transistor 2 placing transistor 2 in the ON condition.

Figure 35:
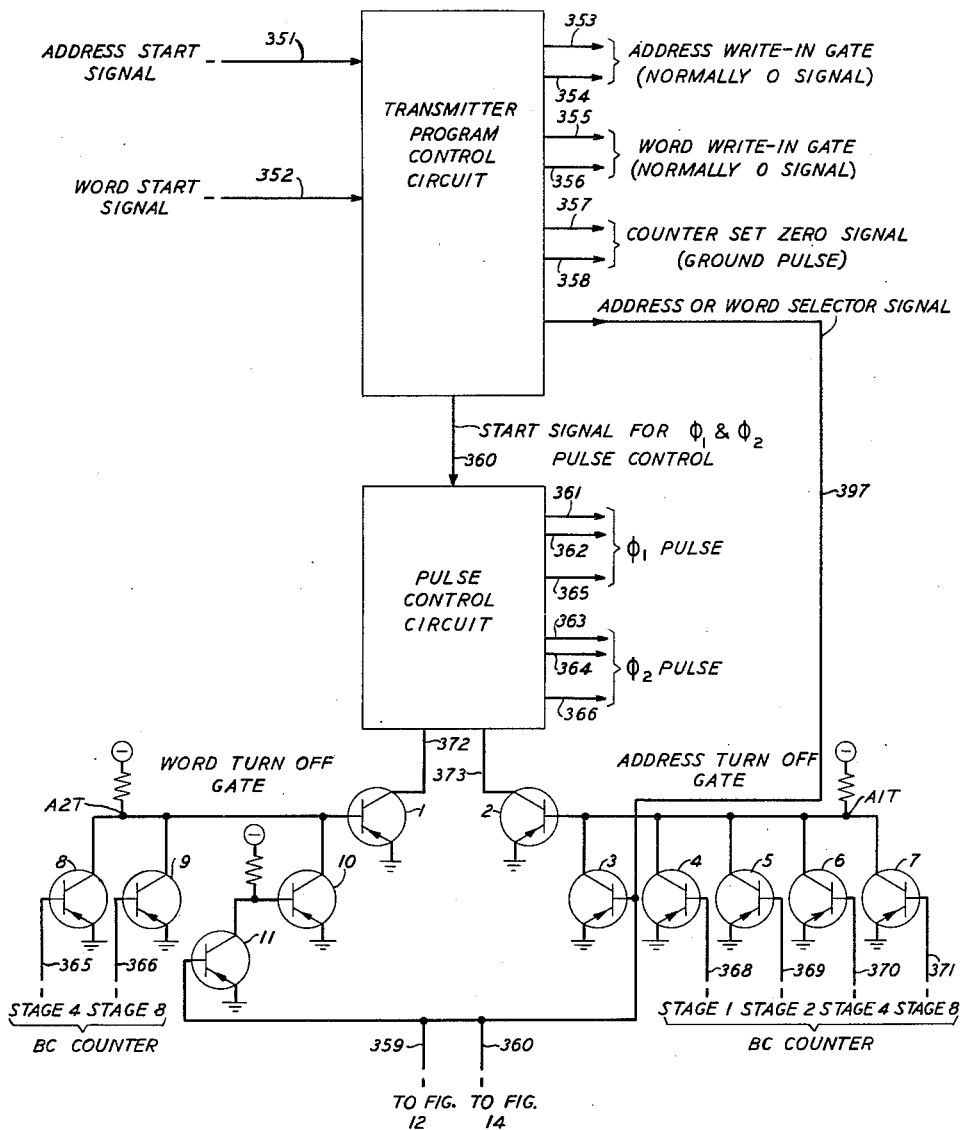
FIG. 35 shows a program control circuit for the transmitter.

Refer now to FIG. 35 which shows the program control and pulse control circuits represented by captioned rectangles which are used in controlling the programming of the system.

The program control circuit, FIG. 35, provides the signals of the proper magnitude and duration and in the proper sequence to actuate the component circuits for encoding the permutations at the transmitter. At the beginning of an encoding program an address start signal is applied through conductor 351, shown in the upper left-hand portion of FIG. 35, to the program control circuit. At the beginning of the first signal element of each of the permutations defining the five "words" in a train following the address, a word start signal is applied through conductor 352, shown in the upper left in FIG. 35, to the program control circuit.

The program for single-error correction and double-error detection is as follows. Before the arrival of the address start signal the program control circuit connects negative current to the write-in gates.

*Step 1.*—Upon the arrival of the address start signal or the word start signal the negative potential applied to the address gates is changed to a ground condition.

*Step 2.*—A negative current is provided for an address or word selection signal that remains connected throughout a cycle. The normal 0 condition signal is changed from ground to the normal negative current condition. A ground signal is provided from the counter "Set 0."

*Step 3.*—A four-microsecond phase one negative current pulse is provided. A four-microsecond phase one prime pulse, which is ground, is provided.

*Step 4.*—A seven-microsecond negative current phase two pulse is provided.

*Steps 5 through 19.*—Steps 3 and 4 are each repeated fifteen more times. The phase two pulse of step 19 sets the four-stage binary counters BC1, BC2, BC4 and BC8 in such condition that it activates a turn-off gate to turn off the address program control.

The turn-off gates for the transmitter, shown in FIG. 35, are parallel transistor circuits such as described in the foregoing. They are employed to switch off the program at the end of a complete cycle. The address turn-off gate, comprising transistors 2 through 7, sends a ground signal through conductor 373 into the pulse control circuit at the end of the address, when the four-stage binary counter has counted to 16 and an address selector ground signal is impressed though conductor 397 on the address gate. The word turn-off gate comprises transistors 1 and 8 through 11. It sends a ground signal through conductor 372 into the pulse control circuit after the completion of the encoding of the address and each time thereafter that the four-stage binary counter has counted to 13 and the word selector signal impressed on conductor 397 is negative current.

*Program for single-error detection*

*Step 1.*—The normal 0 condition signal, which is negative current, is switched to a ground signal.

*Step 2.*—A ground signal is provided for an address or word selector signal that remains on throughout the cycle. The normal 0 signal is returned to the normal negative ground state.

*Step 3.*—A negative ground phase one pulse of four microseconds is provided.

*Step 4.*—A negative current phase two pulse of seven microseconds is provided.

*Steps 5 through 16.*—Steps 3 and 4 are each repeated twelve more times.

On Step 16 the turn-off gate is activated and stops the control unit until it receives another start signal.

*Write-in gates*

Figure 2:
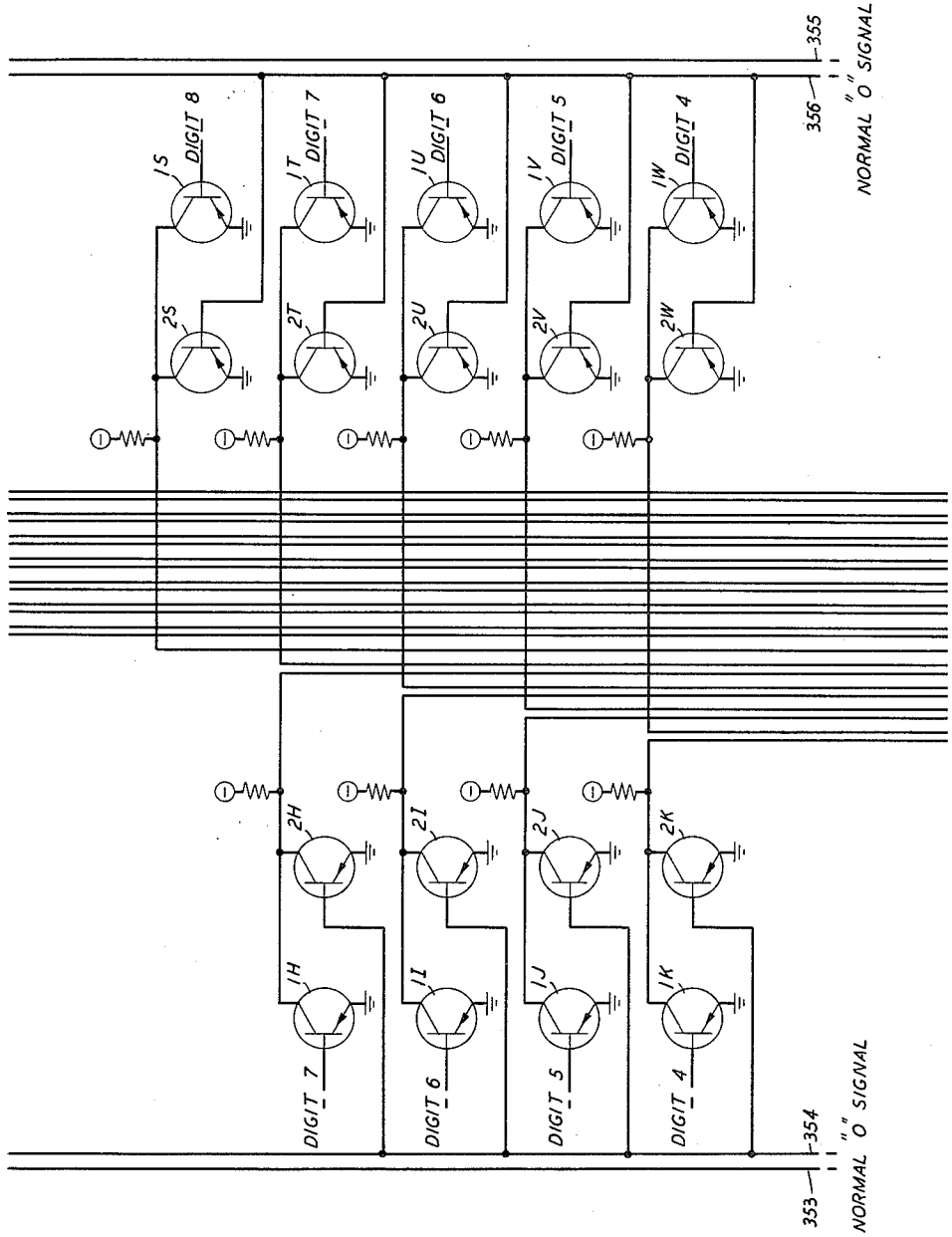

Refer to FIGS. 1 and 2 which show the write-in gates. The write-in gates perform the function of inserting or "writing-in" the address and words in the shift register. Each gate controls an individual stage of the register and consists of two transistors arranged to form a parallel transistor circuit as described in the foregoing. The left-hand double vertical array of transistors shows the write-in gates for the address and the right-hand double vertical array of transistors shows the write-in gates for the words. The left-hand array comprises twenty-two transistors arranged in two vertical rows of eleven each. Each gate comprises two transistors arranged in a horizontal row, such as transistors 1K and 2K which control stage 1 of the shift register when the address is being written in. The address gate has eleven such pairs of transistors each one connected individually to a separate stage in the shift register. It has been explained that the shift register has thirteen stages. It has been explained also that when the address is read in two of the stages are left blank. The write-in gates for the words are similar to and operate in the same manner as the write-in gates for the address. There are twelve write-in gates for the words, since each word comprises twelve intelligence determining signal elements. The twelve elements of the word are written into stages 2 to 13 of the shift register. The first stage is left blank when words are written into the register.

At the bottom left in FIG. 2 are shown two conductors 353 and 354 incoming from FIG. 35, each of which connects in parallel to the base of a separate group of transistors 2A to 2K. Conductor 353 connects in parallel to the base of each of transistors 2A through 2F. Conductor 354 connects in parallel to the base of each of transistors 2G through 2K. Before address write-in, negative battery is connected in the pulse circuit, FIG. 35, to each of conductors 353 and 354. As a result of this each of transistors 2A to 2K is in the conducting condition. Ground is therefore connected in each gate to the terminal corresponding to terminal AN in the top gate.

When an address is to be read into the shift register, a permutation of negative current conditions and ground conditions is applied in unison to the bases of transistors 1A to 1K. Simultaneously ground is connected to each of conductors 353 and 354. Each transistor, to the base of which ground is connected, will be cut off. This will effectively disconnect ground from its collector. As will be understood from the foregoing description of the operation of parallel transistor circuits, when ground is applied to the base of each of the transistors arranged in a parallel circuit neither can conduct and ground, which is connected to terminal AN when either transistor conducts, is disconnected therefrom. For each 1 condition in the address permutation, ground is applied to the base of a corresponding one of transistors 1A through 1K. Each of transistors 2A through 2K has ground applied to its bases when the address is to be read into the shift registers. When the base of both transistors in any gate is grounded, ground will be disconnected from terminal AN therein and negative battery will be connected through terminal AN to the corresponding individual stage of the shift register. If while any of transistors 2A through 2K, such as transistor 2A is in the non-conducting condition, a negative battery condition is applied to the base of its respective mate, such as transistor 1A, as a 0 signal, the transistor such as transistor 1A will be placed in the conducting condition and a ground will be applied to the terminal, such as terminal AN. This will produce no effect in a connected shift register stage. The write-in gates for the words operate in the same manner as explained for the write-in gates for the address.

*Shift register*

Figure 3:
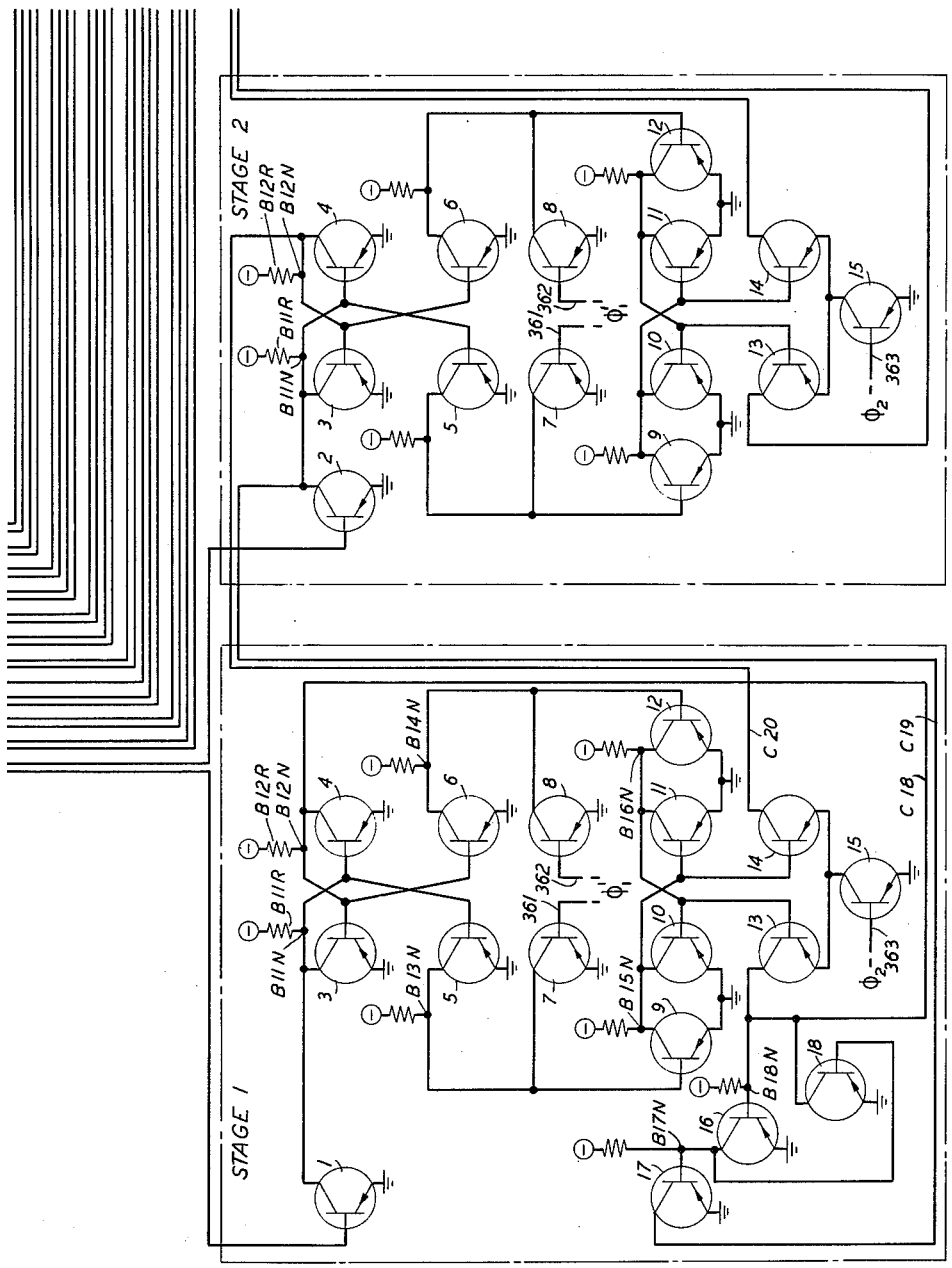
FIG. 3, FIG. 8 and FIG. 13 show the transmitting shift register.
Figure 8:
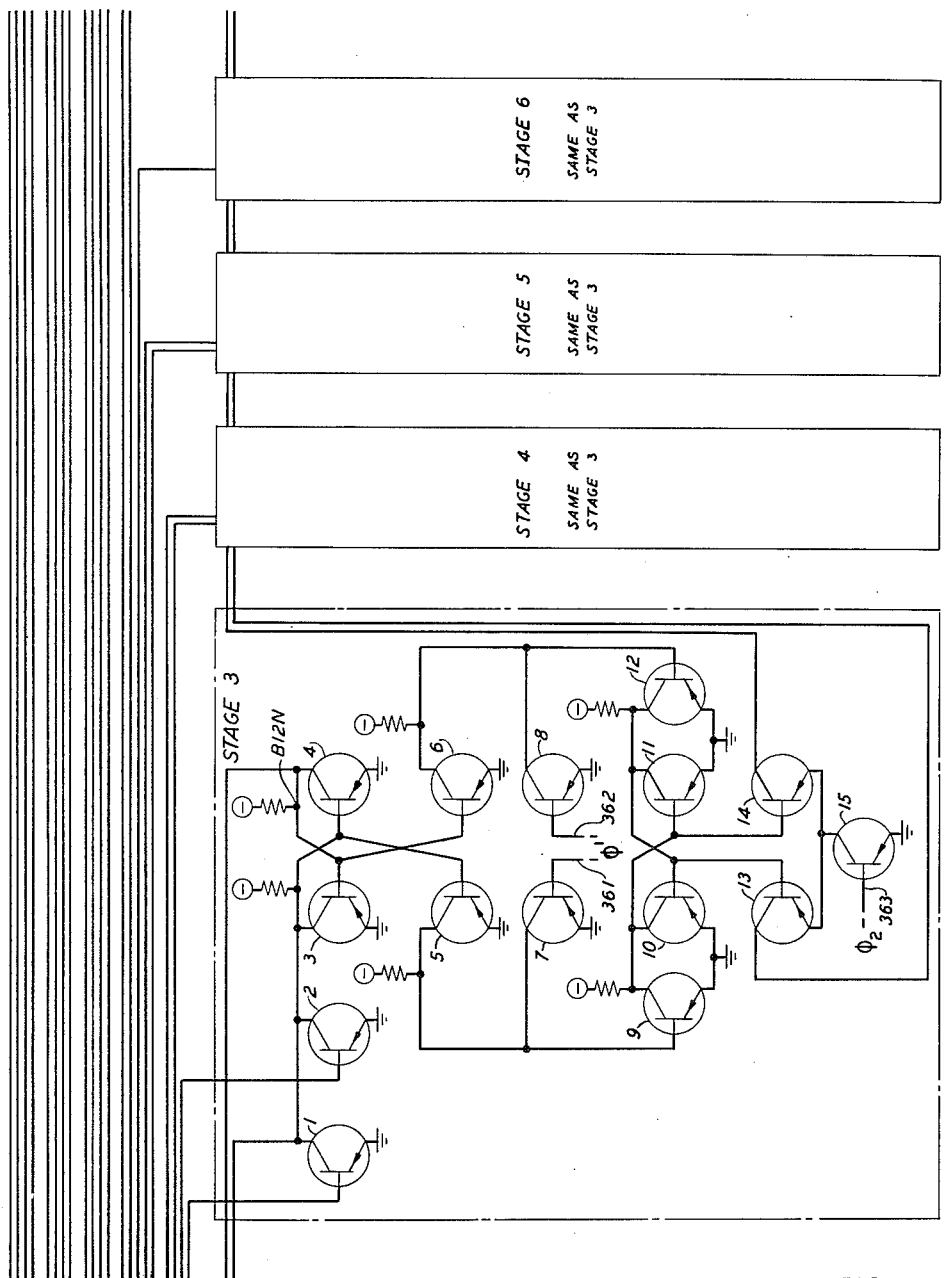
Figure 13:
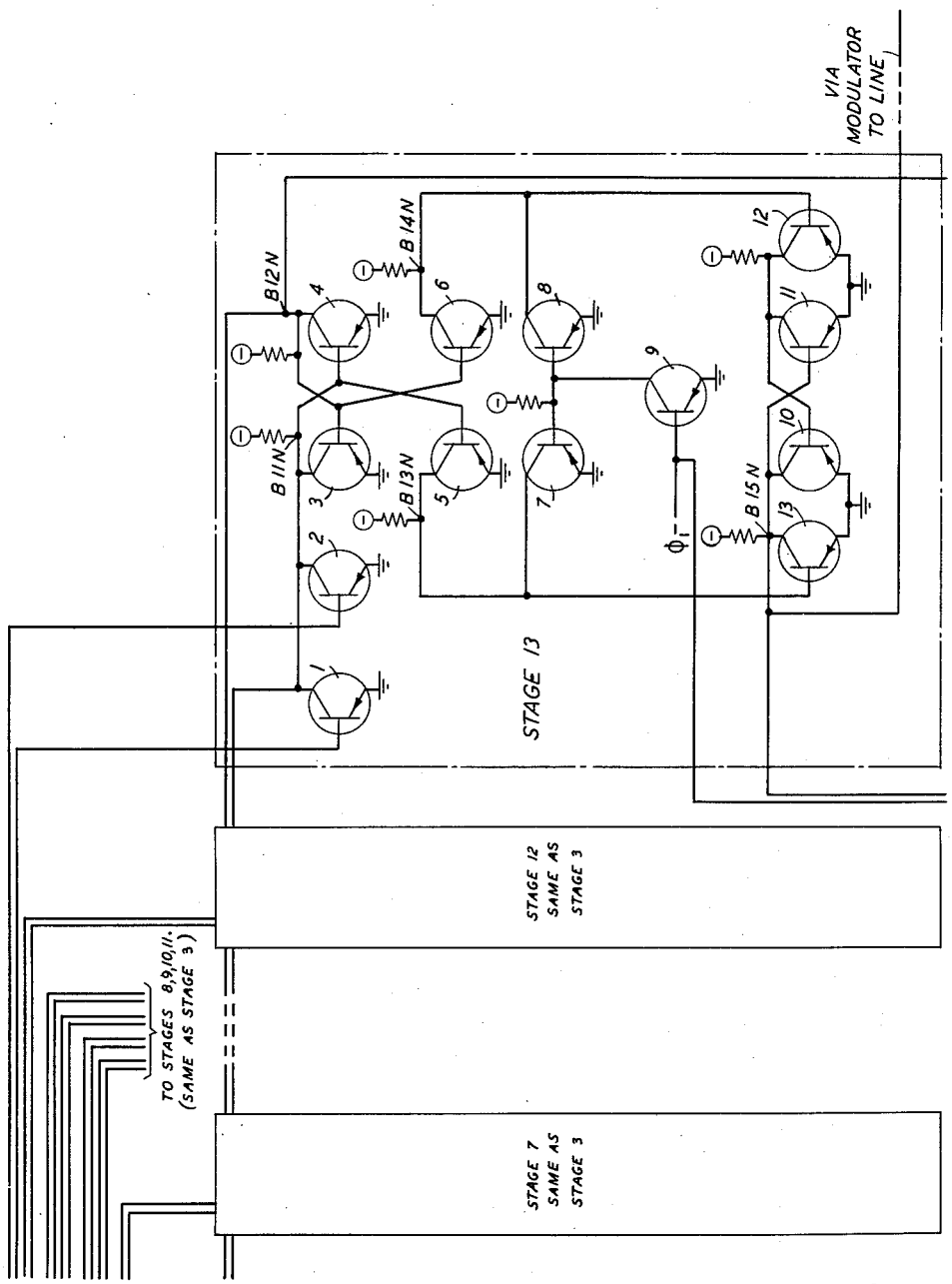

The shift register, shown in FIGS. 3, 8 and 13, is a double rank 13-stage register. Except for minor differences, to be explained hereinafter, the stages are identical. Each stage consists of two flip-flop circuits, arranged at two levels or ranks, and associated gating circuits. The data is fed into all stages of the register simultaneously in parallel and is read out sequentially in series, one element at a time. The state of the flip-flop is indicated by which of transistors 3 and 4 in the upper level is conducting. When transistor 3 is conducting the flip-flop is in the 1 or ON state and when transistor 4 is conducting it is in the 0 or OFF state.

Before read-in at the start, all stages of the shift register are in the 0 condition, for reasons to be explained. The shift register is responsive to either the address write-in gate or the word write-in gate at different times. When controlled by the address gate the collector of each of 11 transistors, transistors 2A–2K in the address gate is connected individually to the base of a transistor, such as transistor 1, in 11 of the 13 stages of the shift register. No connection is required from the address gate to a transistor corresponding to transistor 1 of stages 2 and 6 of the register, as the digits occupying corresponding position in the train are used for single-error checking. Therefore stages 2 and 6 of the shift register are not equipped with a transistor corresponding to transistor 1 of the other stages. Stage 1 of the register is not employed in word write-in, as each word has only 12 intelligence determining signal elements and, as the register has 13 stages, the 12 signal elements of the word are read into the last 12 stages or stages 2 to 13. Each stage of the register except stage 1 has an individual transistor 2, which is employed for writing an element of each word into the register. For word write-in the collector of each of the 12 transistors 2L through 2W is connected individually to the base of a transistor corresponding to transistor 2 in stage 2 of the register.

Before the start of transfer of the address or a word into the register, each of the individual gates of the address and word read-in gates is applying ground to the base of its respective transistors 1 or 2 in the register for reasons explained.

In each stage of the shift register to which an address signal element is applied, the base of the transistor corresponding to transistor 1 normally has ground applied thereto. It remains grounded unless a 1 condition signal is to be transferred into the stage. Each stage as mentioned is in the 0 condition before write-in. When in the 0 condition, negative battery is connected in all stages from source B11, shown in FIG. 1, through resistor B11R and terminal B11N to the base of transistors 4 and 5. Transistors 4 and 5 will be ON for the 0 condition, grounding terminals B12N and B13N. Ground is applied from terminal B12N to the base of transistors 3 and 6, each of which is therefore OFF for the 0 condition. The 0 condition in the upper rank of the register is transferred to lower rank in the following manner. Transistors 7 and 8 are each normally OFF as each has negative battery normally applied to its base. A phase one prime potential condition, which is ground for a period of 4 microseconds duration is applied simultaneously to the bases of transistors 7 and 8 in all shift-register stages to shift the registration from the upper to the lower stage. In response to this, both transistors 7 and 8 are placed in the OFF condition. When transistors 6 and 8 are OFF negative battery from terminal B14N is applied to the base of transistor 12 turning it ON. When transistor 5 is ON terminal B13N is grounded. When transistor 7 is OFF, ground from terminal B13N is applied to the base of transistor 9 which is then OFF.

When transistor 12 is ON, ground from terminal B16N is applied to the bases of transistors 10 and 13 and they are OFF. With transistors 9 and 10 both OFF, negative battery from terminal B15N is applied to the bases of transistors 11 and 14. Transistor 11 is turned ON to register the 0 condition in the lower rank. The 0 condition is transferred to a succeeding stage as follows. Transistor 15 normally has ground applied to its base and is OFF. It is turned on in response to a phase two pulse, which is a negative pulse of 7 microseconds duration immediately following the phase one pulse. Transistors 13 and 14 are both OFF when transistor 15 is OFF. The phase two pulse grounds the emitters of transistors 13 and 14. For the 0 condition transistor 13 remains OFF as its base is grounded. Transistor 14 is in condition to be turned ON as negative battery is connected to its base. However, its collector is connected to terminal B12N in the succeeding stage. If succeeding stage is in the 0 condition, transistor 4 of the succeeding stage will be ON and terminal B12N therein will be grounded, so transistor 14 will not be turned ON. However, the 0 condition would then already be stored in the succeeding stage of the register and it would remain undisturbed for the duration of the next time slot. If the succeeding stage is in the 1 condition, under which condition transistor 3 therein is ON and transistor 4 is OFF, negative battery from terminal B12N in the succeeding stage will be applied to the collector of transistor 14 and transistor 14 will conduct grounding terminal B12N and the base of transistor 3 in the succeeding stage turning transistor 3 OFF. This will apply negative battery from terminal B11N, in the succeeding stage to the base of transistor 4 therein, placing it in the ON condition. This will set the succeeding stage in the 0 condition.

When negative battery from a terminal such as terminal AH in an address write-in gate is applied to the base of its respective transistor 1 in a shift register stage, transistor 1 is turned ON, grounding terminal B11N in that stage and shifting the upper rank of the stage to the 1 condition, by grounding the base of transistor 4. Transistor 2 in each stage of the shift register in which it appears, performs the same function on word write-in. If the signal in coming from any address or word write-in gate is a 0 condition signal, transistors 1 and 2 remain in the OFF condition and the 0 condition which is initially registered in each stage remains undisturbed.

To generalize the foregoing description of the operation in the shift register for the 0 condition in the upper level of the register, transistor 4 is ON and transistor 3 is OFF. In response to the phase one prime pulse, this condition is shifted vertically to the lower level of the register stage. Transistor 11 is ON and transistor 10 is OFF. Then in response to the phase two pulse the 0 condition is transferred to the upper level of the next stage of the register. Transistor 4 is turned ON and transistor 3 is turned OFF. When a 1 is stored in the upper level of the shift register, transistor 3 is ON and transistor 4 is OFF. In response to the phase one prime pulse, the conditions are shifted vertically to the lower level of the register, transistor 10 being turned ON and transistor 11 turned OFF. Then, in response to the phase two pulse, the condition is transferred to the upper level of the succeeding stage of the register, transistor 3 of the succeeding stage is turned ON and transistor 4 is turned OFF.

In transferring a 1 condition from stage 1 to stage 2, in response to the phase two pulse transistor 15 and 13 are turned ON. Transistor 16 is turned OFF. Negative battery is connected to the base of transistor 17. If there is a 0 condition in stage 2 before tranfer terminal B11N in stage 2 will have negative battery applied thereto. Transistor 17 will be turned ON and terminal B11N of stage 2 will be grounded which will apply ground to the base of transistor 4 turning if OFF which in turn turns transistor 3 ON. If stage 2 is in the 1 condition it will remain undisturbed when a 1 condition is to be transferred from stage 1 for reasons which should be understood from the foregoing.

Transistors 16 and 17 are provided to prevent interaction between stage 2 and stage 1.

Stage 1 of the register is equipped with a feature not required in the other stages. This is an arrangement whereby the upper level of stage 1 is always set in the 0 condition when the signal element which is set into it is read out to stage 2. It was mentioned in the foregoing, that before read-in of the address or a word, all stages of the shift register are in the 0 condition. To anticipate, this is achieved by setting the upper rank of stage 1 in the 0 condition when the digit read into it by parallel read-in is passed along to stage 2. After the upper rank of stage 1 is set in the 0 condition the 0 condition is transferred to the lower rank of stage 1 and then transferred to the upper rank of stage 2 in the next succeeding time slot. Stage 1 will be set to the 0 condition during each succeeding time slot and until the entire register is emptied. The 0 condition will be propagated from stage to stage until the last signal element of the address train or of a word train has passed out of the register. Any time slot in a train following the information signal elements which are reserved for checking elements will first be filled with the 0 condition signal elements until they are changed as necessary to meet the parity checking conditions after registration in the last stage of the transmitting shift register. When the last signal element of any train has passed out of the register, all 13 of its stages will be in the 0 condition and ready to receive the following address or word.

The upper rank of stage 1 of the shift register is set to the 0 condition after a signal element is transferred out of its lower rank in the following manner. If the lower rank of stage 1 is in the 1 condition at the time of transfer, transistors 15 and 13 will be ON. Transistor 16 will be OFF. Negative battery from terminal B17N will turn transistor 18 ON grounding terminal B12N and placing stage 1 in the 0 condition. If stage 1 is already in the 0 condition, transistor 13 will be OFF. Transistor 16 will be ON as negative battery will be applied to its base from terminal B17N. Transistor 18 will be OFF and terminal B12N and the 0 condition of the upper rank will remain unaffected. This 0 condition will then be transferred in sequence through stages 2 to 13 of the register during succeeding time slots until all stages are in the 0 condition.

The signal element in stage 6 of the register, corresponding to time slot 8, will be a 0 condition signal element before address write-in and it remains a 0 element after write-in and as it is propagated through the shift register and until it is changed, if necessary, by the parity check applied over its associated signal group before emergence from the last stage of the register. The three signal elements in time slots 14, 15 and 16 of an address train will preliminarily be the first three 0 conditions which are produced in stage 1 of the register, while the signal element of the address, transferred into stage 1 of the register from the address gate, is shifted along the succeeding three register stages. These will be changed to 1's before emergence from the last stage of the register, if required, by the respective parity checks.

In the case of word write-in, the stage 1 of the shift register will be originally in the 0 condition because the words as explained each have 12 intelligence determining elements followed by a single parity checking element in the 13th time slot. This 0 condition will pass through the register and will remain a 0 condition element or be changed to a 1 condition element as required by the simple parity check applied to each word in a manner to be explained.

Stages 1, 2, 3 and 13 of the shift register are shown in full in the drawings. Stages 4 through 12 are indicated by captioned rectangles and are each designated as being in accordance with stage 2 or stage 3, the difference being that stages 2 and 6 do not require a transistor such as transistor 1. They do not receive a signal element during address write-in. All stages except stage 1 have a transistor corresponding to transistor 2, to which the signal elements of a word are applied.

*The four-stage binary counter*

The four-stage binary counter is shown in FIGS. 4, 5, 6 and 7, one stage in each figure. Each stage contains two flip-flop circuits arranged in two levels or ranks generally similar to the two flip-flop circuits in each of the shift register stages. The flip-flop in the first stage BC1 of the four-stage counter, shown in FIG. 4, comprises transistors 2 and 3 in the upper level and transistors 20 and 21 in the lower level. The counting is controlled by pulses supplied from the pulse control and program control circuit, FIG. 35. Phase one pulses, phase two pulses and set 0 pulses are supplied from the circuit of FIG. 35 to each stage of the four-stage binary counter to control the counting. The phase one pulses are supplied from the pulse control circuit over conductor 361 to the base of transistor 13 in each stage of the counter. The phase two pulses are supplied from the pulse control circuit over conductor 364 to the base of transistor 14 in each of the stages. Ground pulses for set 0 are supplied from the program control circuit to the base of transistor 2 in each of the stages to set each stage to 0 prior to the start of counting. One ground pulse is supplied over conductor 357 just before the start of the counting of the signal elements of the address train and one ground pulse is supplied over conductor 358 just prior to the counting of the signal elements of each word in a message.

The upper rank in each counter stage of the four-stage counter is in the 0 counting condition when the right-hand transistor 3 is conducting and in the 1 condition when transistor 2 is conducting. The lower rank is in the 0 condition when transistor 21 is conducting and in the 1 condition when transistor 20 is conducting. The state of the upper rank of each of the four stages determines the total count. Inspection of the binary numbers from 0 through 7 in Table One reveals that in binary counting over any range each successive count changes the least significant 0 to a 1 and all less significant 1's to 0. For example, the binary number for 3 which is 0011 is changed to 4 which is 0100 by changing the 0 in the third least significant place to a 1 and changing the ones in the second and the first least significant places to zeros. This action is accomplished in the counter by gates activated by the state of the counting stage.

The counter operates in the following manner. The set 0 signal, a ground signal, is applied through conductor 357 or 358 to the base of transistor 2 in each stage. If any stage is in the 0 condition at such time the application of ground to the base of transistor 2 will be without effect as the base of transistor 2 would already be grounded. No action is therefore required in setting a stage to 0 when a stage is already in the 0 condition. If any stage is in the 1 condition, the application of ground to the base of transistor 2 therein will change the stage to the 0 condition by turning transistor 2 OFF, effectively connecting negative battery to terminal D2N. Transistor 3 is turned ON when transistor 2 is turned OFF. A negative battery phase one pulse applied to the base of transistor 13 in each stage grounds terminal D10N which turns each of transistors 11 and 12 OFF. When the upper rank of a stage is in the 0 condition transistor 10 will be OFF and transistor 9 will be ON. With transistor 12 OFF, negative battery from terminal D7N will be applied to the base of transistor 22 turning it ON. Ground from terminal D9N applied to the base of transistor 20 turns it OFF. Negative battery from terminal D8N applied to the base of transistor 21 turns it ON. Transistors 3 and 21 are, therefore, both ON for the 0 count. For a 1 count the counter operates in the reverse manner as should be understood from the foregoing.

The phase two pulse applied to the base of transistor 14 in each stage is used as a counting pulse. In response to the application of the phase two pulse to the first or least significant stage BC1 of the counter, FIG. 4, transistor 14 is turned ON and transistors 5 and 8 are turned OFF. Assuming that stage 1 is in the 0 condition at this time, it has been shown that transistor 21 will be ON. Terminal D9N will be grounded. This ground is applied to the base of transistor 6 which will be OFF. With transistors 5 and 6 both OFF, negative battery from terminal D1N is applied to the base of transistor 1 turning it ON and grounding terminal D2N. This ground is applied to the base of transistor 3 turning it OFF. Negative battery from terminal D3N is then applied to the base of transistor 2 turning transistor 2 ON to register the 1 condition in stage 1 of the register.

If stage 1 of the counter were in the 1 condition prior to the reception of the phase two count pulse, transistors 2 and 20 would be ON and transistors 3 and 21 would be OFF. Ground from terminal D8N would then be applied to the base of transistor 7, turning transistor 7 OFF. With transistors 7 and 8 OFF, negative battery from terminal D4N would be applied to the base of transistor 4 turning it ON and grounding terminal D3N. Ground from terminal D3N would be applied to the base of transistor 2 turning it OFF. This would turn transistor 3 and subsequently transistor 21, both ON, to register the 0 condition in register stage BC1.

Figure 4:
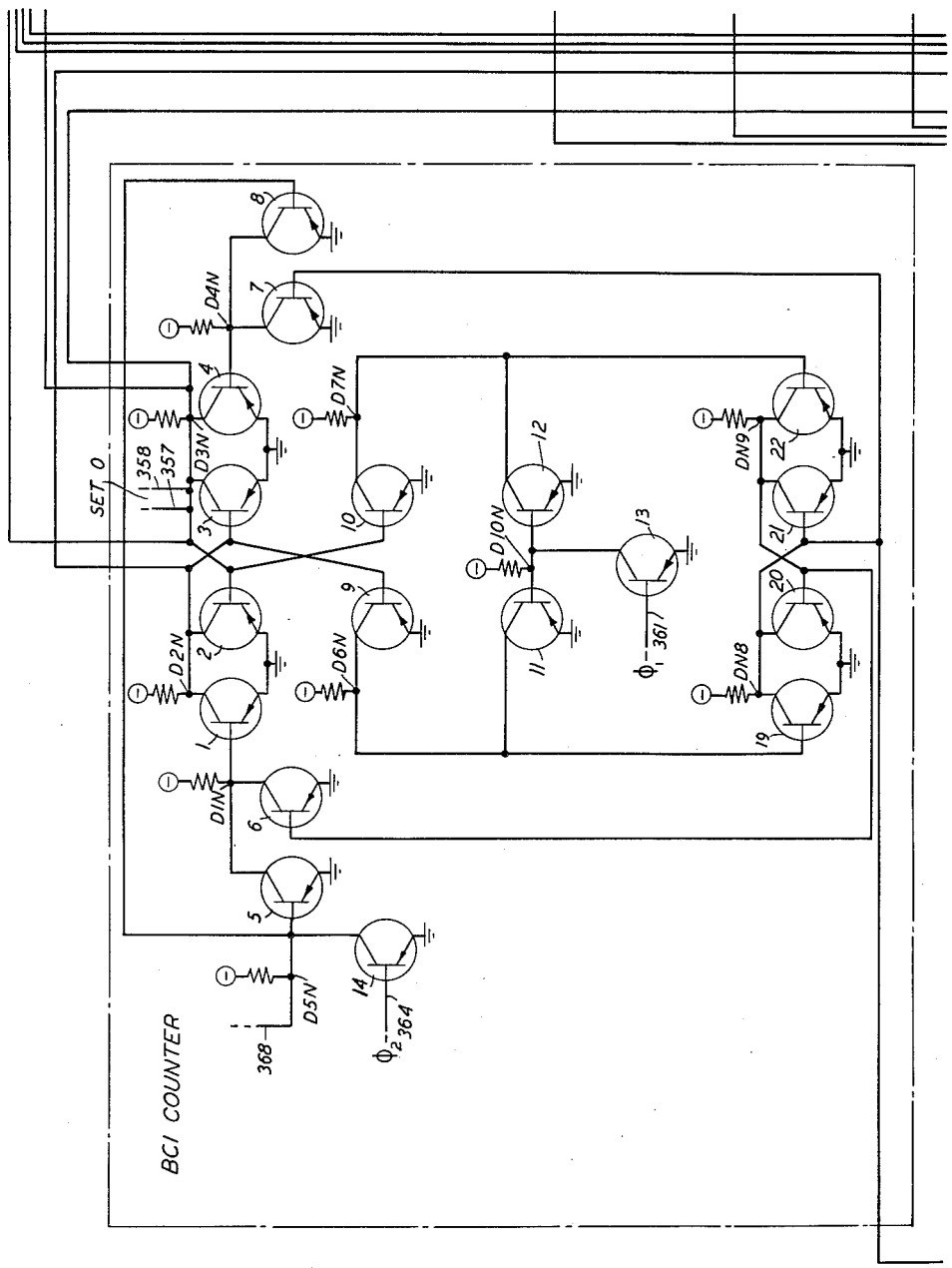
FIGS. 4, 5, 6 and 7 show the transmitting four-stage binary counter.
Figure 5:
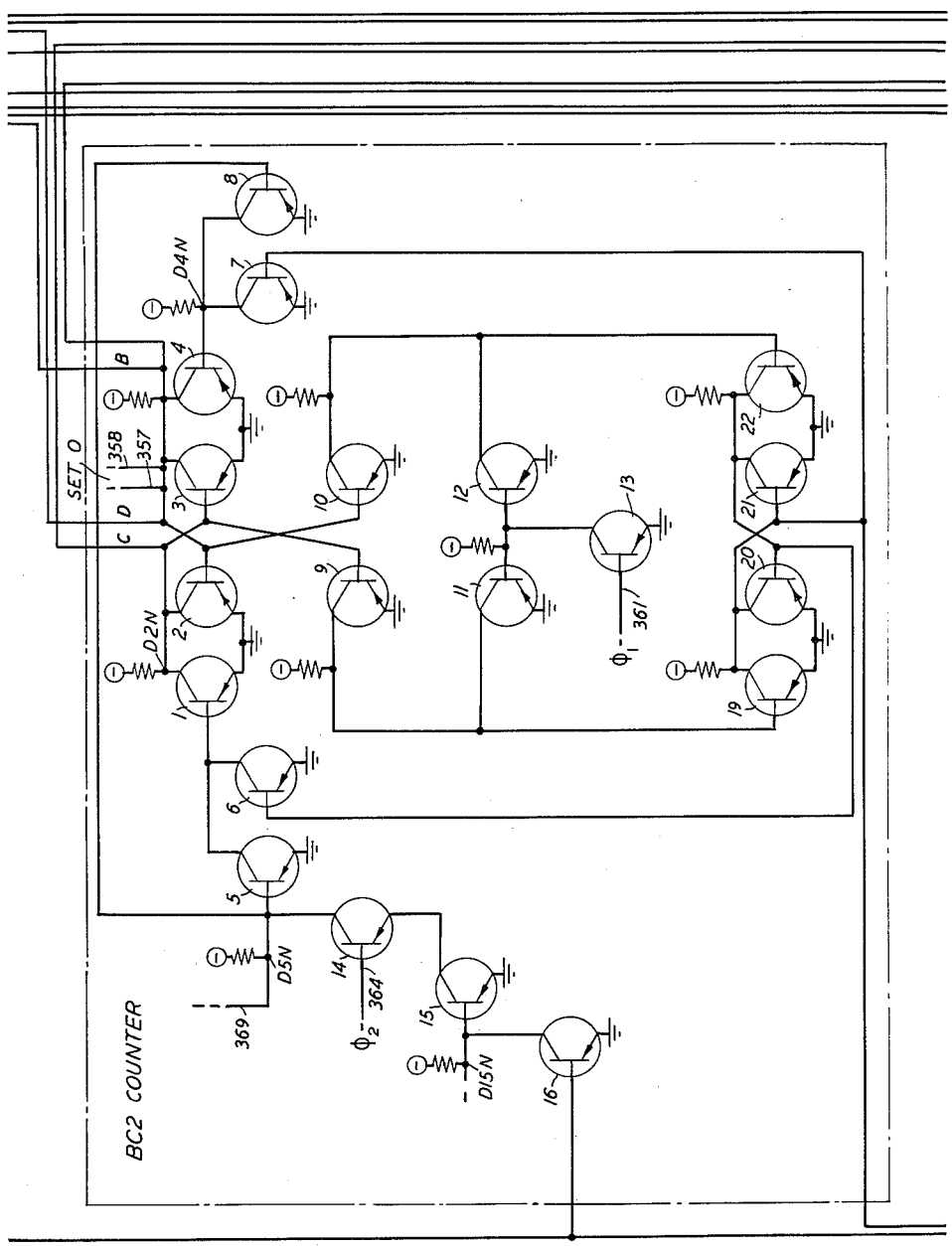
Figure 6:
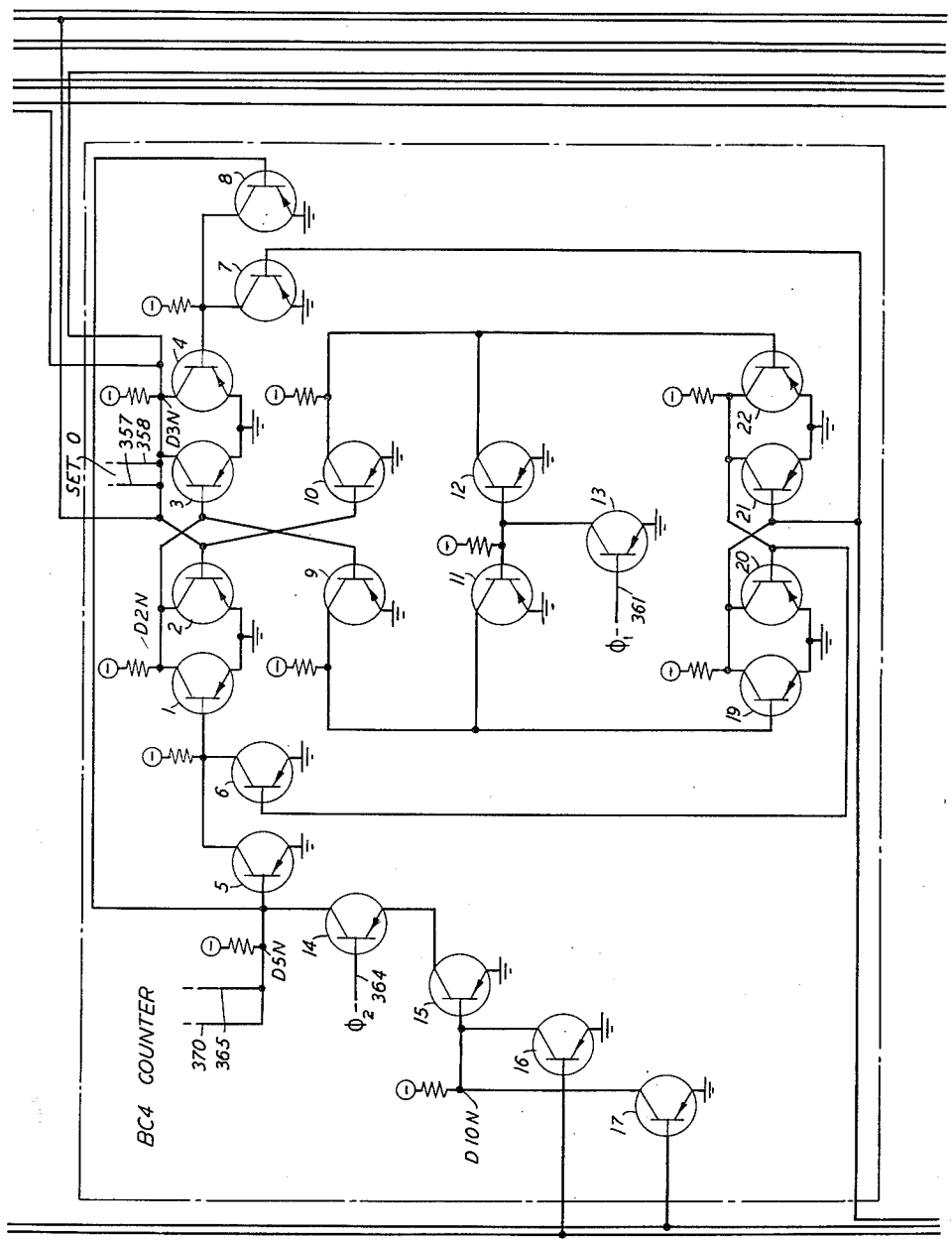
Figure 7:
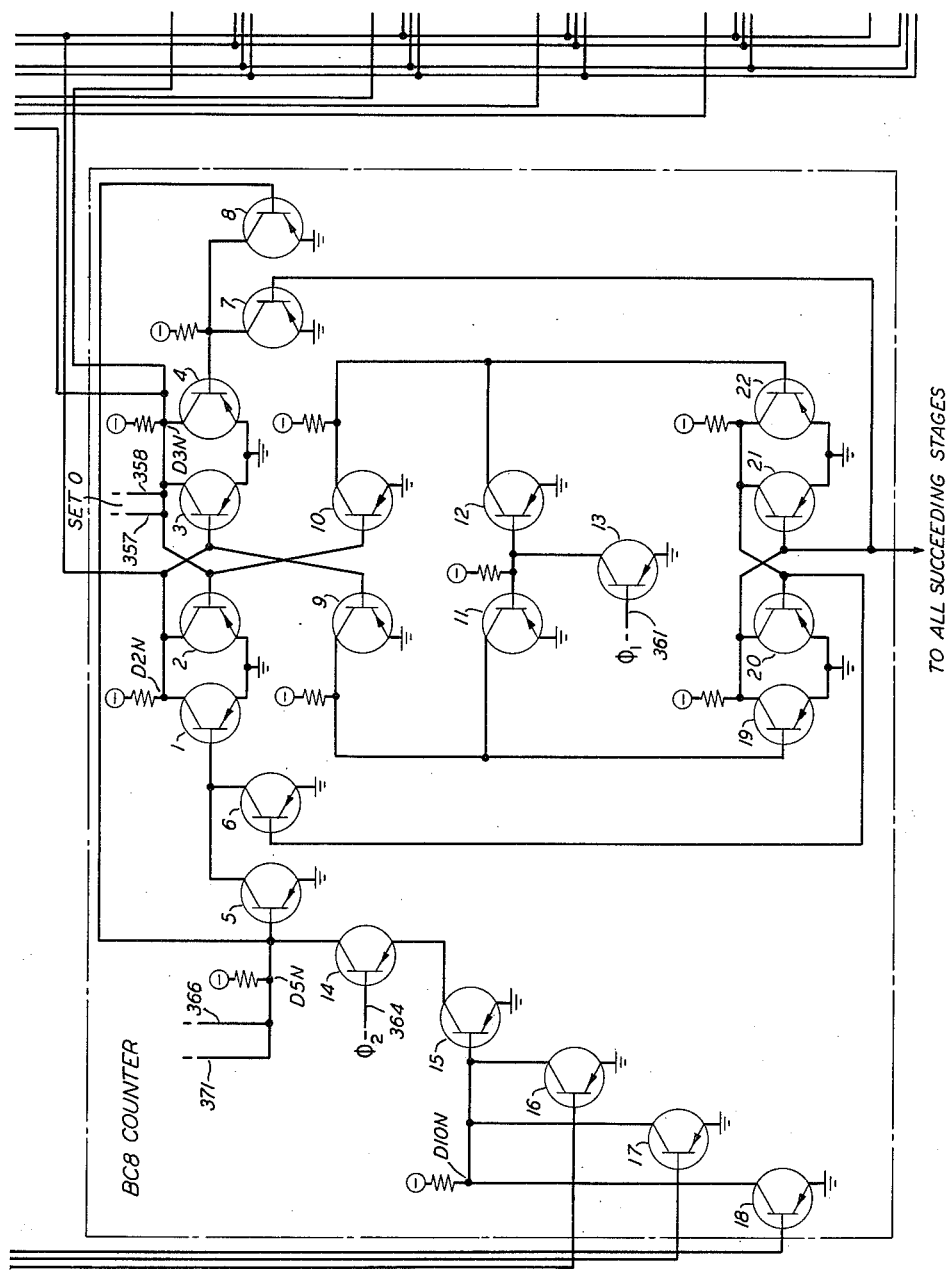

The base of transistor 21, in the first or least significant stage BC1 of the four-stage counter, FIG. 4, is connected in parallel to the base of an individual transistor 16 in each of the higher stages BC2, BC4 and BC8 of the register. The base of transistor 21 in the second least significant stage BC2 of the register is connected in parallel to the base of an individual transistor 17 in each of the higher stages BC4 and BC8 of the register. The base of transistor 21 in the third least significant stage BC4 of the register is connected to the base of a transistor 18 in the fourth stage BC8 of the register. Transistors 14, 15 and 16 in stage BC2, transistors 14, 15, 16 and 17 in stage BC4 and transistors 14, 15, 16, 17 and 18 in stage BC8 are interconnected in such manner that transistor 15 in each of stages BC2, BC4 and BC8 is ON only when the flip-flop circuits of each of the preceding stages is in the 1 condition. For instance, in the case of stage BC2, when stage BC1 is in the 1 condition, ground will be applied from terminal D8N therein to the base of transistor 16 in stage BC2 turning it OFF. In this condition negative battery from terminal D15N is applied to the base of transistor 15 turning it ON. This will ground the emitter of transistor 14 and the phase two pulse will be effective to ground the bases of transistors 5 and 8 in stage BC2 turning both OFF. Under this condition if the lower level of stage BC2 is in the 1 condition, thereby maintaining transistor 7 OFF, negative battery on terminal D4N of stage BC2 will turn transistor 4 ON. This grounds terminal D3N and the base of transistor 2, turning transistor 2 OFF. This, in turn, turns transistor 3 ON. As a result of the foregoing it should be apparent that when the lowest stage of the counter BC1 is in the 1 condition and the next stage BC2 is in the 1 condition, a phase two counting pulse applied to stage BC2 will advance stage BC2 from the 1 to the 0 condition. If stage BC2 were in the 0 condition when stage BC1 was in the 1 condition the 0 condition in stage BC2 would be changed to a 1 condition in a manner which should be understood from the foregoing.

Each of stages BC4 and BC8 is advanced in count in response to a phase 2 pulse when all of the lower stages with respect to each is in the 1 condition. Reference to the circuit comprising transistors 14, 15, 16 and 17 in stage BC4 and to transistors 14, 15, 16, 17 and 18 in stage BC8 discloses that each circuit will take action only when ground is applied to the bases of transistors 16 and 17 in stage BC4 and to the bases of transistors 16, 17, and 18 in stage BC8. As a result of this each stage will be advanced in count only if all preceding stages are in the 1 condition.

Figure 9:
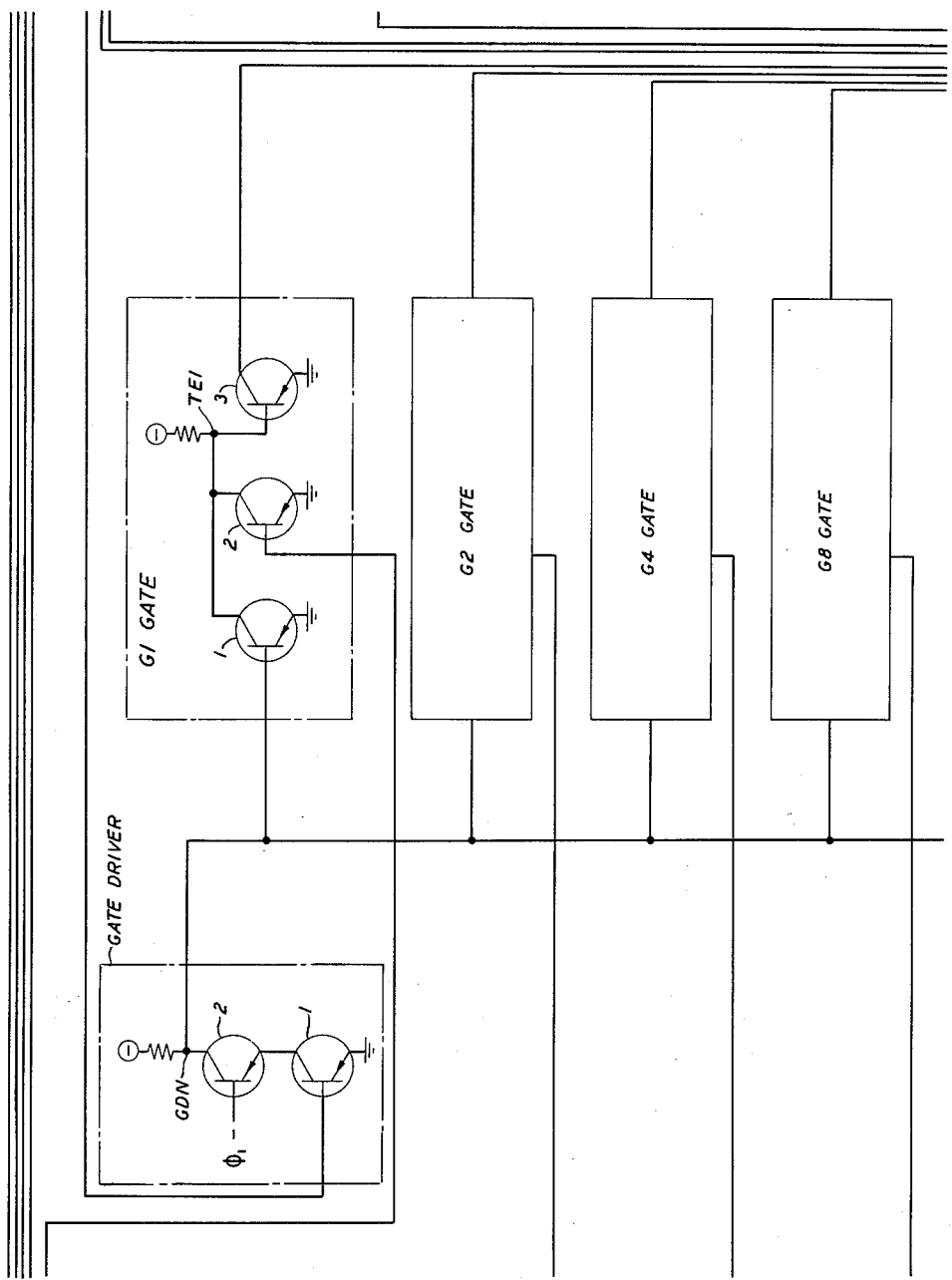
FIG. 9 shows the gate driver and the four individual gates associated with the transmitting parity checking circuits.

Binary counter stages BC1, BC2, BC4 and BC8 are connected individually to gates G1, G2, G4 and G8, respectively, FIG. 9, to serve as one of the controls for the gate. The connection is from terminal D3N in each stage of the counter which is grounded for the 0 condition of the stage to the base of transistor 2 in its individually connected gate. The gates G1, G2, G4 and G8 control access to the single-stage counters which count the 1 conditions in each of the four parity groups. When any stage of the four-stage counter is in the 0 condition it applies ground from terminal D3N therein to the base of transistor 2 in its respective connected G gate turning transistor 2 OFF.

The gate driver, shown in FIG. 9, is under control of transistor 4 in stage 13 of the shift register and of the phase one pulse. When there is a 1 condition registered in the upper level of stage 13 of the register, transistor 4 therein will be OFF. Negative battery will be applied from terminal B12N of stage 13 to the base of transistor 1 in the gate driver turning it ON. When a phase one pulse is applied simultaneously to the base of transistor 2 of the gate driver transistors 1 and 2 will be ON and ground will be applied from terminal GDN of the gate driver circuit over a parallel circuit to the base of a transistor such as transistor 1 in each of gates G1, G2, G4 and G8, turning these transistors OFF. Whenever a 1 condition is registered in stage 13 of the register, and simultaneously one or more of stages BC1, BC2, BC4 and BC8 of the four-stage counter are in the 0 condition, both of transistors 1 and 2 in the respective G gate controlled by the stage will be OFF. Terminal TE1 in any gate in such condition will connect negative battery to the base of transistor 3 in such gate turning it ON. This will pass a ground to the bases of transistors 2 and 7 in the individual single-stage binary counter of counters BC'1, BC'2, BC'4 and BC'8 connected to the gate turning transistors 2 and 7 therein OFF.

*Single-stage counters BC'1, BC'2, BC'4 and BC'8*

Figure 11:
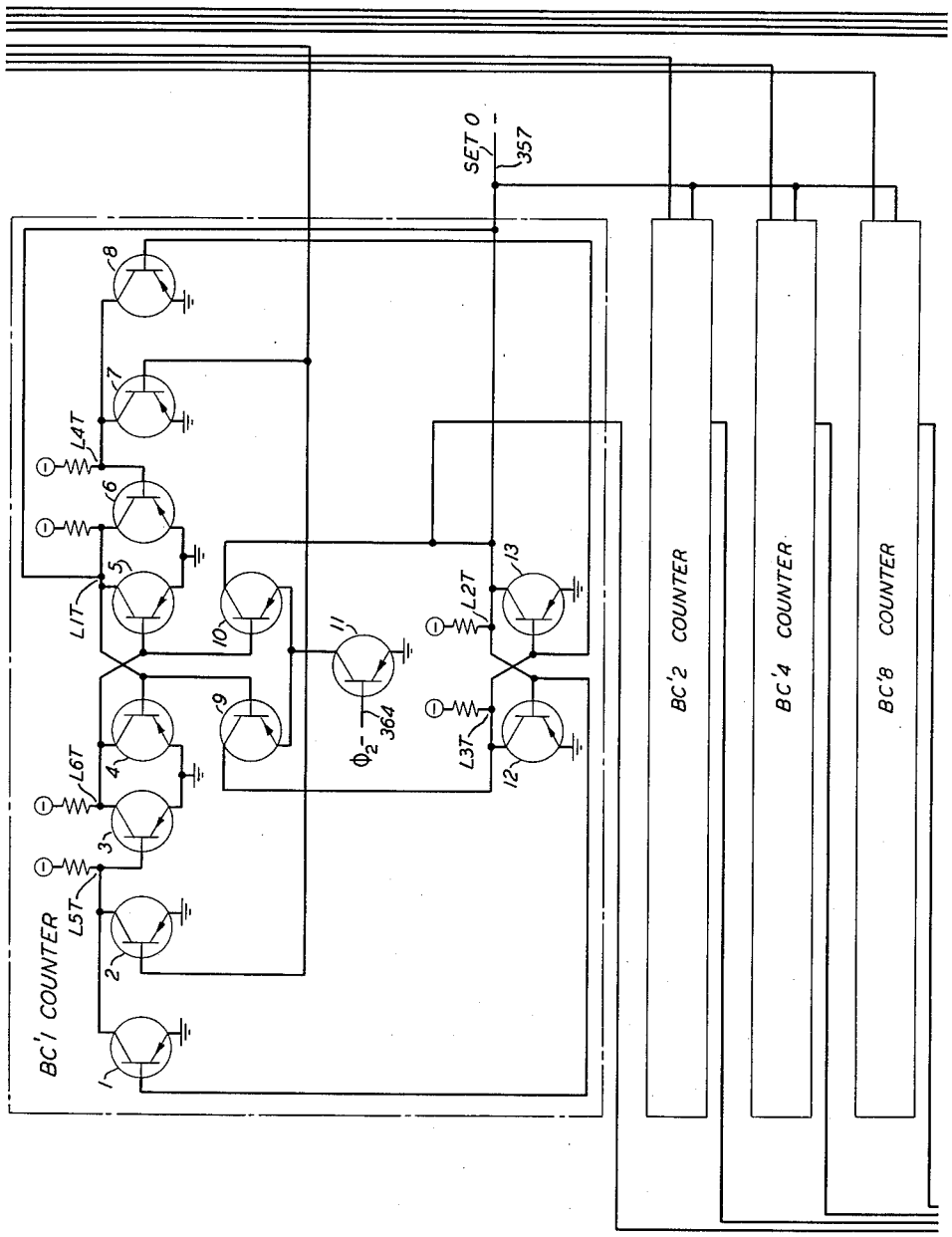

Refer now to FIG. 11 which shows the four single-stage counters, BC'1, BC'2, BC'4 and BC'8. Each is identical with counter BC'1 which is shown in full. Each is connected individually in one of the four parallel circuits which check the parity conditions in the four parity groups for single-error correction. Each is a single-stage, double-rank binary counter. Each can, therefore, determine whether the number of 1 signal conditions in its respective group is odd or even.

At the beginning of the operation both the upper and lower rank of each of the four single-stage counters is set to the 0 condition, in which condition transistors 5 and 13 are ON and transistors 4 and 12 are OFF. This is performed by applying a ground from the program control circuit, FIG. 35, over conductor 357 to terminals L1T and L2T, in parallel in each single-stage counter. This turns transistors 4 and 9 in the upper rank OFF and turns transistors 5 and 10 ON. In the lower rank ground applied to terminal L2T turns transistor 12 OFF and transistor 13 ON in each counter. With transistor 12 OFF negative battery from terminal L3T is applied to the base of transistor 8 turning it ON. When transistor 8 is ON terminal L4T is grounded and ground for the incoming counting pulse applied to the base of transistor 7 cannot be effective in changing the grounded condition of terminal L4T.

With transistor 13 ON for the 0 condition of the lower rank of the BC'1 counter, terminal L2T is grounded. This is applied to the base of transistor 1 turning it OFF. When the ground pulse is applied to the base of transistor 2 from stage 13 of the register, transistor 2 is also turned OFF. Negative battery from terminal L5T is applied to the base of transistor 3 turning it ON and grounding terminal L6T. This is applied to the bases of transistors 5 and 10 turning them OFF. Negative battery from terminal L1T is applied to the bases of transistors 4 and 9 turning them ON to register a count of 1 in the upper rank of counter stage BC'1. This condition will be transferred to the lower rank in response to the application of the phase two negative pulse to the base of transistor 11. This turns transistors 11 and 9 ON in series, grounding terminal L3T and the base of transistor 13 turning transistor 13 OFF. This connects negative battery from terminal L2T to the base of transistor 12 turning it ON and registering the 1 count, in the lower rank of the single stage counter BC'1. This in turn applies ground from terminal L3T to the base of transistor 8 and negative battery from terminal L2T to the base of transistor 1. This conditions the counter so that it will assume the 0 condition in response to the next counting pulse from stage 13 of the register, if its controlling gate G1 is enabled at the time.

Gates G2, G4 and G8, under control of their respective stages of the four-stage binary counter, each controls counters BC'2, BC'4 and BC'8 in the same manner as described for counter BC'1. It should be apparent, therefore, that when any stage of the four-stage binary counter is in its 0 condition, it enables its respective gate G1, G2, G4 or G8 to pass any 1 condition appearing in stage 13 of the shift register into its respective single-stage counter BC'1, BC'2, BC'4 or BC'8. The counting of the 1 conditions in each parity group in the single-error detection circuit therefore goes on simultaneously.

*Gates G'1, G'2, G'4 and G'8*

Each of gates G'1, G'2, G'4 and G'8 has five transistors, as shown for gate G'8, arranged in a parallel circuit. In order to enable any gate to take action, ground must be impressed simultaneously on the base of each of the five transistors in that gate.

Terminal L2T of each of the single-stage counters BC'2, BC'4 and BC'8 is connected individually to the base of a transistor such as transistor 5 in gates G'1, G'2, G'4 and G'8, respectively. The terminal corresponding to terminal L2T will have ground connected thereto when the single-stage counter is in the 0 condition. Since each single-stage counter is in the 0 condition when counting starts and since each parity group is required to have an odd number of 1's, action is required when there are an even number of 1's counted in any of the four parity groups. In such case the respective single-stage counter will be in the even or 0 count condition and action is taken to insert a 1 in an assigned position in the signal train. It is the function of transistor 5 in each gate G'1, G'2, G'4 and G'8 to check the condition of its respective connected single-stage binary counter and to tend to enable the gate if the single-stage counter has counted an even number of 1's. If such is the case the single-stage counter will be in the 0 or even condition. Its terminal L2T will be grounded which will ground the base of transistor 5 in the respective G' gate. This will turn transistor 5 in the respective gate OFF and will tend to enable the gate.

Each of gates G'1, G'2, G'4 and G'8 must be prevented from passing a 1 condition signal element at any time other than during the time slot assigned for the parity checking element for the respective group. It is the cooperative function of transistors 1, 2, 3 and 4 in each of gates G'1, G'2, G'4 and G'8 to permit the propagation of a 1 signal element at the proper count, if one is required to be passed and to prevent its propagation at any other time.

Binary counting stages BC1, BC2, BC4 and BC8 are connected to the bases of transistors 1, 2, 3 and 4 in gates G'8, G'4, G'2 and G'1 in such manner as to permit a pulse to pass through these gates, if required, only during time slots 8, 12, 14 and 15, respectively. The manner of interconnection is dependent on the condition of the four-stage binary counter when it has counted fifteen pulses, but starting with each stage in the 0 condition for the count of 1. It will be recalled that each stage of the four-stage counter is set to the 0 condition at the outset.

When the four-stage counter starts at 0000 for count 1 and advances 1 in binary counting for each additional count, at counts 8, 12, 14 and 15 the four-stage counter will be at binary counts 7, 11, 13 and 14, respectively, or 0111, 1011, 1101 and 1110, respectively. At count 8, counter stage BC8 will be in the 0 condition and each of the other three stages will be in the 1 condition. At count 12, counter stage BC4 will be in the 0 condition and each of the other three in the 1 condition. At count 14, counter stage BC2 will be in the 0 condition and each of the other three will be in the 1 condition. And at count 15, counter stage BC1 will be in the 0 condition and each of the others will be in the 1 condition. If, therefore, terminal D3N, in stages BC8, BC4, BC2 and BC1, which is grounded for the 0 condition in these stages at counts 8, 12, 14 and 15, respectively, is connected to the base of an individual transistor, such as transistor 1 in gates G'8, G'4, G'2 and G'1, respectively, it will tend to enable the respective gate at the respective count. If terminal D2N in each of stages BC4, BC2 and BC1, which terminal is grounded for the 1 condition in each stage, is connected to the base of an individual transistor, such as transistors 2, 3 and 4 in gate G'8 it will tend to enable the gate at the count of 8. When counter BC'8 is in the 0 condition after counting an even number of 1's in a parity group and therefore connecting ground to the base of transistor 5 in gate G'8, and each of transistors 1, 2, 3 and 4 has ground applied to its base for the count of 8 by the four-stage binary counter, all five of the transistors in gate G'8 will be OFF. Negative battery from terminal N1T is then applied to the base of transistor 6 turning it ON. Terminal P1T will then be grounded, resulting in further action to be described hereinafter. Attention is particularly called to the fact that for every count other than count 8 negative battery will be connected to the base of some one or more of transistors 1 to 5 in gate G'8 and gate G'8 will be thereby disabled.

Gates G'4, G'2 and G'1 will be enabled only at counts 12, 14 and 15, respectively, in a manner corresponding to that described for gate G'8. That is to say the base of a transistor corresponding to transistor 1 in gates G'4, G'2 and G'1 will be grounded by connected to terminal D3N in stages BC4, BC2 and BC1, respectively. The bases of transistors corresponding to transistors 2, 3 and 4 will be grounded by a connection to terminal D2N in stages BC8, BC2 and BC1 for gate G'4, in stages BC8, BC4 and BC1 for gate G'2 and in stages BC8, BC4 and BC1 for gate G'1 to permit a pulse to pass if required at counts 12, 14 and 15, respectively.

*Double-Error Detection Circuit*

Figure 10:
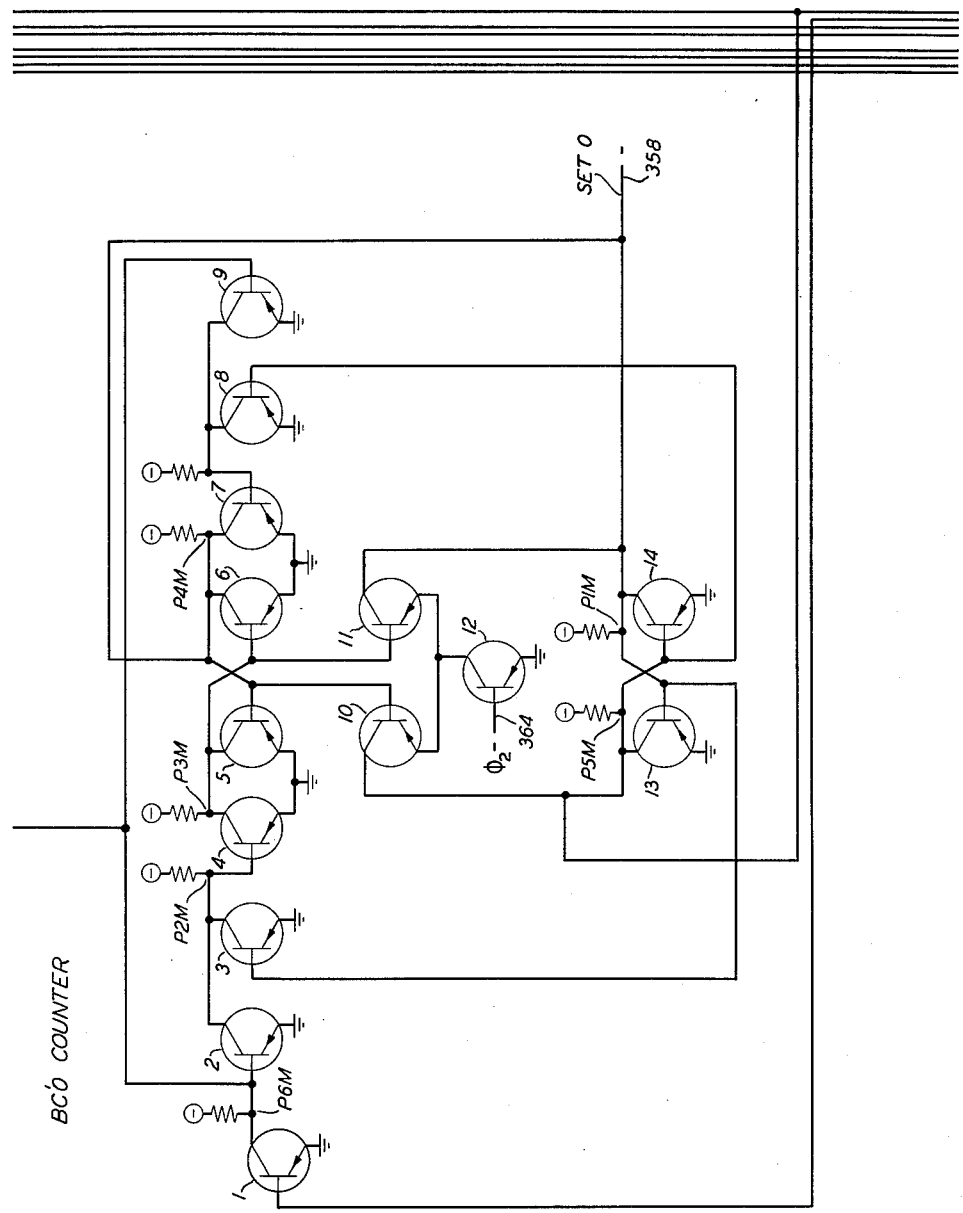
FIGS. 10, 11 and 12 show single-stage binary counters and individual output gates associated with the transmitting parity-checking circuits.

For double-error detection the 1 signals in the address after passing through the shift register and the gate driver are impressed on the single-stage, double-rank binary counter BC'0 in FIG. 10 which counts all of the 1 condition signal elements in the address and in each of the words to determine if their number is odd or even. Both the upper and lower rank of counter BC'0 is first set to the 0 condition by ground impressed thereon through conductor 358. This turns transistors 5 and 10 in the upper rank OFF and transistors 6 and 11 in the upper rank ON. It also turns transistor 13 OFF and 14 ON. The counter comprises two flip-flop circuits and a number of gates. The 1 condition signal elements which are to be counted, after passing through the gate driver, are impressed on the bases of transistors 2 and 9 in parallel. When stage BC'0 is in the 0 condition, terminal P1M is grounded grounding the base of transistor 3. With the bases of transistors 2 and 3 both grounded, negative battery is impressed on terminal P2M and on the base of transistor 4, grounding terminal P3M and the bases of transistors 6 and 11. With the base of transistor 6 grounded negative battery is connected to terminal P4M and to the base of transistors 5 and 10, turning them both ON for the 1 condition. The phase two pulse then transfers the 1 condition to the lower stage, grounding terminal P5M and the base of transistor 14. Negative battery is then connected to terminal P1M and to the base of transistor 13, turning transistor 13 ON for the 1 condition. Ground from terminal P5M is then connected to the base of transistor 8 so that counter BC'0 may be changed to the 0 condition when ground is applied to the base of transistor 9 in response to the next 1 signal element from the gate driver.

All of the 1 signal elements in the entire address including the 1 condition signal elements which are required to be added as a result of the parity check made over each of the four groups of signal elements for single-error detection, and the final parity checking element for double-error detection, will be counted by single-stage counter BC'0, which determines whether the number of 1's is odd or even. In the present arrangement the parity check applied to the whole address and to each of the words is an even parity check, which requires that the number of 1's in the whole address be even and the number of 1's in each of the words, including the parity checking element be even. Therefore, the single-stage counter BC'0 is arranged to count all of the 1 signal conditions in the address and apply the parity check to it and thereafter to check each of the five words and to apply the parity check to each. It will be remembered that the signal element originally entered in the position of each parity checking element in the address and the last signal element in each of the words is originally a 0 condition signal element as it passes through the shift register. If the number of 1's which are counted in the address or in any word is even no action is to be taken, but if it is odd a 1 condition is required to be added.

Terminal P5M in the single-stage counter BC'0, FIG. 10, will have ground connected thereto whenever single-stage counter BC'0 is in the 1 or odd condition. At such time the ground will be applied to the base of transistor 1 in gate G'0 tending to enable the gate. Gate G'0 is arranged in a manner corresponding to gate G'8 as explained in the foregoing.

The single-stage counter BC'0 and the four-stage counter BC1, BC2, BC4 and BC8 cooperatively control gate G'0. It was explained that the parity check for the address fills the 16th time slot. At such time the four-stage binary counter, since its counting started at decimal 0, or binary 0000, it will be at decimal count 15 or binary count 1111. All four stages of the four-stage counter will be in the 1 condition. In this condition terminal D2N in each of the four stages will be grounded. Terminal D2N in each of the four stages is connected to the base of an individual one of transistors 2, 3, 4 and 5 in gate G'0. If at such time the count in single-stage counter BC'0 is odd, the base of transistor 1 in gate G'0 will also be grounded. A terminal in gate G'0 corresponding to terminal N1T in gate G'8 will have negative battery connected thereto to pass a 1 condition signal to the line in a manner to be explained. If single-stage counter BC'0 is in the even count condition or if any one or more of the four stages of the four-stage counter is in the 0 condition, gate G'0 will be inhibited. Some one or more stages of the four-stage counter will be in the 0 condition at every count other than at decimal count 16.

*Gate GC*

Gate GC shown in FIG. 12 is made up of two parallel circuits, two inverters and two series circuits. The operation is as follows:

Gates GC controls the insertion of a 1 condition signal element in the signal train at the proper count when required. Output terminal N1T in gates G'8, G'4, G'2, G'1 and G'0 is connected individually to the base of transistors 6, 7, 8, 9 and 10, respectively, which are arranged in a parallel circuit to control terminal P1T. If any of these five gates is activated its respective connected transistor of the group 6, 7, 8, 9 and 10 will have negative battery applied thereto, turning it ON and grounding terminal P1T. This, of course, can occur only at the proper counts of the controlling four-stage and single-stage counters. When terminal P1T is grounded, ground is applied to the bases of transistors 12 and 20 turning them OFF.

To enable gate GC, negative current is applied from the program control circuit over conductor 359 to the base of transistor 14 turning it ON, grounding terminal P2T, and turning transistors 13 and 19 OFF. If transistor 12 is simultaneously OFF, terminal P3T will apply negative current to the bases of transistors 16 and 18 turning them ON. When, at such time a phase one negative current pulse is applied to the bases of transistors 15 and 17, ground is applied to the base of transistor 9 in stage 13 of the shift register turning it OFF, and to terminal B15N in stage 13 of the register, respectively, placing the stage in the 1 condition. This sends a ground to the line as a 1 condition to fill a parity check position, when required.

The grounding of the base of transistor 9 prevents the transfer of the 0 condition registered in the upper stage 13 of the shift register to the lower stage. The upper stage of register 13 will always be in the 0 condition during a time slot allotted to a parity check element. At times other than when a 1 signal element is to be inserted in a time slot as a parity checking element, stage 13 will operate in the same manner as explained for the other stages of the register with the exception that outgoing signals are transmitted to the line which is connected to terminal B15N. Ground is therefore applied thereto to the base of transistor 9 to prevent transfer of the 0 signal, stored in the upper rank of stage 13, to the lower rank during a time slot allotted to parity check.

Attention is particularly called to the fact that in counting the 1 condition signal elements for the entire address, in order to apply a parity count to the entire address for double-error detection, it is necessary to include such 1 condition signal elements as may be required for encoding the four groups of signal elements for single-error correction. That is to say, if a 1 condition signal element is inserted in any of time slots 8, 12, 14 and 15, it must be counted with the other 1 condition signal elements in the address to determine if the total number of 1's in the address is odd or even to establish the condition of the signal element which is to be inserted in time slot 16. In order to effect this, the lower right-hand portion of gate GC, as shown in FIG. 12, controls single-stage binary counter BC'0, which stage counts the 1 signal conditions in the whole address. This circuitry adds 1's, when required, for encoding the four groups of signals used in single-error correction.

Reference to the lower right hand portion of FIG. 12 shows three transistors, transistors 20, 21 and 22, arranged in parallel circuit controlling terminal P4T jointly with transistor 19, which is under control of the program circuit through transistor 14. This portion of gate GC will be described in detail hereinafter. Terminal P4T is connected to the base of transistor 1 in single-stage binary counter BC'0 and its function is to add a 1 condition signal element to the count in the BC'0 stage when required for any of the four single-error checking parity elements. It is pointed out that if a 1 condition signal element is required to be inserted in the 16th time slot, it must be prevented from affecting the count of the BC'0 stage. Transistor 1 is connected into the circuit of single-stage counter BC'0 in such manner that it serves as a counter of 1 condition signal elements impressed on it from terminal P4T of gate GC in FIG. 12. When transistors 19, 20, 21 and 22 are all OFF, negative battery from terminal P4T will turn transistor 1 ON, grounding terminal P6M and the base of transistors 2 and 9, turning them OFF. Responsively, the BC'0 counter will be advanced in count in a manner which should be understood from the foregoing. It has been shown that the condition of single-stage counter BC'0 is one of the controls of gate G'0 so the number of 1 condition signal elements among the four parity checking elements of the single-error correcting elements will be a factor in controlling the G'0 gate, which in turn controls the condition of the parity checking element which fills the 16th time slot for double-error detection.

The details of the operation of gate GC will be more readily understood in the light of the foregoing. Each time a 1 condition is required to be inserted in any of time slots 8, 12, 14, 15 or 16, gate G'8, G'4, G'2, G'1 or G'0, respectively, will be enabled, transistors 6, 7, 8, 9 or 10 will be turned ON grounding terminal P1T and the base of transistor 12 and so turning both OFF. The turning OFF of transistor 12 will be result in the insertion of a 1 signal condition in the lower rank of stage 13 of the shift register. This will pass the 1 condition to the line in the proper time slot. When transistor 20 is turned OFF it inserts a 1 condition signal in the signals which are being counted by single-stage counter BC'0 for double-error detection parity check.

It is important, even though, at times, it is necessary to insert a 1 condition signal element in the 16th time slot for double-error detection parity, that the 1 condition signal element in this slot should not be counted by counter BC'0. The number of 1's in the first 15 time slots determines whether the 16th is required to be a 1 or a 0 signal element. The condition of the counter BC'0 after counting The number of 1's in the first 15 time slots determines whether the 16th is required to be a 1 or a 0 signal element. The condition of the counter BC'0 after counting the 1's among the first 15 elements of the address determines the condition applied to transistor 5 in gage G'0. Therefore, if gate G'0 is enabled at count 16 to insert a 1 in the 16th time slot, the same 1 should not be applied to counter BC'0. It is the function of transistor 22 to prevent this. The base of transistor 22 is connected directly to terminal N1T in gate G'0. This terminal will be grounded at all times except during a 16th time slot in which a 1 condition is required to be added for double-error correction parity. At such times negative battery from terminal N1T in gate G'0 will be applied directly to the base of transistor 22 turning it ON and grounding terminal P4T. This prevents turning ON transistor 1 in counter stage BC'0 in FIG. 10 and prevents stage BC'0 from counting a 1 signal element at such times.

In addition to encoding the address for single-error correction and double-error detection the present circuit as explained applies an even parity check to each of the words in a message. Each word as explained is a permutation of 12 intelligence-determining elements to which a 13th element is added as a parity checking element. Each word as transmitted is required to have an even number of 1 condition signalling elements counting the parity checking element. To perform this the number of 1's in the 12 intelligence-determining elements in the word are counted. If there are an odd number of 1's therein, a 1 condition signal element is added to make the total number of 1's even. To perform this function, single-stage counter BC'0 is employed together with gate GD. The signal elements in any word are impressed by the upper rank of stage 13 of the register on the gate driver and on counter BC'0. It has been shown that whenever counter BC'0 is in the odd or 1 counting condition terminal P5M in FIG. 10 is grounded. This condition is impressed on the base of transistor 1, in the GD gate in FIG. 14, turning transistor 1 OFF as a first condition for the enablement of the GD gate. It has been shown that the binary count of the four-stage counter since it started at binary 0000 for time slot 1 will be one less than the corresponding decimal count. For time slot 13 the four-stage counter will be at binary count 1100 corresponding to decimal count 12. For this condition stages BC1 and BC2 will both be in the 0 condition and stages BC4 and BC8 will both be in the 1 condition. Grounds from terminals D3N of stages BC1 and BC2 and from terminals D2N of stages BC4 and BC8 are connected to the bases of transistors 2, 3, 4 and 5 in gate GD turning all of these transistors OFF during the 13th time slot. If transistor 1 is OFF at such time negative battery from terminal W1N will be applied to the base of transistor 7 turning it ON and grounding terminal W2N. This turns transistor 8 OFF. Negative battery from terminal W3N will therefore be applied to the bases of transistors 9 and 10, turning them both ON. Transistors 9 and 12 are arranged in a first series circuit and transistors 10 and 11 in a second series circuit. Each of these will be turned ON when a phase 1 pulse is applied to the base of transistors 11 and 12. This will impress ground on the base of transistor 9 and on terminal B15N, both in the 13 stage of the shift register. This causes a 1 condition signal element to fill the 13th time slot of a word, when required, for parity check.

*Transmitting program control*

The program control circuit controls the condition of the transmitting encoding system so that it is arranged to encode the address and the words at proper times. The program control circuit, as described in the Davey et al. application identified in the foregoing comprises an oscillator and binary counter and a plurality of matrix gates which pass pulses at proper counts as necessary. The address or word selector signal conductor in FIG. 35 connects to stages of the binary counter in the program control circuit which apply negative battery thereto while the address is being encoded and ground while the words are being encoded. Conductor 359, shown extending from the bottom of FIG. 35, connects to the base of transistor 14 in FIG. 12. This turns transistor 14 ON and transistor 13 OFF while the address is being transmitted. During this interval terminal P3T will be responsive to the G' gates. At all other times the program control circuit will apply ground to the base of transistor 14, turning it OFF and turning transistor 13 ON. This will ground terminal P3T at all times, other than when an address is being encoded. At such times the condition of the output of the G' gates will have no effect on the signals transmitted.

Figure 14:
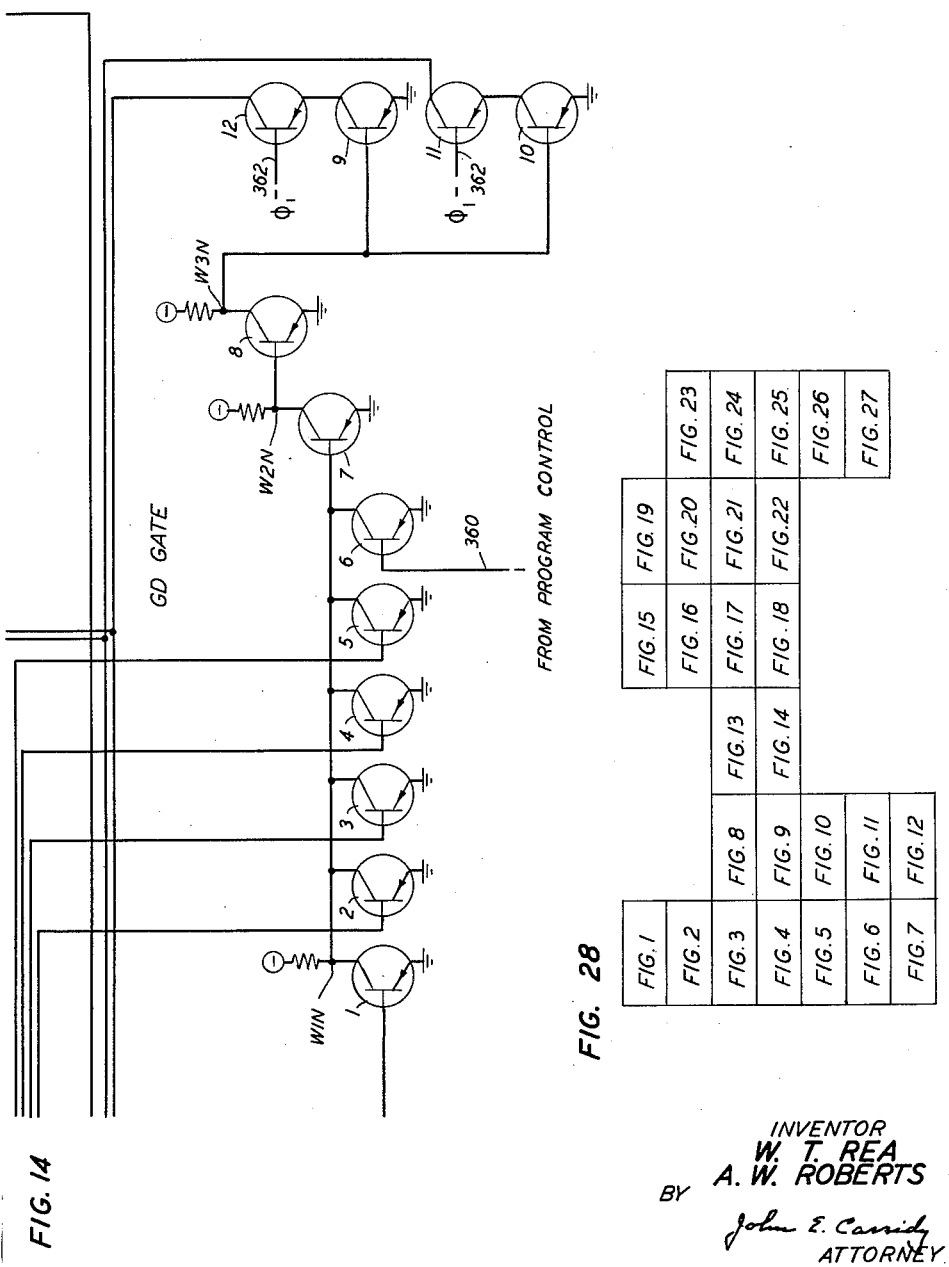
FIG. 14 shows a gate circuit associated with the transmitting double-error parity checking circuit.

The program control circuit applies negative battery and ground over conductor 369 to the base of transistor 6 in the GD gate in FIG. 14. The negative battery will be applied while the address is being encoded and the ground while the words are being encoded. While the address is being encoded transistor 6 will be ON. Terminal W1N will be grounded and GD gate which encodes the words will be disabled. At all other times it will perform its function.

The transmitting encoding system is provided with an address turn OFF gate and a word turn OFF gate which function to control the pulse control circuit. These gates are each under joint control of the program control and of the four-stage binary counter. When the address or word selector signal control conductor 397 applies ground to the base of transistor 3 in the address turn OFF gate and simultaneously the four-stage binary counter is in the 1111 binary count condition in time slot 16 and applies ground from terminal D5N in each of the four stages over conductors 368, 369, 370 and 371, transistors 3, 4, 5, 6 and 7 of the parallel address turn OFF gate will all be OFF. Negative battery from terminal A1T, FIG. 35, applied to the base of transistor 2 will ground conductor 373 and turn OFF the address program control.

In the case of the word turn OFF gate when negative battery is applied from the program control circuit, FIG. 35, over the word selector signal conductor 397 to the base of transistor 11, transistor 11 is turned ON and transistor 10 is turned OFF. In time slot 13 when the four-stage binary counter is in the 1100 condition ground from terminals D5N of stages BC8 and BC4 is applied through conductors 365 and 366 to the bases of transistors 8 and 9 turning them OFF. Negative battery from terminal A2T at such time turns transistor 1 ON and sends a ground into the pulse control circuit of FIG. 35 to turn OFF the program for a word.

*Receiver*

Figure 16:
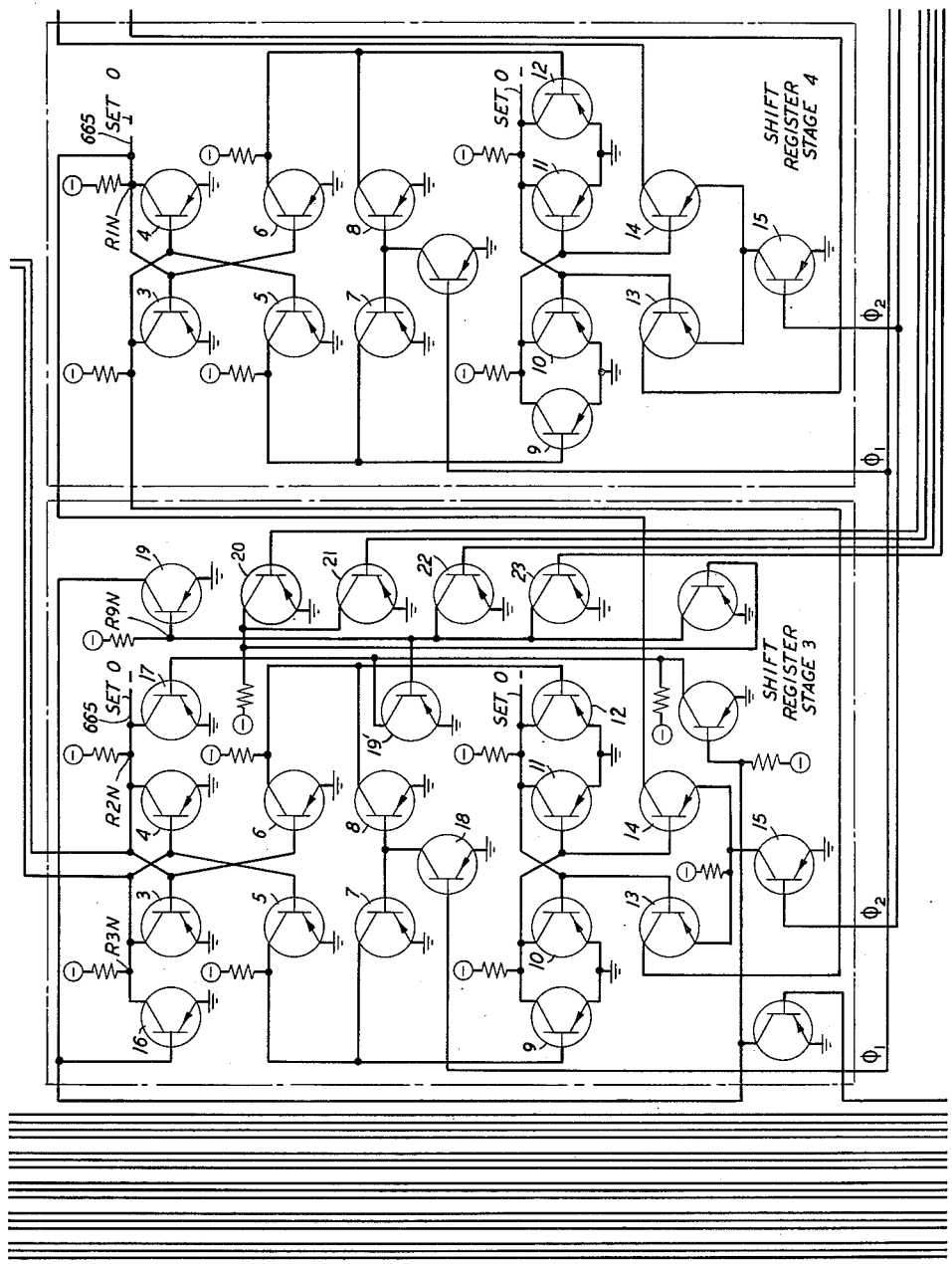
FIG. 16 and FIG. 20 show the receiving shift register circuit.
Figure 20:
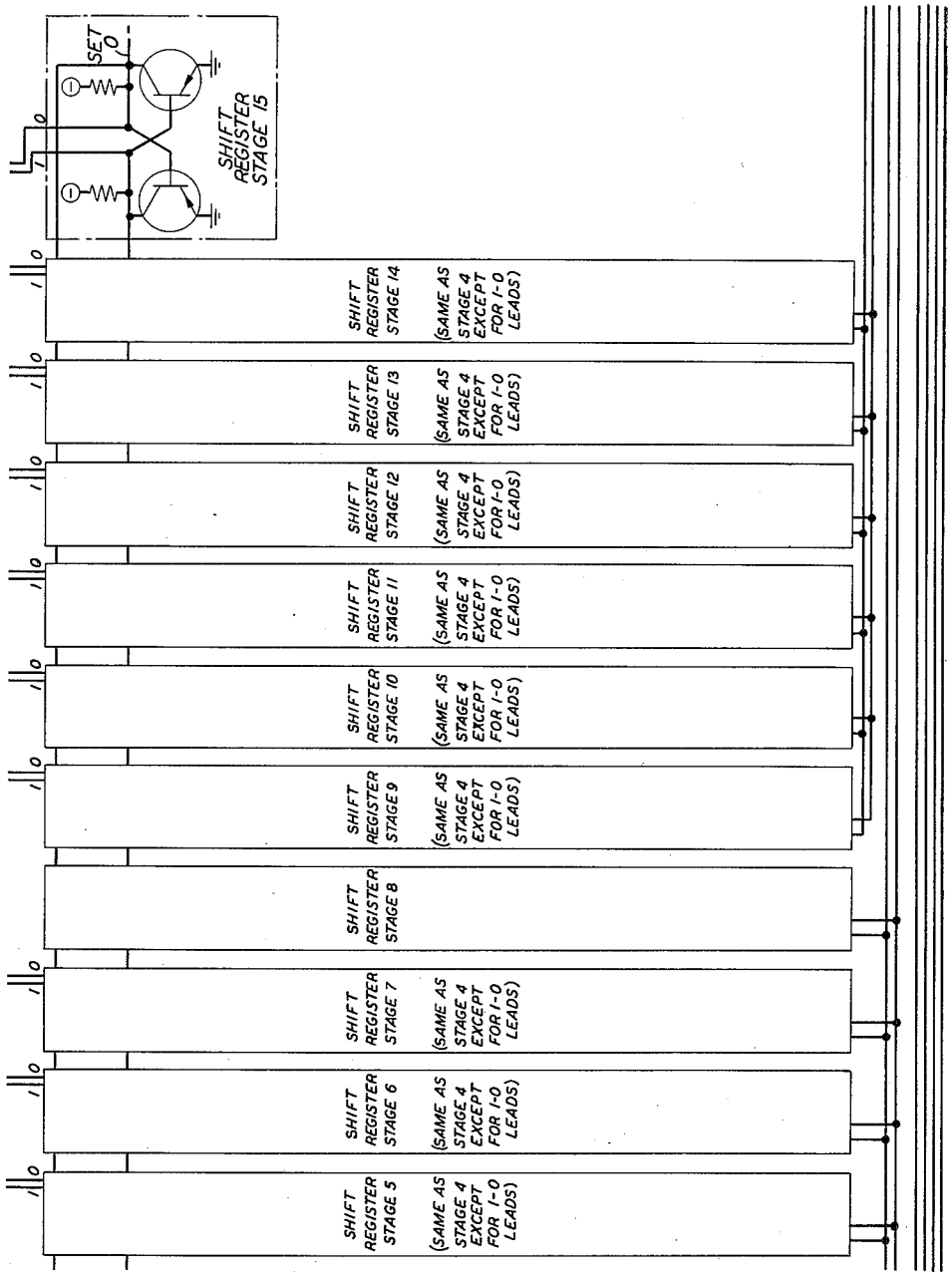

The receiver circuit resembles the transmitter circuit closely. The major components of both circuits are essentially the same. It is considered that it will not be necessary to describe their operation in detail except insofar as their operation is different and a description of the details is necessary to an understanding of the invention. Before the start of the receiving program, the upper rank of each of the thirteen stages of the shift register, shown in FIGS. 16 and 20, is set to the 0 condition by the application of ground pulse from the receiving program control circuit, FIG. 36, over conductor 665 to terminal R2N in each stage. Before the start of the receiving program control circuit, FIG. 36, over conductor 665 to terminal R2N in each stage. Before the start of the receiving program each of the stages of the four-stage binary counters BC1, BC2, BC4 and BC8 in FIGS. 24, 25, 26 and 27 is set to the 0 condition by the application of a ground pulse from FIG. 36 over conductor 670 to terminal R1T in each of the stages. The single-stage binary counters BC'1, BC'2, BC'4 and BC'8 are each set to the 1 condition by the application of a ground pulse from FIG. 36 over conductor 667 to terminal S1T in each counter.

Figure 17:
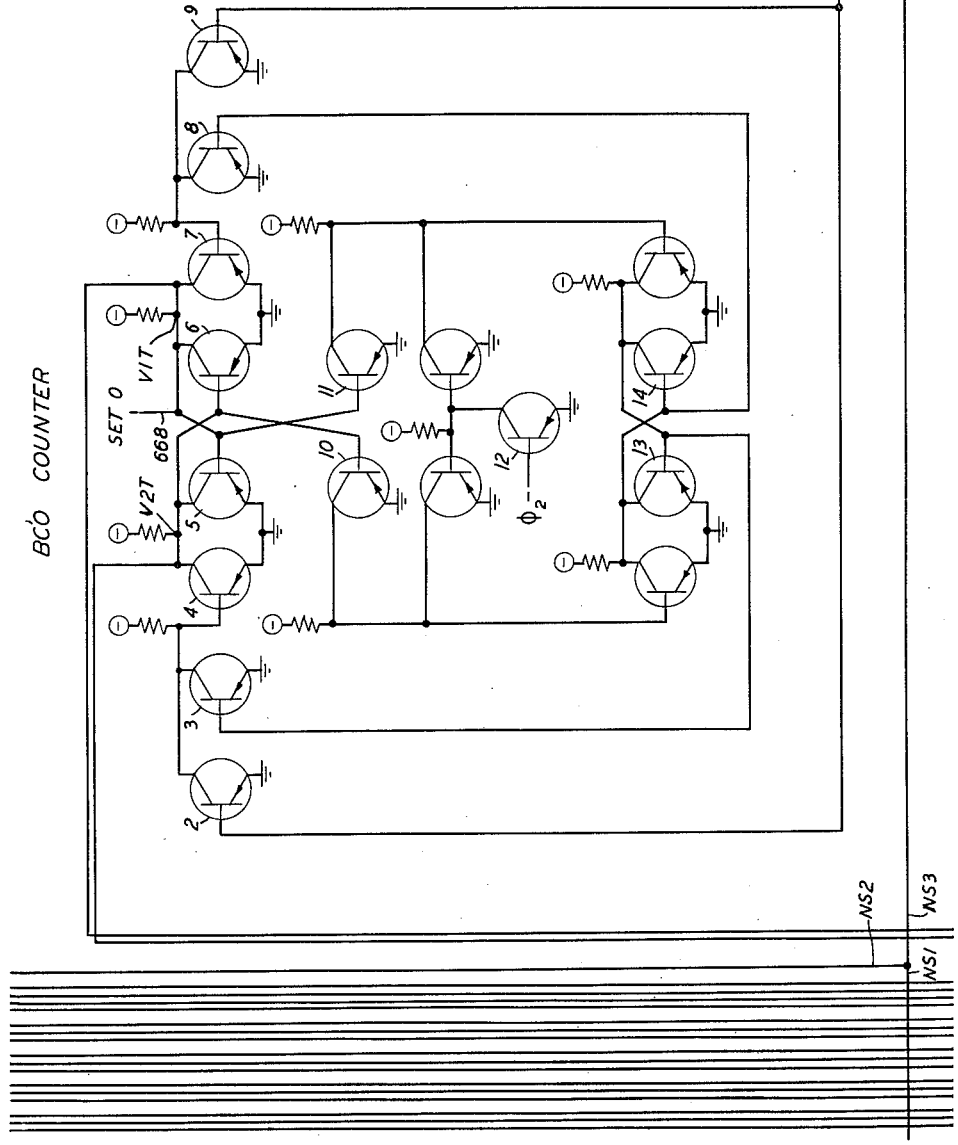
FIG. 17 and FIG. 22 show the receiving four-stage binary counter.
Figure 36:
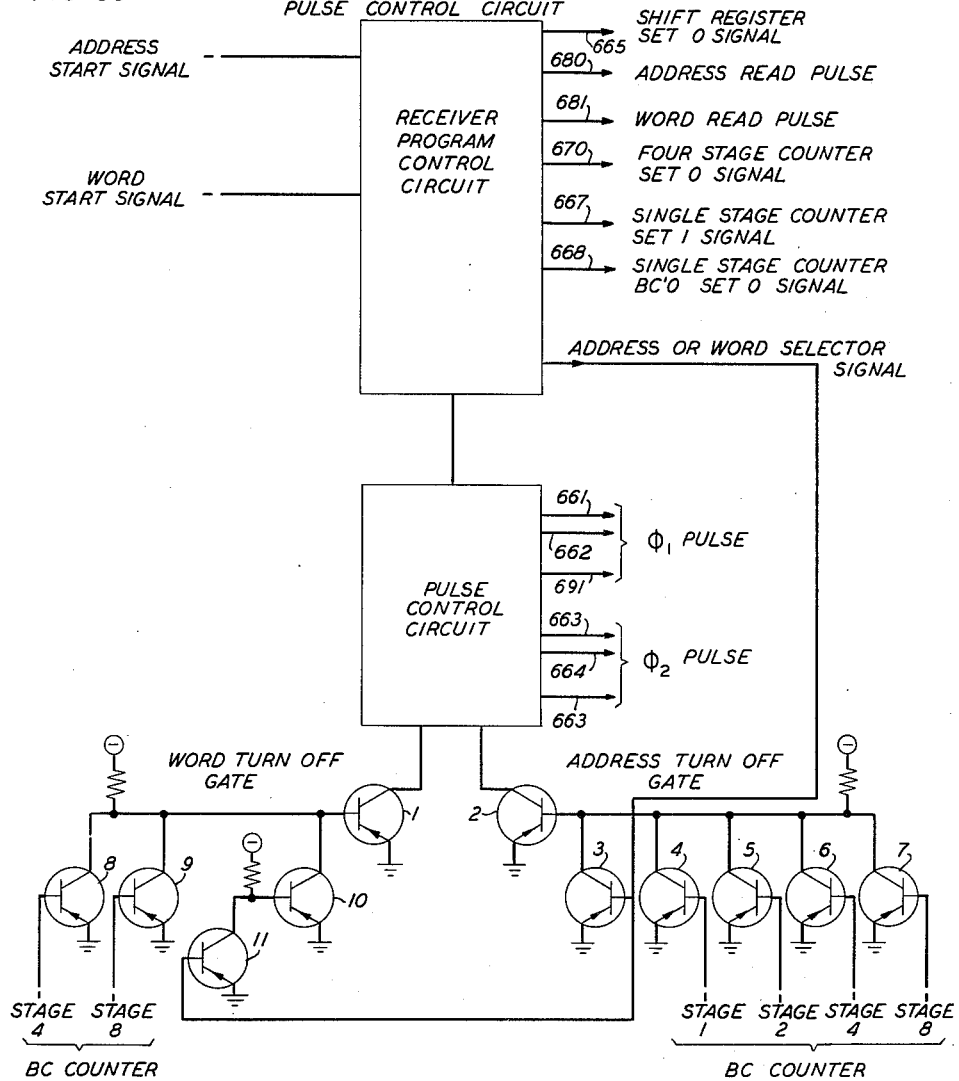
FIG. 36 shows a program control circuit for the receiver.

Single-stage counter of BC'0 is set to the 0 condition by the application of a ground from FIG. 36 over conductor 668 to terminal V1T in counter BC'0, FIG. 17. Phase one pulses are applied from FIG. 36 over conductors 661 and 662 through the shift gate, FIG. 33, to each of the thirteen stages of the shift register. Phase two pulses are applied over conductors 663 and 664 through shift gate circuit, FIG. 23, to each stage of the shift register.

The incoming signals are received through conductor NS1 shown at the lower left in FIG. 17. They are applied through conductor NS2 on the left-hand stage of the shift register, specifically to the base of each of transistors 16 and 17 in stage 1. Ground will be applied to the base of transistor 16 for a 0 condition and negative battery for the 1 condition. Similar signals, but with opposite phase, are applied to the base of transistor 17. Assuming that the first signal element is a ground signal, it is inverted and applied to the base of transistor 16, transistor 16 will be turned on grounding terminal R3N for the 1 condition. If the first signal is a 0 condition signal, negative battery on lead NS1, ground will be applied to the base of transistor 16 and will have no effect thereon. In response to a phase 1 pulse from shift gate circuit, FIG. 23, applied to the base of transistor 18 in FIG. 16 the condition in the upper rank of the shift register stage will be transferred to the lower range. In response to a succeeding phase 2 pulse applied through the shift gate to the base of transistor 15 the signal stored in the lower range of the shift register will be transferred to the succeeding stage of the shift register. The signal elements of the address will follow one another in succession and will be shifted under control of the phase 1 and phase 2 pulses through the thirteen stages of the shift register until, in time slot 13, the first thirteen signal elements of the sixteen element address will be reposing in the thirteen stage shift register.

Attention is called to the fact that the three signal elements occupying the three final time solts, that is, time slots 14, 15 and 16 of the address, will not be shifted into the shift register. After the first thirteen elements of the address have been received the first stage of the shift register will be disabled and none of the last three elements will gain entrance thereto. This is performed under control of the four-stage binary counter and the shift gate and will now be described.

Figure 23:
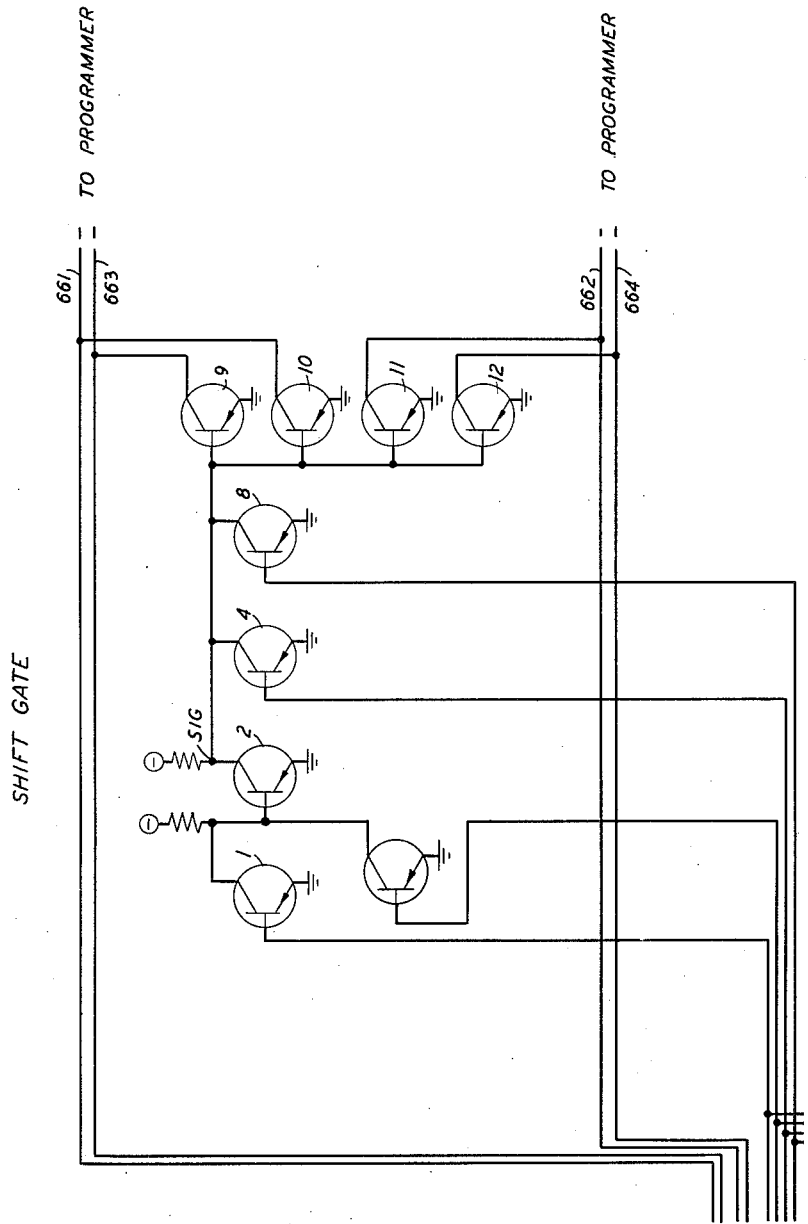
FIG. 23 shows the receiving shift gate circuit.
Figure 24:
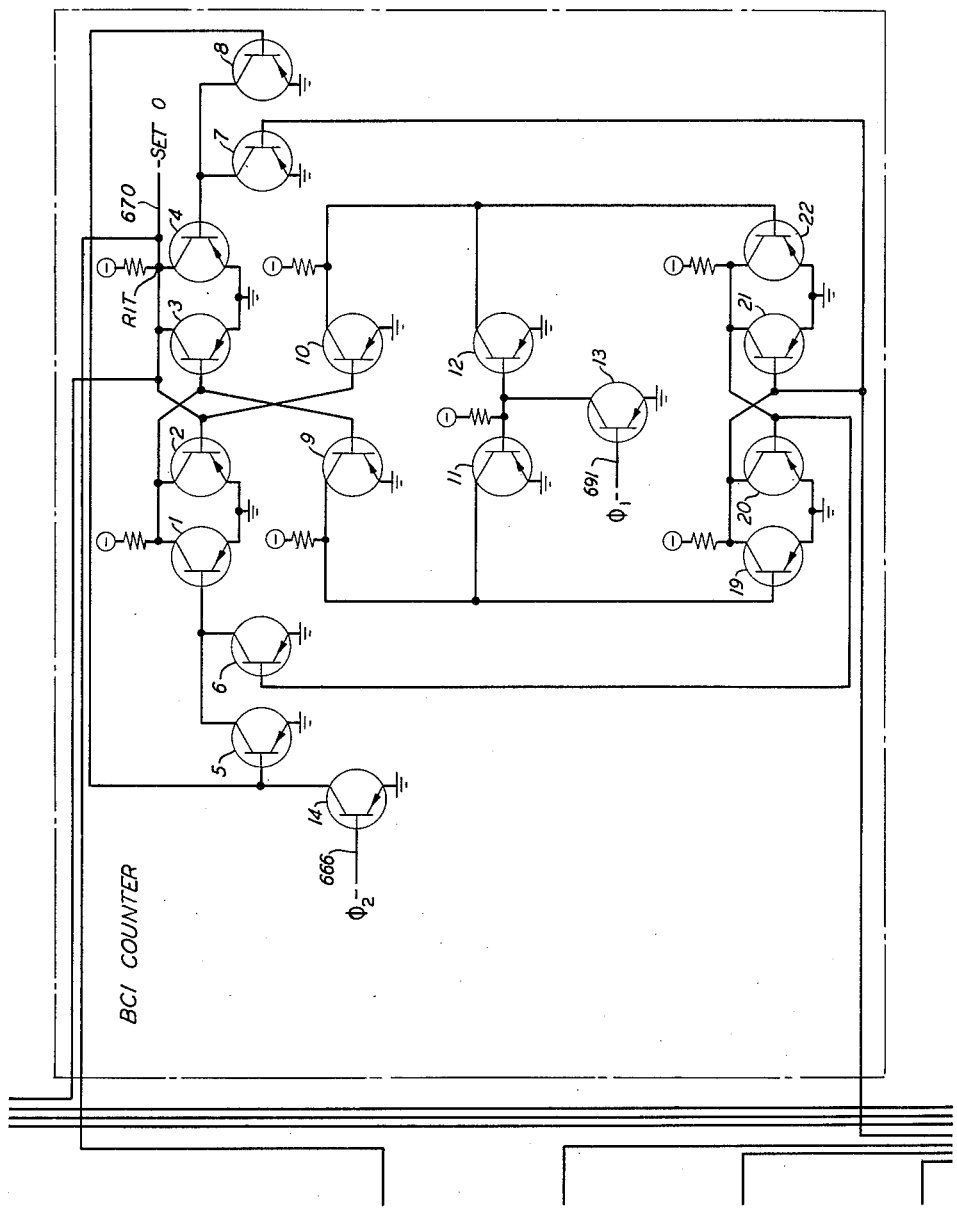
FIGS. 24, 25, 26 and 27 show the receiving four-stage binary counter.
Figure 25:
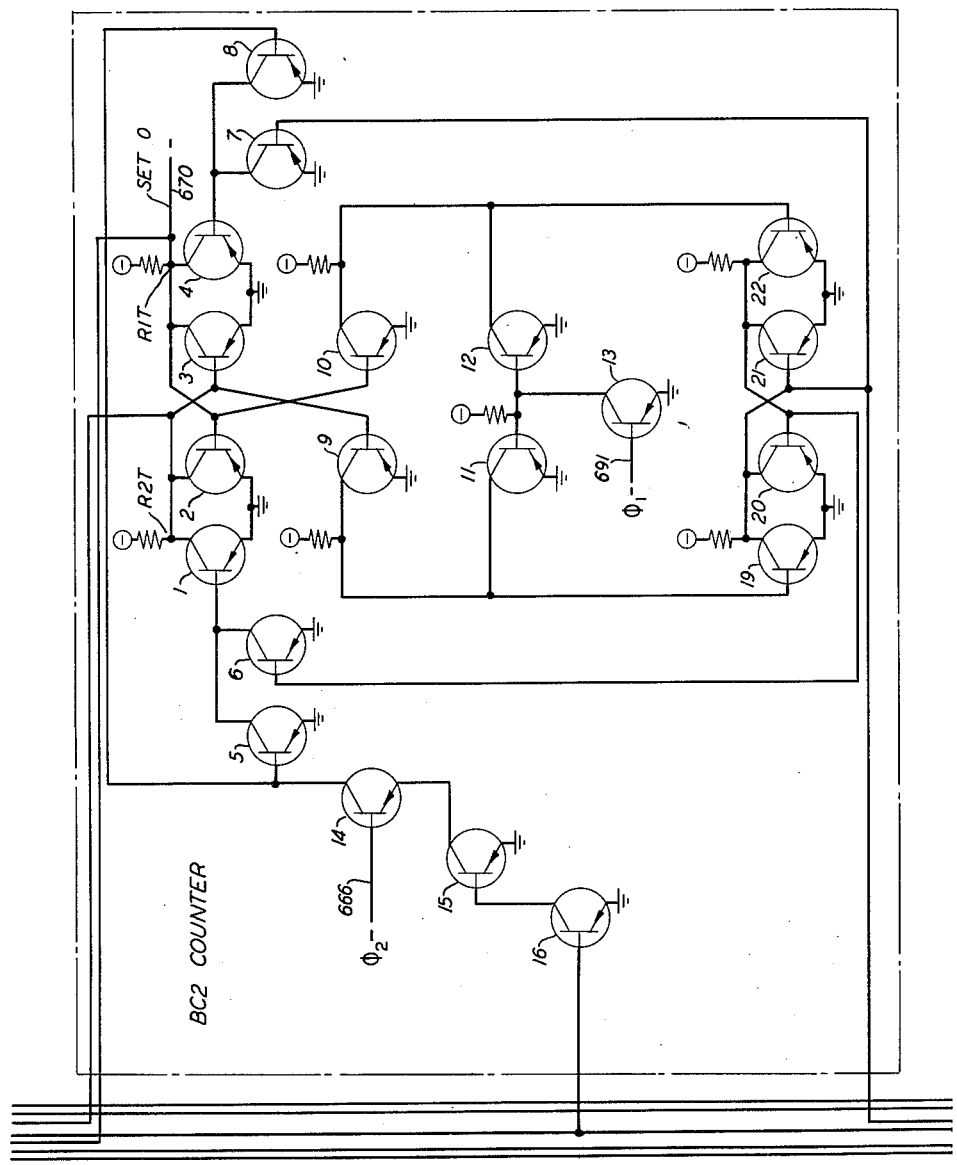
Figure 26:
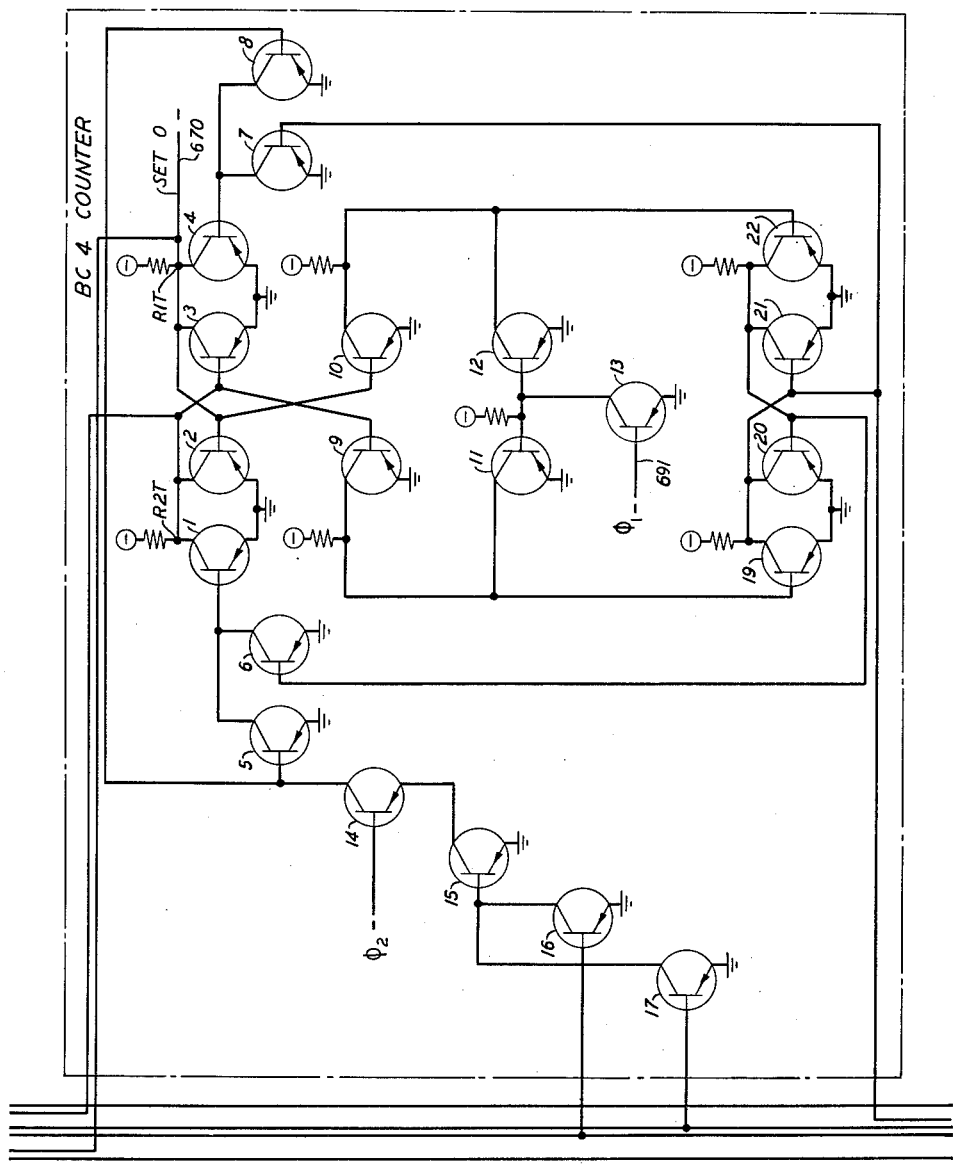
Figure 27:
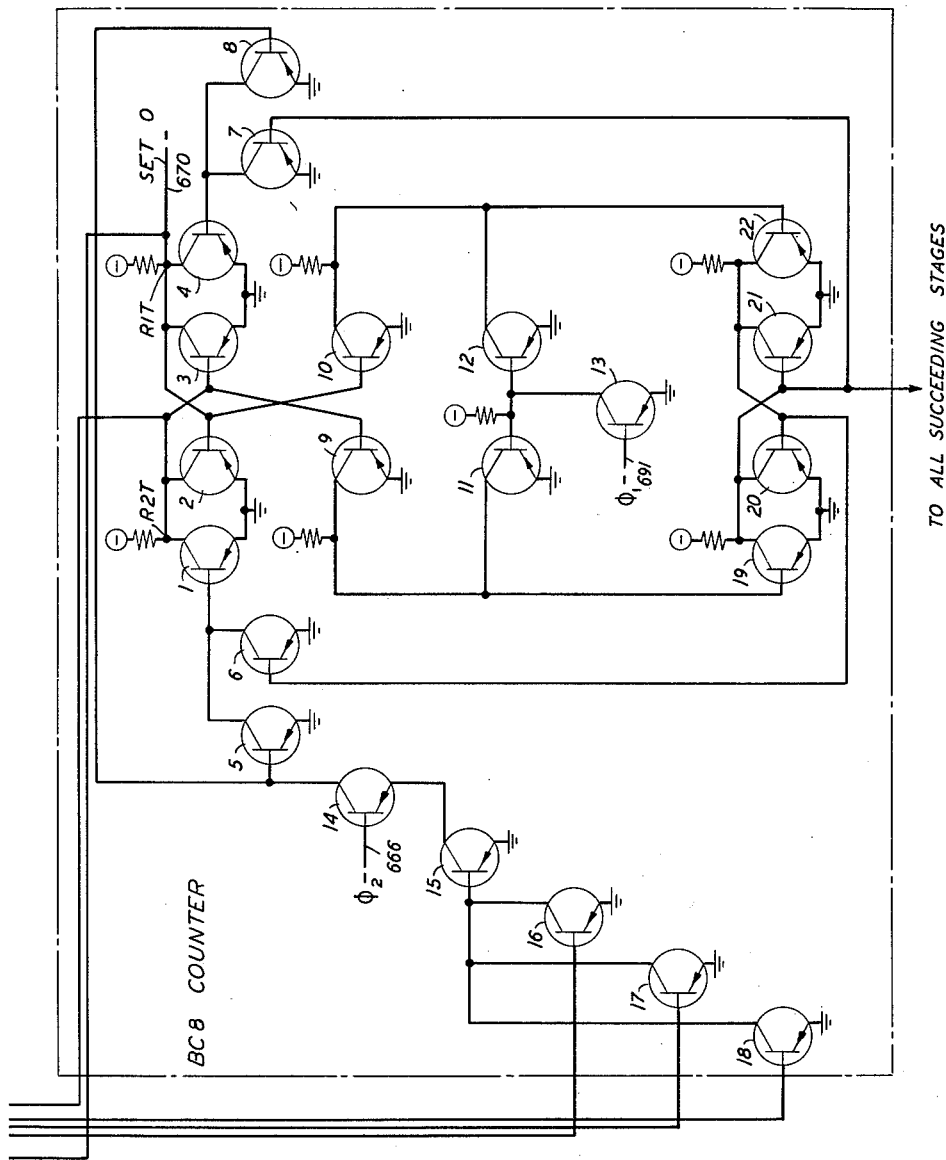

Each stage of the four-stage binary counter is originally set in the 0 condition as explained by the application of a set 0 ground pulse to conductor 670 in each stage which grounds terminal R1T therein. After being set in the 0000 condition for decimal count 1, the four-stage counter will advance one count for the application of each phase 2 pulse from FIG. 36 through conductor 666 to the base of transistor 14. The four-stage counter operates in the same manner as described for the four-stage counter in the transmitter. The four-stage counter performs the function of controlling the G1, G2, G4 and G8 gates in cooperation with the gate driver in the same manner as explained for the transmitter. The four-stage counter also performs the function of disabling the shift register after it has received and stored the first thirteen signal elements of the address. The function of disabling the shift register is accomplished by blocking the application of both shift pulses and input signal pulses to the shift register in a manner which will now be described. When the thirteenth time slot is reached the four-stage binary counter will be in the 1100 or 12 binary count condition. For this condition stages BC8 and BC4 will be in the 1 condition and stages BC2 and BC1 will be in the 0 condition. Ground will be applied from terminal R2T in each of stages BC8 and BC4 and from terminal R1T in stage BC1, which are all grounded for the 13 decimal count condition, to the bases of transistors 1, 4 and 8 in the shift gate circuit, FIG. 23. Negative battery voltage at the terminal R2T in stage BC2 is inverted and coupled to the base electrode of transistor 2 in the shift gate of FIG. 23. For decimal count 13, therefore, terminal S1G in FIG. 23 will apply negative battery to the bases of each of transistors 9, 10, 11 and 12 turning each of these transistors ON and grounding conductors 661, 662, 663 and 664, which prevents the application of the phase 1 and phase 2 pulses to any of the stages of the shift register and thereby prevents any further shifting therein after the first 13 signal elements including the 11 address elements and two of the single-error correcting elements, are stored. At the same time the same gorund and negative signals that were applied from the counter stages BC1, BC2, BC4, and BC8 to the shift gate of FIG. 23 are also applied to the bases of transistors 20, 21, 22 and 23 in FIG. 16. Transistors 20 through 23 are thus operated in the same fashion as the transistors 1, 2, 4, and 8 of FIG. 23 to cause transistors 19 and 19' in FIG. 16 to conduct at time slot 13. This action grounds the base electrodes of transistors 16 and 17 and prevents operation of shift register stage 3.

Figure 21:
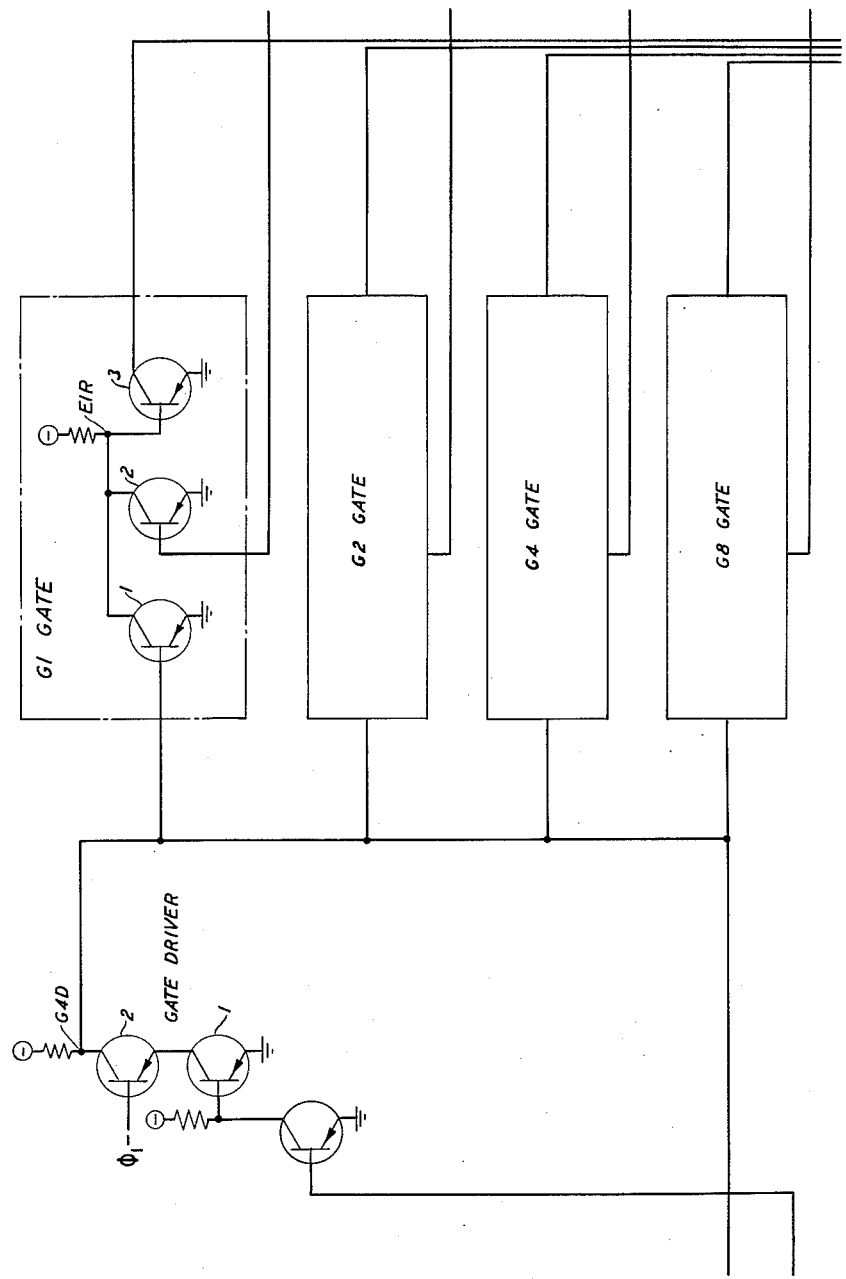
FIG. 21 shows the receiving individual gate circuits and parity checking circuits.
Figure 22:
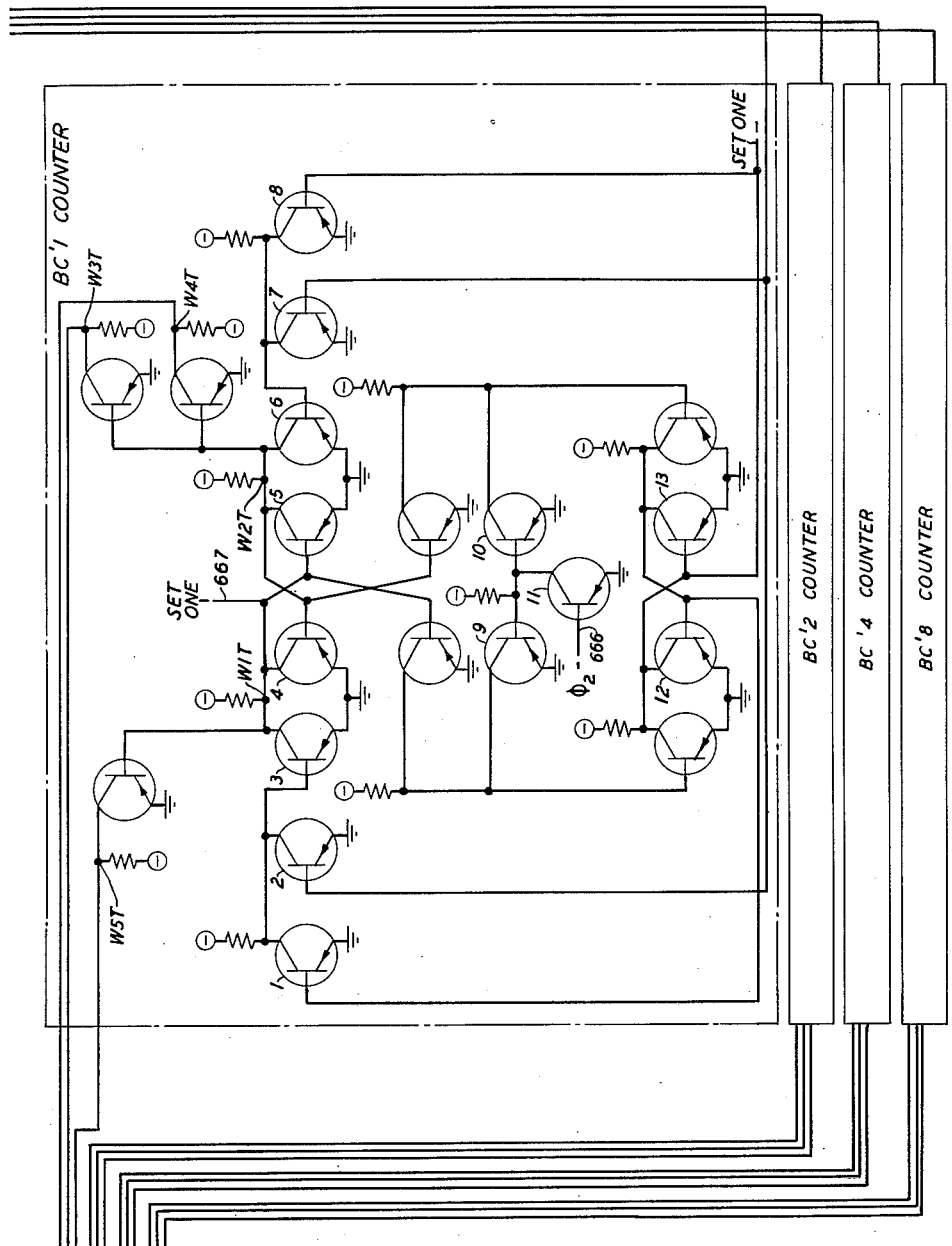

Incoming signals being received through conductor NS1 simultaneously with their impression on the shift register are applied also to the gate driver in FIG. 21. All of the incoming signals after passing through the gate driver are applied directly to the bases of transistors 2 and 9 in single-stage counter BC'0 in FIG. 17 which can therefore make a parity check on the entire address, with single-error-correcting bits, and on each word. The gate driver operates in substantially the same manner as the gate driver in the transmitter. In response to the application to the gate driver of ground potential for a 1 signal, and in response to the simultaneous application of a phase one pulse thereto, bases of transistors 1 and 2 in the gate driver are driven to negative potentials. The gate driver will be enabled and ground will be applied to terminal G4D. Incoming signals after passing through the gate driver are applied to G1, G2, G4 and G8, in parallel. A 1 condition signal element will ground the bases of transistor 1 in each of gates G1, G2, G4 and G8. Each of gates G1, G2, G4, and G8 is a parallel transistor circuit which is under the joint control of the gate driver and a correspondingly numbered stage of the four-stage binary counter. The base of transistor 2 in gates G1, G2, G4 and G8 is connected to terminal R1T in each of counters BC1, BC2, BC4 and BC8, respectively. Terminal R1T in each of the four stages will be grounded for the 0 condition therein. Transistor 2 in each gate will be OFF whenever its controlling counter stage is in the 0 condition. As a result of this each 1 condition signal element in each of the four parity groups for single-error correction will pass through a respective one of gates G1, G2, G4 and G8 whenever its controlling stage of the four-stage counter is in the 0 condition.

Terminal E1R in each of the gates G1, G2, G4 and G8 will have negative battery applied thereto when the gate is enabled. When this negative battery is applied to the base of transistor 3 in any gate, ground will be impressed on the bases of transistors 2 and 7 in the respective single-stage binary counter BC'1, BC'2, BC'4 and BC'8 connected to the gate. These counters operate in substantially the same manner as described for the corresponding single-stage counter in the transmitter.

Since each of single-stage counters BC'1, BC'2, BC'4 and BC'8 was originally set to the 1 condition, each will be in the 1 condition when it was counted an even number of 1 signal conditions and each will be in the 0 condition when it has counted an odd number of 1 signal conditions.

It will be recalled that it is a requirement of the receiving circuit that it produce a 0000 condition when there is no error among the first fifteen signal elements and that it produce a binary number corresponding to the decimal number of the position of any signal element which is error. Binary counters BC'1, BC'2, BC'4 and BC'8 perform this function. It will be recalled that each of the four groups of signal elements encoded for single-error correction contained an odd number of 1's as transmitted. If an odd number of 1's is received in each group, each of single-stage counters BC'1, BC'2, BC'4 and BC'8 will be in the 0 condition after it has received all of the 1 condition signal elements in its respective group. Attention is called to the fact that although only the first thirteen signal elements are stored in the shift register all thirteen of these and the fourteenth and fifteenth elements will be applied through the gate driver to gates G1, G2, G4 and G8 in parallel.

If there is a single error in any of the four groups of signals encoded for single-error correction some one or more of single-stage counters BC'1, BC'2 BC'4 and BC'8 will be in the 1 condition for reasons which should be understood from the foregoing. Further, as the 0 or 1 signal condition assumed by each of the four stages BC'1, BC'2 BC'4 and BC'8 are written in order from left to right its decimal equivalent will correspond to the position number, if any, which is in error.

Figure 18:
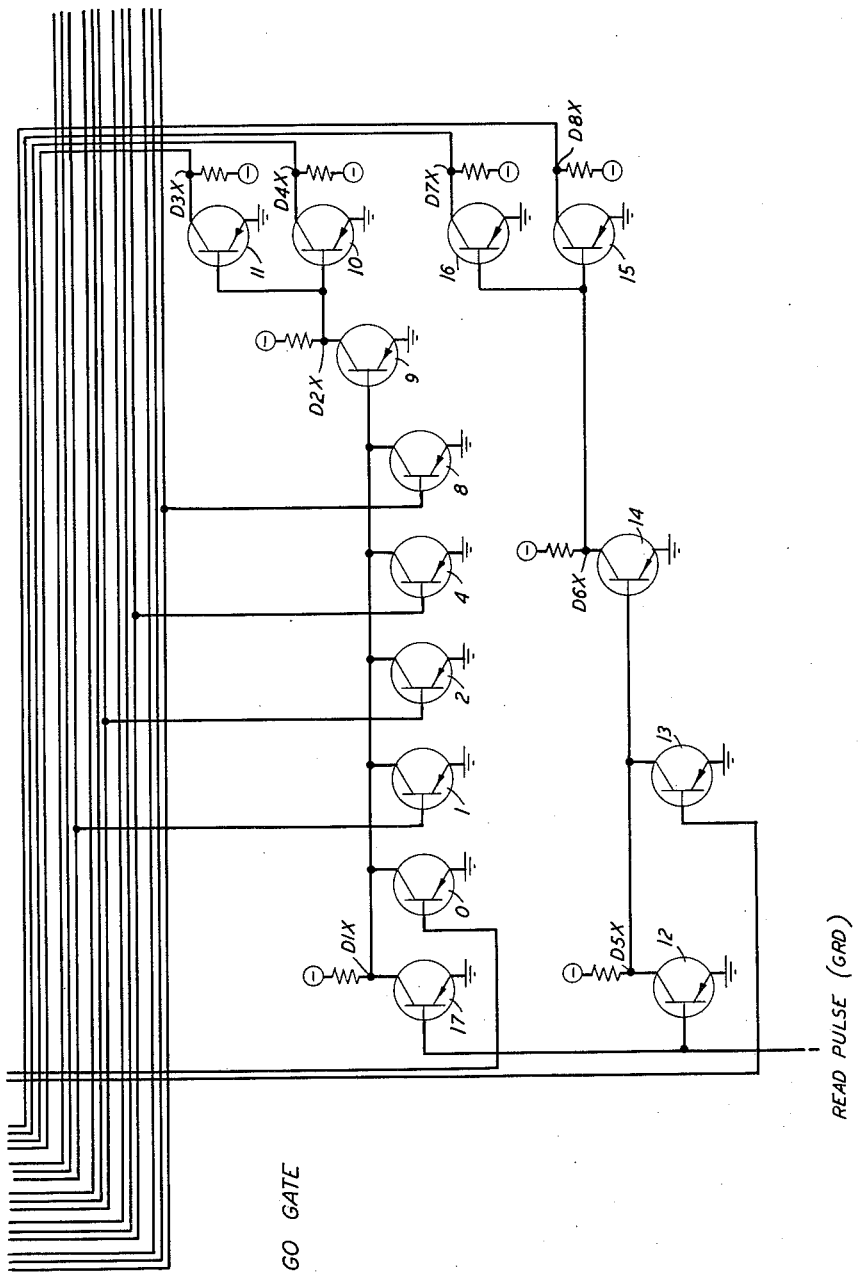
FIG. 18 shows the receiving read-pulse gate circuit.

Let it first be assumed that there is no error in the entire address signal train as received. Then each of single-stage counters BC'1, BC'2, BC'4 and BC'8 will be in the 0 condition. Further counter BC'0 which counts the 1 condition signal elements in the entire train will be in the 0 condition. Ground will be connected from terminal V1T in stage BC'0 and from terminal W5T in each of counters BC'1, BC'2, BC'4 and BC'8 to the bases of transistors 0, 1, 2, 4 and 8 respectively in gate G0, FIG. 18. When ground is connected, simultaneously, over conductor 680 to the base of transistor 17 from the receiving program circuit, FIG. 36, as a read pulse, all of transistors 17, 0, 1, 2, 4 and 8 in gate G0 will be OFF. Negative battery from terminal D1X will be connected to the base of transistor 9, which will be turned ON. Ground will be connected to the bases of transistors 10 and 11 which will be turned OFF. Negative battery will be connected to terminal D3X and D4X. Terminal D3X connects to the base of transistor 12 in read gates 3, 5, 6, 7, 9 and 10. Terminal D4X connects to the base of a corresponding transistor in read gates 11, 12, 13, 14 and 15. This turns transistor 12 in each read gate ON for this condition. The base of transistors 7 and 8 in each of the read gates connects to terminals R2N and R3N in an individual corresponding stage of the shift register.

Let it be assumed the shift register stage 3, FIG. 16, is in the 0 condition. Since it has been assumed that the received address is correct the condition applied by shift-register stage 3 on read gate 3 is correct. The signal is therefore not to be inverted. Terminal R2N in shift-register stage 3 is grounded and terminal R3N is connected to negative battery for the 0 condition. Since the received train is correct and each of single-stage counters BC'1, BC'2, BC'4 and BC'8 is in the 0 condition, two of the single-stage counters BC'4 and BC'8 will impress negative battery on the bases of transistors 3 and 4, respectively, in read gate 3. This is so because the parallel circuit comprising transistors 1, 2, 3 and 4 is arranged to be enabled at a decimal count of 3 which is binary count 0011. For the decimal count of 0 binary count 0000 terminal W4T in each of counters BC'4 and BC'8 will be connected to negative battery. Therefore ground will be connected to terminal X1T turning transistors 5 and 6 OFF. Negative battery from terminal X2T will be connected to the base of transistor 9 turning it ON and connecting ground to the emitter of transistor 7. For the assumed 0 condition of shift-register stage 3 the base of transistor 7 is connected to a negative potential so transfer 7 is turned ON. Therefore, transistor 7 and 9 conduct grounding terminal X3T. Transistor 10 is turned OFF and negative potential is connected through terminal X4T to the address recognizer which corresponds to the correct 0 signal condition from shift-register stage 3. If shift-register stage 3 is correctly in the 1 condition ground is connected to the base of transistor 7 which will be turned OFF. Ground on the base of transistor 8 for the correct 1 condition of stage 3 of the shift-register will allow X3T to drop to a negative potential. With terminal X3T at a negative potential, transistor 10 is turned ON. Transistors 10 and 12 ground terminal X4T connected to the address recognizer which corresponds to the assumed correct 1 signal element of the shift-register.

Figure 15:
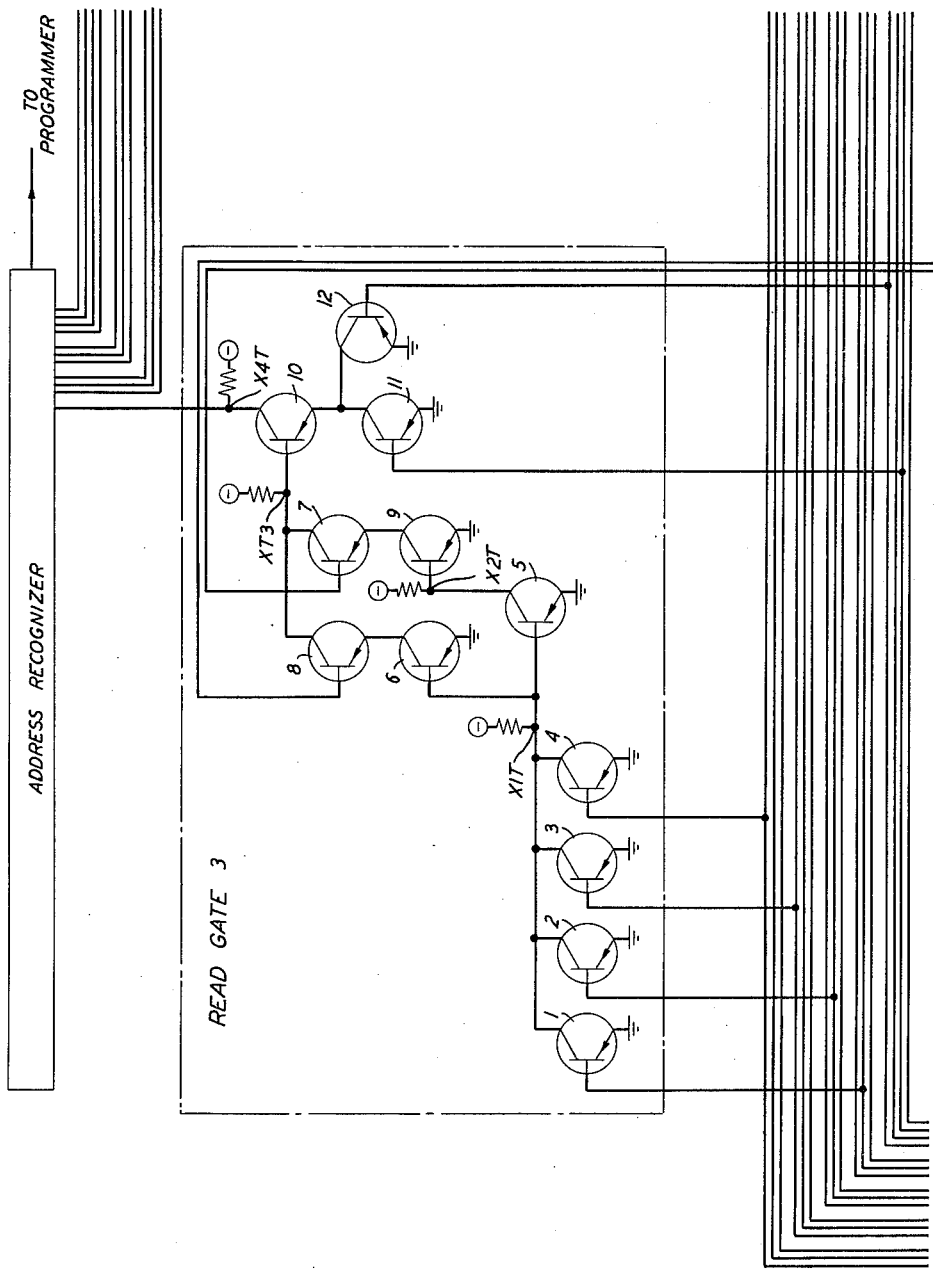
FIG. 15 and FIG. 19 show receiving read gates.
Figure 19:
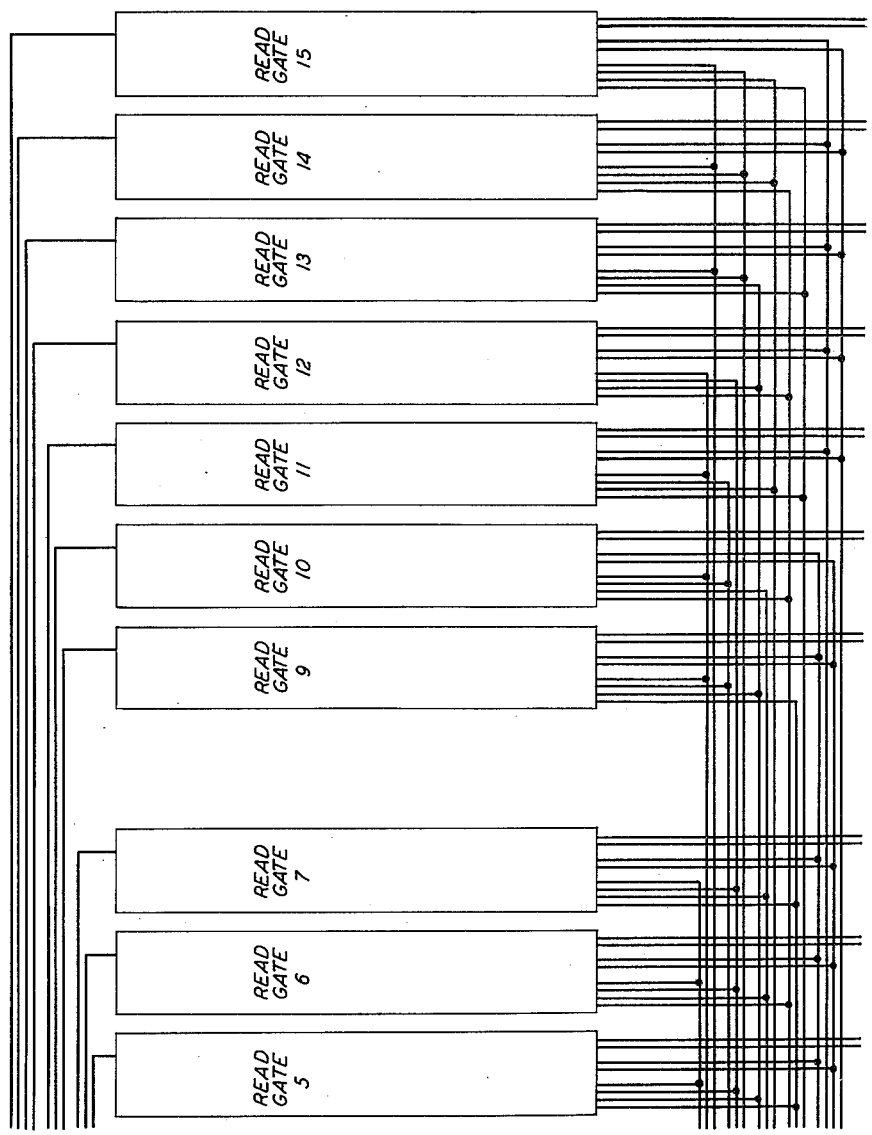

Let it now be assumed that there is a single error among the first 15 signal elements in the address and that the four single-stage counters indicate that the signal element in checking position 3 is in error by producing a condition of 0,0,1,1, for single-counter stage BC'8, BC'4, BC'2 and BC'1 respectively. The four single-stage counters are cooperatively connected to each of the read gates in FIGS. 15 and 19 in such manner that all four apply grounds to transistors 1, 2, 3 and 4 in a stage when a signal element in the corresponding shift-register stage is in error. For instance, to indicate an error in checking position 3, the binary number 3 is produced in the four single-stage counters by actuating counters BC'8, BC'4, BC'2 and BC'1 to the 0011 condition respectively. Terminal W3T in stages BC'1 and BC'2 will be grounded for this condition and terminal W5T in counters BC'4 and BC'8 will also be grounded for this condition. Terminals W3T in each of stages BC'1 and BC'2 and terminals W5T in each of counters BC'4 and BC'8 will be connected to the base of transistors 1, 2, 3 and 4, respectively, in read gate 3. All of these transistors will, therefore, be OFF and terminal X1T will have negative battery connected thereto. This will turn transistors 5 and 6 ON. Terminal X2T will be grounded and transistor 9 will be OFF. Therefore transistor 7 cannot be turned ON. Transistor 6 when ON grounds the emitter of transistor 8 which can therefore be turned ON by negative battery. If the condition registered in shift-register stage 3 is a 1 condition ground will be applied to the base of transistor 7 and negative battery to transistor 8. Transistor 8 will be turned ON grounding terminal X3T. Transistor 10 will be turned OFF and a negative potential will be impressed through terminal X4T. This is the proper condition for a 0 signal element. The erroneous 1 condition signal element assumed to be in stage 3 of the shift-register has been changed to a 0 condition signal element. When a single signal element is in error the single-stage counter BC'0 will be in the 1 condition. Negative battery from terminal V1T of this stage will be applied to the base of transistor 0 in gate G0. This will reverse the condition applied to terminals D3X and D4X which will turn transistors 12 in each of the read gates OFF. However, gate 11 in each of the read gates is arranged to perform the same function as gate 12. Gate 11 is turned ON when there is a single error. Under the single-error condition, counter BC'0 will be in the 1 condition. Ground from terminal V2T, FIG. 17, will be applied to the base of transistor 13 in the G0 gate, FIG. 18. When a ground read pulse is then applied to the base of transistor 12 negative battery from terminal D5X is applied to the base of transistor 14. Ground from terminal D6X is applied to the bases of transistors 15 and 16 turning them OFF. Terminal D7X and D8X connect to the base of transistor 11 in the read gates turning transistor 11 ON in each gate when there is one error. It will now be assumed that there is a 0 condition registered in shift-register stage 3 and that it is erroneous. Ground will be connected to the base of transistor which will be turned OFF. Since transistor 7 will also be OFF negative battery will be connected from terminal X3T to the base of transistor 10 turning it ON. Transistors 10 and 11 ground terminal X4T which is connected to the address recognizer. Thus the erroneous 0 condition signal element has been inverted to a ground signal condition which is a proper 1 condition signal element.

In response to the read pulse, all of the signal elements in the shift register will be read out simultaneously to the address recognizer. All mobile units receive all addresses. Each mobile unit has an individual assigned address. The received address is compared, element for element simultaneously with the assigned address. If they match the message is accepted and the words following the address in the train are received. If they do not match, the receiver is turned OFF and the words are not received. This is explained in detail in the Davey et al. application further identified in the foregoing.

In the event that there are two errors in a train the single-error correction circuit will indicate an error but the double-error parity check will indicate no error. Under this condition the upper parallel circuit in the G0 gate, FIG. 18, will be in the even count condition which will turn transistor 0 therein ON. However, some one or more of the single-stage counters will be the 1 condition, for reasons which should be understood from the foregoing. This will turn some one or more of transistors 1, 2, 4 and 8 ON, grounding terminal D1X in FIG. 18 and disabling the upper parallel circuit in gate G0. This will turn transistor 12 OFF in all of the read gates. The 0 condition of counter BC'0, FIG. 17, will apply negative battery from terminal V2T to the base of transistor 13 in gate G0. This will connect ground to terminal D5X. This will turn transistor 11 OFF in all of the read gates, FIGS. 15 and 19. With transistors 11 and 12 OFF in all of the read gates ground cannot be connected to the emitter of transistor 10 therein therefore no signals can pass from any stage of the shift-register to the address recognizer. This will prevent the acceptance of any address having two errors therein by any mobile unit.

The details of the circuit for applying the parity check to the words at the receiver is well known in the art. It is shown and described in detail in the Davey et al. application identified in the foregoing as well as in a number of patents. It is not considered necessary to show it in the receiver circuit or to describe it in detail.

The address turn off gate and the word turn off gate shown at the bottom in FIG. 36 operate in the same manner as described for the corresponding gates in the transmitter.

What is claimed is:

1. A pulse code transmission system comprising a transmitter, a receiver, a single transmission channel interconnecting said transmitter and receiver, means in said transmitter for encoding a multielement, multicondition signal permutation with a single-error correcting code, said means comprising an encoder having a number of circuit branches for applying a corresponding number of separate parity checks over signal elements in a corresponding number of different parity groups of signal elements in said permutation, said number corresponding to the number of signal elements required to define the total number of signal elements in said permutation in binary notation, means for impressing said encoded permutation on said single channel, and decoding means responsive to the reception of said encoded permutation for correcting a single error in an erroneous signal permutation, said decoding means comprising an individual decoding branch for each of said parity checks.

2. An error-correcting code transmission system, having means therein for translating a permutation of code signals into a signal train comprising said permutation signals and encoding signals, said permutation having $m$ signal elements, said means comprising a shift register having $m$ stages therein for the registration therein of said $m$ signal elements, and $n$ stages therein occupying positions in said register corresponding to positions in said train in which n error-correcting encoding signal elements are to be inserted, where m and n are each positive integers greater than one, certain of said n stages in positions in said register intermediate certain of said m stages, means connected to said register for impressing said m signals on said m stages, said register having an output, a single transmitting channel connected to said output, an error-correction encoding circuit connected intermediate said register and said output, means connected to said register for transmitting the signals in said register to said channel, means in said encoding circuit responsive to said transmission for generating a cooperative group of single-error correction encoding signals, and means connected to said encoding circuit, for inserting said generated signals in positions in said train corresponding to the position of said n stages in said register.

3. A pulse transmission encoding system comprising a single transmission channel, a shift register and a single-error correcting encoding circuit, responsive to said shift register, connected to said channel, a pulsing circuit for controlling the impressing of a train of signal elements on said channel, element by element in sequence, said train comprising a permutation of intelligence-bearing signal elements from said shift register and a cooperative group of single-error encoding elements from said encoding circuit, said encoding circuit comprising a plurality of parity checking circuits having a counting circuit connected thereto for separating said intelligence bearing signal elements into a corresponding plurality of parity groups and means in said encoding circuit for adding a parity checking element of a particular condition to each said group incident to the conditions of the elements in each said group.

4. A pulse transmission encoding system comprising a single transmission channel interconnecting a pulse transmitter and a pulse receiver, means at said transmitter for separating a single sequential group of intelligence-bearing signal elements, which elements cooperatively define a single item of intelligence, into a plurality of parts, a plurality of counting means connected to said transmitter, responsive to the conditions of said signal elements for generating individual signal elements of a cooperative group of single-error correcting signal elements, means inserting said error correcting signal elements in the separations to form a cooperative unitary sequential signal train comprising interspersed intelligence-bearing elements and error-correcting signal elements, for correcting an error which may occur in said signal elements, means for impressing said train on said single channel, and means at said receiver responsive to the reception of said train for correcting a single error, if present, in said train.

5. A pulse transmitter connected through a single transmission channel to a pulse receiver, said transmitter having a pulse transmission signal error-correcting encoding circuit having means therein for encoding permutation signals so as to correct any single error which may occur in said signal elements during transmission over said channel, at said receiver, said circuit comprising a selecting gate, said gate having means therein for selectively directing signal elements in predetermined numbered positions in said permutation into a binary counter, means in said counter responsive to the condition of said counter after counting the number of selected elements in said predetermined positions which are of a particular condition for selectively inserting an error-correcting encoding signal element amidst said permutation signals.

6. A signal code transmission system comprising a signal transmitter having a signal error-correcting encoding circuit, said transmitter connected through a single transmission channel to a signal receiver, means for transmitting permutation signals through said transmitter and said incoding circuit to said channel, a plurality of parallel branches in said correcting circuit, a gate circuit and a single-stage binary counter in each said branch, a multistage counter connected to said gate circuits, means in each of said gate circuits, responsive to said multistage counter, for selectively controlling the effective direction of groups of said permutation signals through said gate circuits to said single-stage counters at predetermined counts, and means responsive to the counting condition of said single-stage counters for encoding said permutation signals with a plurality of error-correction encoding signals as they are being impressed on said single channel, to condition the encoded signals thereby produced so that an error which may occur therein during transmission may be corrected at said receiver.

7. A pulse transmission system comprising a transmitter connected through a single transmission channel to a receiver, said transmitter having means for producing a train of pulses, said train having a permutation of intelligence-determining pulses and a plurality of encoding pulses, said encoding pulses for both correcting and detecting errors in said train during transmission between said transmitter and said receiver, said system comprising a multistage shift register connected to said channel, said register having more stages than said permutation has pulses, means for impressing said permutation of pulses individually on certain predetermined ones of said stages, pulsing means for shifting the contents of said register element by element consecutively and uninterruptedly to said channel, an error-correcting and an error-detecting encoding circuit responsive to said shifting means and to the condition of the shifted pulses, said correcting and detecting encoding circuit having a plurality of parallel branches therein, each of said branches having means for generating an individual pulse incident to the cooperative conditions of an individual group of pulses in said train, means for inserting certain of said generated pulses individually in positions in said train corresponding to the positions of the stages of said register on which no permutation pulses were impressed, and means for inserting others of said generated pulses in individual pulse positions at the end of said tarin.

8. A system in accordance with claim 7 having a multistage binary counter, a gate circuit in each of said parallel branches responsive to said counter and a single-stage binary counter in each of said branches responsive to said gate circuit therein.

9. A system in accordance with claim 7 in which one of said parallel branches generates a double-error detection encoding pulse and the others of said parallel branches each generate an error-correcting encoding pulse and gate means interconnecting said other branches and said one branch to direct error-correcting encoding pulses into said error-detecting encoding branch for counting.

10. A system in accordance with claim 9 including a gate for preventing the counting of a pulse generated for double-error encoding detection.

11. A pulse decoding receiver for decoding error-correcting encoded pulse trains, each of said trains having a plurality of error-correcting encoded pulse groups for cooperatively correcting an error which may have occurred in a pulse in said train during transmission to said receiver, said receiver including an individual parallel branch for each of said groups, a single-stage counter in each said branch, and means for operating each counter stage so that said stages cooperatively define a binary number corresponding to the number of the position of an erroneous pulse.

12. A pulse decoding receiver for decoding error-correcting encoded pulse trains, said receiver comprising a single-stage binary counter for each group of a plurality of groups of signal elements encoded for single-error correction in a received train of pulses, and means responsive to a received train of pulses for cooperatively controlling said counters to define the position of an error in said train, if there is an error present in said train.

13. A receiver in accordance with claim 12 including means therein for detecting a double error, if present, in any of said encoded trains comprising an individual binary counter responsive to all of the signal elements in any train.

14. A pulse code transmission system having a pulse error-correction encoding circuit, said circuit comprising means for separating a first train of consecutive intelligence-determining pulses to leave spaces therein for a plurality of error-correcting encoding pulses for correcting an error in said train if an error occurs during transmission, a plurality of branch circuits, means in said encoding circuit coupling each pulse of said train to a different combination of said branch circuits, means in each of said branch circuits responsive to pulses coupled thereto for controlling the condition of a different error-correction encoding pulse, means in said encoding circuit for inserting said error-correction encoding pulses in said spaces to produce a second sequential train having intelligence and error-correcting encoding pulses interspersed therein, a single transmission channel connected to said error-correction encoding circuit, and means for impressing said second train on said channel.

References Cited by the Examiner

UNITED STATES PATENTS

| | | | |
|---|---|---|---|
| 2,539,556 | 1/51 | Steinberg | 179—1.5 |
| 2,552,629 | 5/51 | Hamming et al. | 178—23 |
| 2,596,199 | 5/52 | Bennett | 178—23 |
| 2,653,996 | 9/53 | Wright | 178—23 |
| 2,884,625 | 4/59 | Kippenhan | 235—153 X |
| 2,906,997 | 9/59 | Rabin et al. | 235—153 X |
| 2,956,124 | 10/60 | Hagelbarger | 178—23 |

MALCOLM A. MORRISON, *Primary Examiner.*

KATHLEEN CLAFFY, FREDERICK M. STRADER, CHESTER L. JUSTUS, *Examiners.*